United States Patent
Durham et al.

(10) Patent No.: US 11,829,488 B2
(45) Date of Patent: Nov. 28, 2023

(54) POINTER BASED DATA ENCRYPTION

(71) Applicant: Intel Corporation, Santa Clara, CA (US)

(72) Inventors: David M. Durham, Beaverton, OR (US); Michael LeMay, Hillsboro, OR (US); Ramya Jayaram Masti, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 605 days.

(21) Appl. No.: 16/722,342

(22) Filed: Dec. 20, 2019

(65) Prior Publication Data

US 2020/0125501 A1    Apr. 23, 2020

Related U.S. Application Data

(60) Provisional application No. 62/868,884, filed on Jun. 29, 2019.

(51) Int. Cl.
*H04L 9/14* (2006.01)
*G06F 21/60* (2013.01)
(Continued)

(52) U.S. Cl.
CPC ........ *G06F 21/602* (2013.01); *G06F 9/30043* (2013.01); *G06F 9/30101* (2013.01);
(Continued)

(58) Field of Classification Search
CPC .... G06F 21/602; G06F 9/30101; G06F 9/321; G06F 9/5016; G06F 12/0207; G06F 12/1408; H04L 9/02869; H04L 9/14
See application file for complete search history.

(56) References Cited

U.S. PATENT DOCUMENTS 6,570,989 B1   5/2003  Ohmori et al.
7,043,016 B2   5/2006  Roelse
(Continued)

FOREIGN PATENT DOCUMENTS

DE   102018125786 A1   5/2019
EP       2073430 A1   6/2009
(Continued)

OTHER PUBLICATIONS

USPTO Non-Final Office Action in U.S. Appl. No. 16/723,977 dated Aug. 3, 2021 (37 pages).
(Continued)

*Primary Examiner* — Matthew T Henning
(74) *Attorney, Agent, or Firm* — Alliance IP, LLC

(57) ABSTRACT

An example method comprises storing, in a register, an encoded pointer to a memory location, where first context information is stored in first bits of the encoded pointer and a slice of a memory address of the memory location is encrypted and stored in second bits of the encoded pointer. The method further includes decoding the encoded pointer to obtain the memory address of the memory location, using the memory address obtained by decoding the encoded pointer to access encrypted data at the memory location, and decrypting the encrypted data based on a first key and a first tweak value. The first tweak value includes one or more bits and is derived, at least in part, from the encoded pointer.

25 Claims, 29 Drawing Sheets

(51) Int. Cl.

| | |
|---|---|
| *G06F 9/30* | (2018.01) |
| *H04L 9/08* | (2006.01) |
| *G06F 12/14* | (2006.01) |
| *G06F 9/32* | (2018.01) |
| *G06F 9/50* | (2006.01) |
| *G06F 12/02* | (2006.01) |
| *G06F 12/0897* | (2016.01) |
| *G06F 9/48* | (2006.01) |
| *G06F 21/72* | (2013.01) |
| *H04L 9/06* | (2006.01) |
| *G06F 12/06* | (2006.01) |
| *G06F 12/0875* | (2016.01) |
| *G06F 21/79* | (2013.01) |
| *G06F 9/455* | (2018.01) |
| *G06F 12/0811* | (2016.01) |
| *G06F 21/12* | (2013.01) |
| *G06F 21/62* | (2013.01) |

(52) U.S. Cl.
CPC .......... *G06F 9/30178* (2013.01); *G06F 9/321* (2013.01); *G06F 9/45558* (2013.01); *G06F 9/48* (2013.01); *G06F 9/5016* (2013.01); *G06F 12/0207* (2013.01); *G06F 12/0646* (2013.01); *G06F 12/0811* (2013.01); *G06F 12/0875* (2013.01); *G06F 12/0897* (2013.01); *G06F 12/1408* (2013.01); *G06F 12/1458* (2013.01); *G06F 12/1466* (2013.01); *G06F 21/12* (2013.01); *G06F 21/6227* (2013.01); *G06F 21/72* (2013.01); *G06F 21/79* (2013.01); *H04L 9/0637* (2013.01); *H04L 9/0822* (2013.01); *H04L 9/0861* (2013.01); *H04L 9/0869* (2013.01); *H04L 9/0894* (2013.01); *H04L 9/14* (2013.01); *G06F 2009/45587* (2013.01); *G06F 2212/1052* (2013.01); *H04L 2209/125* (2013.01)

(56) References Cited

U.S. PATENT DOCUMENTS

| | | |
|---|---|---|
| 7,254,718 B2 | 8/2007 | Kaminaga et al. |
| 7,907,723 B2 | 3/2011 | Rubin |
| 8,085,934 B1 | 12/2011 | Bhooma |
| 8,675,868 B1 | 3/2014 | Yearsley et al. |
| 8,798,263 B2 | 8/2014 | Pasini et al. |
| 9,213,653 B2 | 12/2015 | Durham et al. |
| 9,350,534 B1 | 5/2016 | Poo et al. |
| 9,436,847 B2 | 9/2016 | Durham et al. |
| 9,514,285 B2 | 12/2016 | Durham et al. |
| 9,811,661 B1 | 11/2017 | Golovkin et al. |
| 9,830,162 B2 | 11/2017 | LeMay |
| 9,990,249 B2 | 6/2018 | Durham et al. |
| 10,216,522 B2 | 2/2019 | LeMay |
| 10,387,305 B2 | 8/2019 | Durham et al. |
| 10,536,266 B2 | 1/2020 | Courtney |
| 10,585,809 B2 | 3/2020 | Durham et al. |
| 10,706,164 B2 | 7/2020 | LeMay et al. |
| 10,769,272 B2 | 9/2020 | Durham et al. |
| 10,860,709 B2 | 12/2020 | LeMay et al. |
| 2002/0094081 A1 | 7/2002 | Medvinsky |
| 2003/0091185 A1 | 5/2003 | Swindlehurst et al. |
| 2003/0101362 A1 | 5/2003 | Dia |
| 2003/0126349 A1 | 7/2003 | Nalawadi et al. |
| 2003/0149869 A1 | 8/2003 | Gleichauf |
| 2004/0123288 A1 | 6/2004 | Bennett et al. |
| 2004/0215895 A1 | 10/2004 | Cypher |
| 2004/0268057 A1 | 12/2004 | Landin et al. |
| 2007/0152854 A1 | 7/2007 | Copley |
| 2007/0201691 A1 | 8/2007 | Kumagaya |
| 2008/0080708 A1 | 4/2008 | McAlister et al. |
| 2008/0130895 A1 | 6/2008 | Jueneman et al. |
| 2008/0140968 A1 | 6/2008 | Doshi et al. |
| 2008/0263117 A1 | 10/2008 | Rose et al. |
| 2009/0172393 A1 | 7/2009 | Tanik et al. |
| 2009/0220071 A1 | 9/2009 | Gueron et al. |
| 2009/0254774 A1 | 10/2009 | Chamdani et al. |
| 2009/0282393 A1 | 11/2009 | Costa et al. |
| 2010/0023707 A1 | 1/2010 | Hohmuth et al. |
| 2011/0099429 A1 | 4/2011 | Varma et al. |
| 2011/0161680 A1 | 6/2011 | Grube et al. |
| 2011/0296202 A1 | 12/2011 | Henry et al. |
| 2012/0163453 A1 | 6/2012 | Horowitz |
| 2012/0284461 A1 | 11/2012 | Larin et al. |
| 2013/0275766 A1 | 10/2013 | Plainecassagne et al. |
| 2014/0173293 A1 | 6/2014 | Kaplan |
| 2014/0270159 A1 | 9/2014 | Youn et al. |
| 2015/0234728 A1 | 8/2015 | Coleman et al. |
| 2015/0244518 A1 | 8/2015 | Koo et al. |
| 2015/0378941 A1 | 12/2015 | Rozas et al. |
| 2016/0056954 A1 | 2/2016 | Lee et al. |
| 2016/0092702 A1 | 3/2016 | Durham et al. |
| 2016/0094552 A1 | 3/2016 | Durham et al. |
| 2016/0104009 A1 | 4/2016 | Henry et al. |
| 2016/0154963 A1 | 6/2016 | Kumar et al. |
| 2016/0188889 A1 | 6/2016 | Trivedi et al. |
| 2016/0285892 A1 | 9/2016 | Kishinevsky et al. |
| 2016/0364707 A1 | 12/2016 | Varma |
| 2017/0026171 A1 | 1/2017 | Lal et al. |
| 2017/0063532 A1 | 3/2017 | Bhattacharyya et al. |
| 2017/0177368 A1 | 6/2017 | DeHon et al. |
| 2017/0285976 A1 | 10/2017 | Durham et al. |
| 2018/0082057 A1 | 3/2018 | LeMay et al. |
| 2018/0095812 A1 | 4/2018 | Deutsch et al. |
| 2018/0095899 A1 | 4/2018 | Durham et al. |
| 2018/0095906 A1 | 4/2018 | Doshi et al. |
| 2018/0109508 A1 | 4/2018 | Wall et al. |
| 2018/0287785 A1 | 10/2018 | Pfannenschmidt et al. |
| 2018/0365069 A1 | 12/2018 | Nemiroff et al. |
| 2019/0026236 A1 | 1/2019 | Barnes |
| 2019/0042369 A1 | 2/2019 | Deutsch et al. |
| 2019/0042481 A1 | 2/2019 | Feghali et al. |
| 2019/0042734 A1 | 2/2019 | Kounavis et al. |
| 2019/0042766 A1 | 2/2019 | Pappachan et al. |
| 2019/0042796 A1 | 2/2019 | Bokern et al. |
| 2019/0042799 A1 | 2/2019 | Durham et al. |
| 2019/0044954 A1 | 2/2019 | Kounavis et al. |
| 2019/0045016 A1 | 2/2019 | Dewan et al. |
| 2019/0050558 A1 | 2/2019 | LeMay et al. |
| 2019/0095350 A1 | 3/2019 | Durham et al. |
| 2019/0097794 A1 | 3/2019 | Nix |
| 2019/0102567 A1 | 4/2019 | LeMay et al. |
| 2019/0102577 A1 | 4/2019 | Gueron et al. |
| 2019/0227951 A1 | 7/2019 | Durham et al. |
| 2019/0319781 A1 | 10/2019 | Chhabra et al. |
| 2019/0347445 A1 | 11/2019 | Chen |
| 2019/0354726 A1 | 11/2019 | Critelli et al. |
| 2020/0004953 A1 | 1/2020 | LeMay et al. |
| 2020/0007332 A1 | 1/2020 | Girkar et al. |
| 2020/0076585 A1 | 3/2020 | Sheppard et al. |
| 2020/0117810 A1 | 4/2020 | Kounavis et al. |
| 2020/0125502 A1 | 4/2020 | Durham et al. |
| 2020/0125742 A1 | 4/2020 | Kounavis et al. |
| 2020/0125769 A1 | 4/2020 | Kounavis et al. |
| 2020/0125770 A1 | 4/2020 | LeMay et al. |
| 2020/0134234 A1 | 4/2020 | LeMay et al. |
| 2020/0145187 A1 | 5/2020 | Kounavis et al. |
| 2020/0145199 A1 | 5/2020 | Kounavis et al. |
| 2020/0159676 A1 | 5/2020 | Durham et al. |
| 2020/0169383 A1 | 5/2020 | Durham et al. |
| 2020/0201789 A1 | 6/2020 | Durham et al. |
| 2020/0257827 A1 | 8/2020 | Kounavis et al. |
| 2020/0380140 A1* | 12/2020 | Medwed ............... G06F 21/602 |
| 2020/0382496 A1 | 12/2020 | Xue et al. |
| 2021/0004470 A1 | 1/2021 | Babic et al. |
| 2021/0058379 A1 | 2/2021 | Bursell et al. |
| 2021/0117340 A1 | 4/2021 | Trikalinou et al. |
| 2021/0117342 A1 | 4/2021 | Durham |
| 2021/0149825 A1 | 5/2021 | Durham et al. |
| 2021/0150040 A1 | 5/2021 | Durham et al. |
| 2021/0218547 A1 | 7/2021 | Weiler et al. |

(56) References Cited

U.S. PATENT DOCUMENTS

| | | |
|---|---|---|
| 2022/0019698 A1 | 1/2022 | Durham et al. |
| 2022/0138329 A1 | 5/2022 | Kounavis et al. |
| 2022/0300626 A1 | 9/2022 | Kounavis et al. |
| 2022/0382885 A1 | 12/2022 | Durham et al. |

FOREIGN PATENT DOCUMENTS

| | | |
|---|---|---|
| EP | 3326102 A1 | 5/2018 |
| JP | 2009139899 A | 6/2009 |
| WO | 2017014885 A1 | 1/2017 |

OTHER PUBLICATIONS

USPTO Non-Final Office Action in U.S. Appl. No. 16/740,359 dated Sep. 27, 2021 (8 pages).

USPTO Notice of Allowance in U.S. Appl. No. 16/723,468 dated Oct. 18, 2021 (10 pages).

USPTO Notice of Allowance in U.S. Appl. No. 16/723,927 dated Dec. 24, 2021 (13 pages).

USPTO Notice of Allowance in U.S. Appl. No. 16/724,105 dated Nov. 16, 2021 (9 pages).

"Armv8.5-A Memory Tagging Extension White Paper", Oct. 9, 2019, accessed at https://developer.arm.com/-/media/Arm%20Developer%20Community/PDF/Arm_Memory_Tagging_Extension_Whitepaper.pdf, 9 pages.

Avanzi, Roberto, "The QARMA Block Ciper Family, Almost MDS Matrices Over Rings With Zero Divisors, Nearly Symmetric Even-Mansour Constructions With Non-Involutory Central Rounds, and Search Heuristics for Low-Latency S-Boxes," Qualcomm Product Security, Munich Germany, IACR Transactions on Symmetric Cryptology, 2017 (1) (40 pages).

Beaulieu, Ray et al., "Simon and Spec: Block Ciphers for the Internet of Things," National Security Agency, Jul. 2015 (15 pages).

Borghoff, Julia et al., "PRINCE—A Low-Latancy Block Ciper for Pervasive Computing Applications," Advances in Cryptology—ASIACRYPT 2012—18th International Conference on the Theory and Application of Cryptology and Information Security, Beijing, China, Dec. 2-6, 2012. Proceedings (pp. 208-225).

Carr, Scott A. et al., "DataShield: Configurable Data Confidentiality and Integrity," Purdue University, Asia CCS, '17, Apr. 2-6, 2017, Abu Dhabi, United Arab Emirates (12 pages).

Chen, Tony, et al., "Pointer Tagging for Memory Safety", accessed at https://www.microsoft.com/en-us/research/uploads/prod/2019/07/Pointer-Tagging-for-Memory-Safety.pdf, Jul. 2019, 23 pages.

EPO; Extended European Search Report issued in EP Patent Application No. 20163534.9, dated Sep. 24, 2020; 8 pages.

EPO; Extended European Search Report issued in EP Patent Application No. 20163546.3, dated Sep. 28, 2020; 3 pages.

EPO; Extended European Search Report issued in EP Patent Application No. 20163670.1, dated Sep. 29, 2020; 3 pages.

EPO; Extended European Search Report issued in EP Patent Application No. 20163907.7, dated Oct. 6, 2020; 9 pages.

EPO; Extended European Search Report issued in EP Patent Application No. 20164326.9, dated Oct. 2, 2020; 9 pages.

EPO; Extended European Search Report issued in EP Patent Application No. 20164636.1, dated Oct. 6, 2020; 8 pages.

EPO; Extended European Search Report issued in EP Patent Application No. 20168972.6, dated Jul. 3, 2020; 9 pages.

EPO; Extended European Search Report issued in EP Patent Application No. 20181907.5, dated Nov. 2, 2020; 9 pages.

EPO; Extended European Search Report issued in EP Patent Application No. 20193625.9, dated Feb. 22, 2021; 7 pages.

EPO; Extended European Search Report issued in European Patent Application No. EP 20163095.1, dated Aug. 10, 2020; 9 pages.

EPO; Extended European Search Report issued in Patent Application No. EP 20163518.2, dated Aug. 19, 2020; 10 pages.

EPO; Extended European Search Report issued in Patent Application No. EP 20163661.0, dated Aug. 17, 2020; 9 pages.

Liljestrand, Hans, et al., "PAC it up: Towards Pointer Integrity using ARM Pointer Authentication", accessed at https://arxiv.org/pdf/1811.09189.pdf, last updated May 24, 2019, 21 pages.

Neagu, Madalin, et al.; "Increasing Memory Security Through Data Scrambling and Information Entropy Models," 2014 IEEE 15th International Symposium on Computational Intelligence and Informatics; Nov. 2014; 5 pages.

The Electronics Resurgence Initiative, "SSITH: TA1 (Hardware) Performers", accessed at: https://eri-summit.darpa.mil/docs/ERIPoster_Applications_SSITH_DARPA.pdf, Mar. 20, 2020, 1 page.

Watson, Robert N.M., et al., "An Introduction to CHERI", Technical Report UCAM-CL-TR-941, University of Cambridge Computer Labratory, Cambridge, United Kingdom, Sep. 2019, 43 pages.

Xu, Leslie et al., "White Paper, Securing the Enterprise with Intel AES-NI, Intel Advanced Encryption Standard New Instructions (AES-NI)," Intel Corporation, Version, 2.0, Sep. 2010 (13 pages).

"Pointer Authentication on ARMv8.3, Design and Analysis of the New Software Security Instructions," Qualcomm Technologies, Inc., Jan. 2017, retrieved from https://www.qualcomm.com/media/documents/files/whitepaper-pointer-authentication-on-armv8-3.pdf, (12 pages).

"SSITH: TA1 (Hardware) Performers," The Electronics Resurgence Initiative, Dec. 22, 2018, available online at https://eri-summit.darpa.mil/docs/ERIPoster_Applications_SSITH_DARPA.pdf, (1 page).

Bernstein, Daniel J., "Gimli,"Sep. 27, 2019, retrieved from https://csrc.nist.gov/CSRC/media/Projects/lightweight-cryptography/documents/round-2/spec-doc-rnd2/gimli-spec-round2.pdf, (48 pages).

BiiN, "CPU Architecture Reference Manual", accessed at http://bitsavers.informatik.uni-stuttgart.de/pdf/biin/BiiN_CPU_Architecture_Reference_Man_Jul88.pdf, Jul. 1988, 401 pages.

Boivie, Rick, IBM Research Report, SecureBlue++: CPU Support for Secure Execution, May 23, 2012, available online at https://domino.research.IBM.com/library/cyberdig.nsf/papers/E605BDC5439097F085257A13004D25CA/$File/rc25287.pdf, (10 pages).

Dworkin, Morris,"Recommendation for Block Cipher Modes of Operation: The XTS-AES Mode for Confidentiality on Storage Devices," NIST Special Publication 800-38E, Jan. 2010, available online at https://nvlpubs.nist.gov/nistpubs/Legacy/SP/nistspecialpublication800-38e.pdf, (12 pages).

Gallagher, Mark et al., "Morpheus: A Vulnerability-Tolerant Secure Architecture Based on Ensembles of Moving Target Defenses with Churn," ASPLOS '19, Apr. 13-17, 2019, pp. 469-484, available online at https://web.eecs.umich.edu/~barisk/public/morpheus.pdf, (16 pages).

Gallagher, Mark, Slide Deck entitled "Morpheus: A Vulnerability-Tolerant Secure Architecture Based on Ensembles of Moving Target Defenses with Churn," ASPLOS '19, Apr. 13-17, 2019, retrieved from https://twd2.me/wp-content/uploads/2019/05/Morpheus-1.pdf, (45 pages).

Intel 64 and IA-32 Architectures Developer's Manual, vol. 3A: System Programming Guide, Part 1, retrieved from https://www.intel.com/content/www/us/en/architecture-and-technology/64-ia-32-architectures-software-developer-vol-3a-part-1-manual.html, (468 pages).

Intel® 64 and IA-32 Architectures Software Developer's Manual, vol. 2B: Instruction Set Reference, M-U, Sep. 2016, retrieved from https://www.intel.com/content/dam/www/public/us/en/documents/manuals/64-ia-32-architectures-software-developer-vol-2b-manual.pdf, (706 pages).

Intel® 64 and IA-32 Architectures Software Developer's Manual, vol. 3D: System Programming Guide, Part 4, Sep. 2016, 224 pages, retrieved from https://www.intel.com/content/dam/www/public/us/en/documents/manuals/64-ia-32-architectures-software-developer-vol-3d-part-4-manual.pdf, (224 pages).

Liljestrand, Hans et al. "PACStack: an Authenticated Call Stack," Sep. 3, 2019, retrieved from https://arxiv.org/pdf/1905.10242.pdf, (20 pages).

Savry, Olivier, et al., "Intrinsec, an Intrinsically Secure Processor", RISC V Workshop, Dec. 6, 2019, accessed at: http://riscv.org/wp-content/uploads/2019/06/16.15-CEA-RISC-V-Workshop-Zurich.pdf, (15 pages.).

(56) References Cited

OTHER PUBLICATIONS

Serebryany, Kostya, "ARM Memory Tagging Extension and How it Improves C/C++ Memory Safety," Summer 2019, (5 pages).

Watson, Robert N.M., et al., "CHERI: A Hybrid Capability-System Architecture for Scalable Software Compartmentalization", 2015 IEEE Symposium on Security and Privacy, May 2015, accessed at https://discovery.ucl.ac.uk/id/eprint/1470067/1/oakland15cheri.pdf, 18 pages.

Kwon, Albert et al., "Low-Fat Pointers: Compact Encoding and Efficient Gate-Level Implementation of Fat Pointers for Spatial Safety and Capability-based Security," CCS' 13: Proceedings of the 2013 ACM SIGSAC Conference on Computer & Communications Security, Nov. 4-8, 2013, Berlin Germany (12 pages).

Pyo, Changwoo, "Encoding Function Pointers and Memory Arrangement Checking against Buffer Overflow Attack," In Proceedings of the 4th International Conference on Information and Communications Security (ICICS 2002) (12 pages).

USPTO Final Office Action in U.S. Appl. No. 16/720,059 dated Jan. 21, 2022 (20 pages).

USPTO Non-Final Office Action in U.S. Appl. No. 17/134,406 dated Jan. 21, 2022 (11 pages).

USPTO Notice of Allowance in U.S. Appl. No. 16/723,977 dated Feb. 3, 2022 (13 pages).

Yang, Jun et al., "Improving Memory Encryption Performance in Secure Processors," IEEE Transactions on Computers, vol. 54, No. 5, May 2005 (11 pages).

USPTO Notice of Allowance in U.S. Appl. No. 16/724,026 dated Aug. 10, 2022 (10 pages).

USPTO Notice of Allowance in U.S. Appl. No. 16/722,707 dated Mar. 28, 2022 (10 pages).

USPTO Notice of Allowance in U.S. Appl. No. 16/724,105 dated Mar. 31, 2022 (8 pages).

USPTO Notice of Allowance in U.S. Appl. No. 16/740,359 dated Mar. 22, 2022 (9 pages).

USPTO Supplemental Notice of Allowance in U.S. Appl. No. 16/722,707 dated Apr. 8, 2022 (5 pages).

EPO; Extended European Search Report issued in EP Patent Application No. 21195529.9, dated Mar. 1, 2022; 6 pages.

EPO; Extended European Search Report issued in EP Patent Application No. 21196104.0, dated Feb. 15, 2022; 10 pages.

USPTO Non-Final Office Action in U.S. Appl. No. 16/709,612 dated Feb. 17, 2022 (16 pages).

USPTO Non-Final Office Action in U.S. Appl. No. 17/134,405 dated Aug. 1, 2022 (13 pages).

USPTO Notice of Allowance in U.S. Appl. No. 16/776,467 dated Jul. 18, 2022 (10 pages).

USPTO Non-Final Office Action in U.S. Appl. No. 16/723,927 dated Jun. 8, 2021 (32 pages).

USPTO Non-Final Office Action in U.S. Appl. No. 16/724,105 dated Jul. 13, 2021 (10 page).

Andreatos et al., "A comparison of random number sequences for image encryption", Mathematical Methods in Science and Engineering, 2014, pp. 146-151 (Year: 2014) (7 pages).

Nasahl, Pascal et al., "CrypTag: Thwarting Physical and Logical Memory Vulnerabilities using Cryptographically Colored Memory", https://doi .org/10.48550/arXiv.2012.06761, ARXIV ID: 2012.06761, Dec. 12, 2020. (13 pages).

Tuck, Nathan et al., "Hardware and Binary Modification Support for Code Pointer Protection From Buffer Overflow," 37th International Symposium on Microarchitecture (MICRO-37'04), 2004, pp. 209-220 (12 pages).

USPTO Final Office Action in U.S. Appl. No. 16/724,059 dated Sep. 2, 2022 (34 pages).

USPTO Non-Final Office Action in U.S. Appl. No. 16/723,871 dated Nov. 10, 2022 (11 pages).

USPTO Notice of Allowance in U.S. Appl. No. 16/709,612 dated Aug. 23, 2022 (18 pages).

USPTO Notice of Allowance in U.S. Appl. No. 16/709,612 dated Nov. 25, 2022 (10 pages).

USPTO Notice of Allowance in U.S. Appl. No. 16/724,026 dated Dec. 7, 2022 (14 pages).

USPTO Notice of Allowance in U.S. Appl. No. 16/776,467 dated Nov. 9, 2022 (8 pages).

USPTO Notice of Allowance in U.S. Appl. No. 17/134,406 dated Oct. 5, 2022 (10 pages).

Whelihan, David et al., "A Key-Centric Processor Architecture for Secure Computing," 2016 IEEE International Symposium on Hardware Oriented Security and Trust (HOST), 2016, pp. 173-178. (6 pages).

Zhu, Ge et al., "Protection against indirect overflow attacks on pointers," Second IEEE International Information Assurance Workshop, 2004. Proceedings., 2004, pp. 97-106. (10 pages).

USPTO Non-Final Office Action in U.S. Appl. No. 17/576,533 dated Feb. 7, 2023.

USPTO Notice of Allowance in U.S. Appl. No. 17/134,405 dated Jan. 31, 2023 (8 pages).

USPTO Restriction Requirement in U.S. Appl. No. 16/862,022 dated Feb. 2, 2023 (6 pages).

EPO Communication Pursuant to Article 94(3) EPC in EP Application Serial No. 20181907.5-1218 dated Mar. 27, 2023 (6 pages).

U.S. Appl. No. 17/953,186, filed Sep. 26, 2022.

USPTO Final Office Action in U.S. Appl. No. 17/576,533 dated May 30, 2023 (9 pages).

USPTO Non-Final Office Action in U.S. Appl. No. 16/862,022 dated Jun. 20, 2023 (12 pages).

USPTO Non-Final Office Action in U.S. Appl. No. 17/833,515 dated Apr. 14 (23 pages).

USPTO Notice of Allowance in U.S. Appl. No. 16/723,871 dated May 26, 2023 (7 pages).

USPTO Final Office Action in U.S. Appl. No. 17/833,515 dated Sep. 25, 2023 (24 pages).

\* cited by examiner

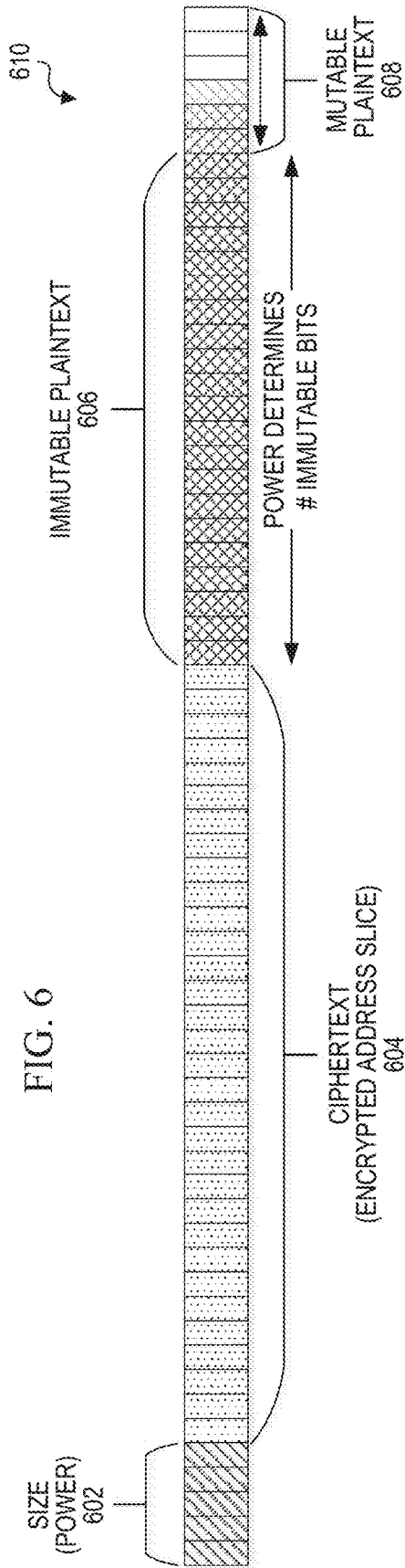
FIG. 6
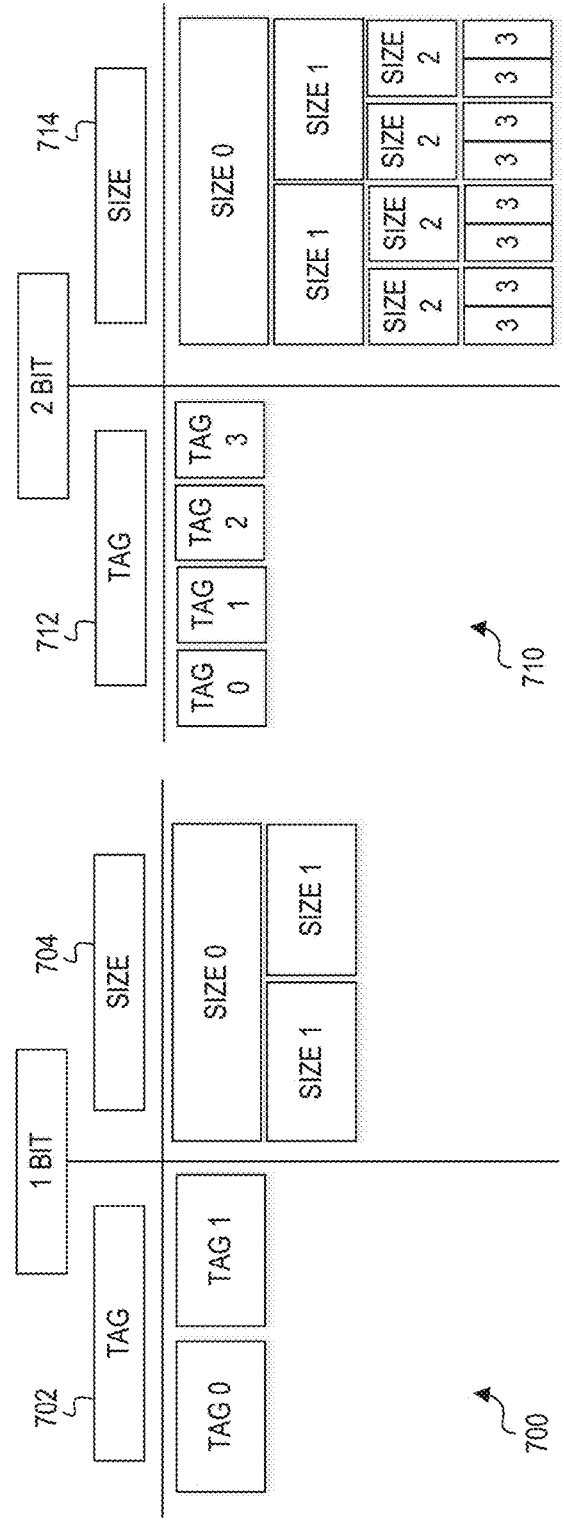
FIG. 7A
FIG. 7B

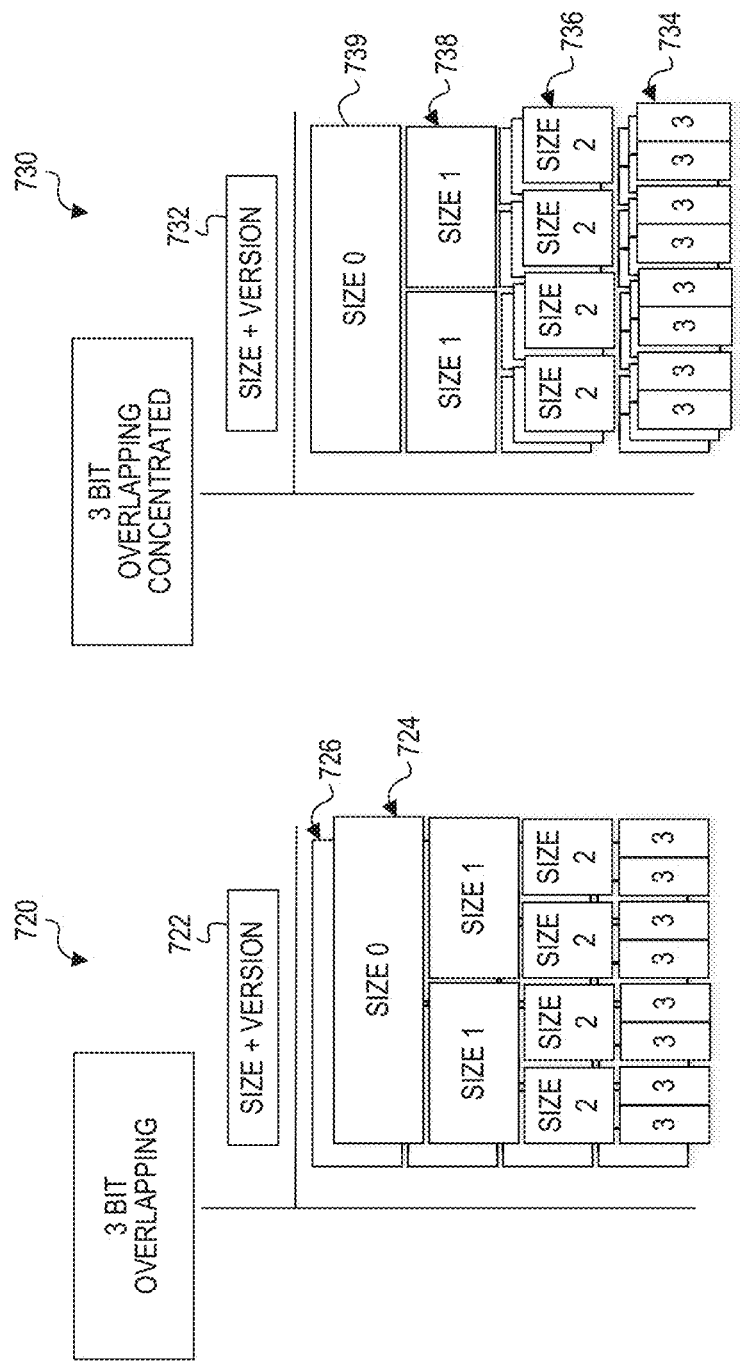

POINTER BASED DATA ENCRYPTION

CROSS REFERENCE TO RELATED APPLICATIONS

This application claims the benefit of priority under 35 U.S.C. § 119 to U.S. Provisional Application No. 62/868,884 filed Jun. 29, 2019 and entitled "Cryptographic Computing". The disclosure of the prior application is considered part of and is hereby incorporated by reference in its entirety in the disclosure of this application.

TECHNICAL FIELD

This disclosure relates in general to the field of computer systems, more particularly, to pointer based data encryption.

BACKGROUND

Protecting memory in computer systems from software bugs and security vulnerabilities is a significant concern. A buffer overflow, which can affect memory safety, occurs when a program writes data to a buffer and overruns a boundary of the buffer such that adjacent memory locations are overwritten. Similarly, reading past the end of a buffer into another page may trigger an access violation or fault. Another memory safety violation is referred to as a dangling pointer. A dangling pointer is a reference that is not resolved to a valid destination. This may occur when memory is deallocated without modifying the value of an existing pointer to the deallocated (or freed) memory. If the system reallocates the freed memory and the dangling pointer is used to access the reallocated memory, unpredictable behavior, including system failure, may occur. Current computing techniques have used architecture and metadata to provide data protection. For example, in previous solutions, a processor would use lookup tables to encode policy or data about the data for ownership, memory size, location, type, version, etc. However, this metadata requires additional storage (memory overhead) and negatively impacts performance, particularly for implementations with fine-grain metadata. Thus, different approaches are needed to provide memory safety to computing systems.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts, in which:

FIG. 6 is a diagram of an example pointer according to at least one embodiment of the present disclosure;

FIGS. 7A-7D are diagrams that graphically represent space allocations for various example size encodings in the pointer of FIG. 6 according to at least one embodiment;

DETAILED DESCRIPTION

Figure 1:
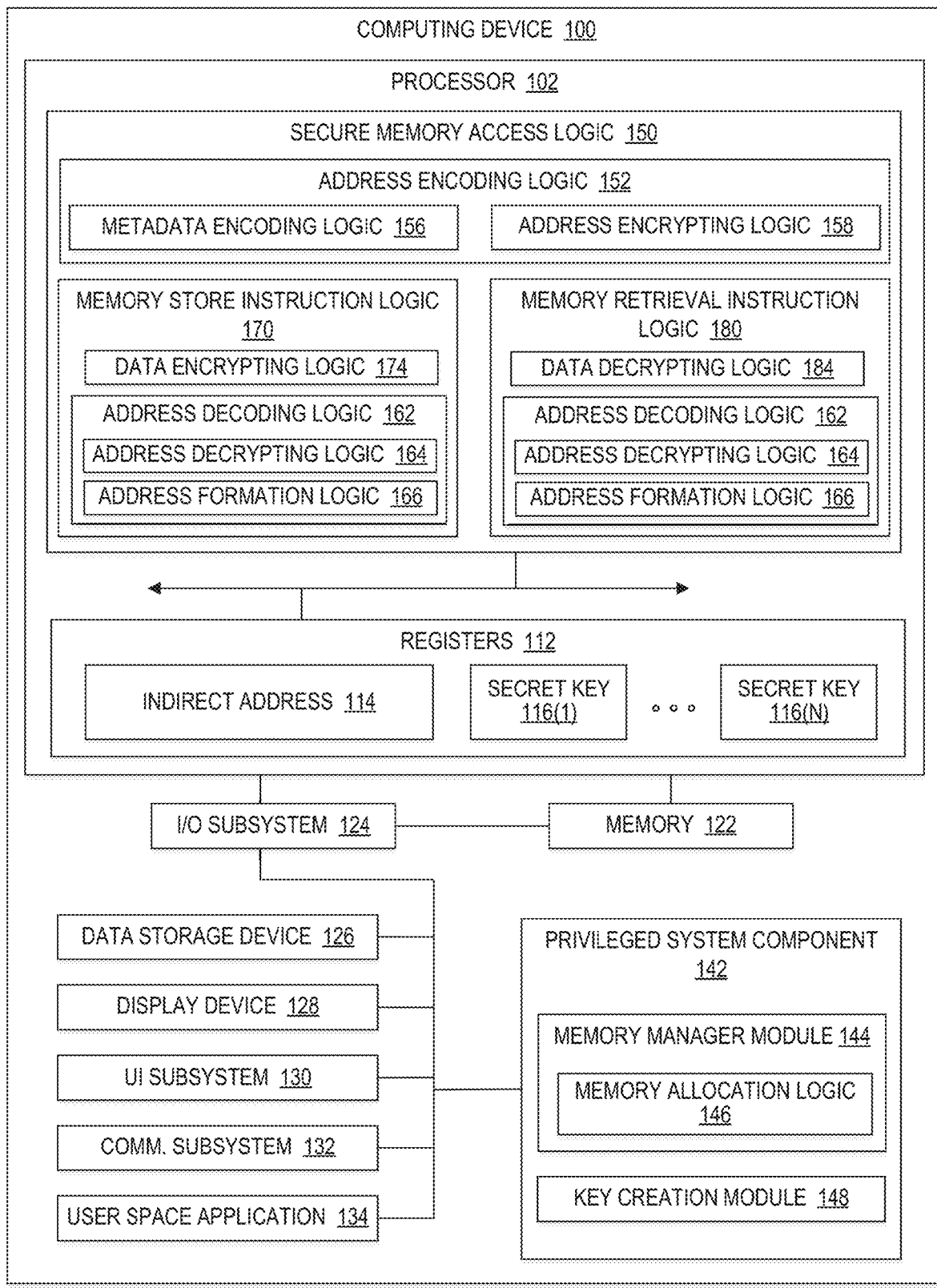
FIG. 1 is a simplified block diagram of an example computing device configured with secure memory access logic according to at least one embodiment of the present disclosure.

The following disclosure provides various possible embodiments, or examples, for implementation of cryptographic computing. Cryptographic computing is an important trend in the computing industry, with the very foundation of computing itself becoming fundamentally cryptographic. Cryptographic computing represents a sea change, a fundamental rethinking of systems security with wide implications for the industry.

Embodiments disclosed in this application are related to pointer based data encryption in which a pointer to a memory location for data is encoded with a tag and/or other metadata and may be used to derive at least a portion of tweak input to data cryptographic (e.g., encryption and decryption) algorithms. Thus, a cryptographic binding is created between the cryptographic addressing layer and data/code encryption and decryption. This implicitly enforces bounds since a pointer that strays beyond the end of an object (e.g., data) is likely to use an incorrect tag value for that adjacent object. In one or more embodiments, a pointer is encoded with a linear address (also referred to herein as "memory address") to a memory location and metadata. A slice or segment of the address in the pointer includes a plurality of bits and is encrypted (and decrypted) based on a secret address key and a tweak that includes the metadata. This encrypted slice of the memory address in the pointer is also referred to herein as "ciphertext" with reference to some embodiments. Binding data encryption and the pointer can be achieved by encrypting the data at the memory location using a pointer-based tweak and secret data key. The pointer-based tweak for encrypting (and decrypting) the data can be derived from the encoded pointer and potentially additional context information. In particular, a pointer-based tweak for data can be created based, at least in part, on the encrypted slice of the address (e.g., the ciphertext) in the encoded pointer and the metadata in the encoded pointer. In other embodiments, the memory address may be decrypted and decoded to create the tweak for encrypting/decrypting the data. In at least some embodiments, context information stored separately from the pointer may also be included in the tweak.

Variations of a different tweak for encrypting and decrypting a slice of the memory address to be embedded in the pointer are possible in one or more embodiments. For example, different and/or additional context information such as various types of metadata, cryptographic context identifier, portions of the plaintext memory address, or any suitable combination thereof may be used in the tweak used to encrypt/decrypt the slice of the memory address in the pointer. Similarly, variations of the tweak for encrypting and decrypting the data referenced by the encoded pointer are also possible. In other embodiments, additional parts of the encoded pointer may be used in the pointer-based tweak or the entire encoded pointer may be used as the pointer-based tweak. Furthermore, in at least some embodiments, different and/or additional context information such as metadata, cryptographic context identifier, slices of the plaintext address, or any suitable combination thereof may also be used in the tweak used to encrypt/decrypt the data referenced by the encoded pointer.

For purposes of illustrating the several embodiments of pointer based data encryption, it is important to first understand the operations and activities associated with data protection and memory safety. Accordingly, the following foundational information may be viewed as a basis from which the present disclosure may be properly explained.

Current computing techniques (e.g., page tables for process/kernel separation, virtual machine managers, managed runtimes, etc.) have used architecture and metadata to provide data protection. For example, in previous solutions, a processor would use lookup tables to encode policy or data about the data for ownership, memory size, location, type, version, etc. Dynamically storing and loading metadata requires additional storage (memory overhead) and impacts performance, particularly for fine grain metadata (such as function as a service (FaaS) workloads or object bounds information).

Cryptographic computing can resolve many of the aforementioned issues (and more). Cryptographic computing may make redundant the legacy modes of process separation, user space, and kernel with a fundamentally new fine-grain protection model. With cryptographic computing, protections are cryptographic, with processors and accelerators alike utilizing secret keys and ciphers to provide access control and separation at increasingly finer granularities. Further, instead of virtual machine and process separation in current systems, with cryptographic computing, individual functions may become the boundary, allowing address spaces to be shared via pointers that are encrypted, with the encrypted pointers and keys providing controlled access down to individual data objects.

Cryptographic computing embodiments disclosed herein may leverage the concept of a cryptographic addressing layer where the processor decrypts software allocated memory addresses (linear/virtual address space, sometimes referred to as "pointers") based on implicit and explicit metadata (e.g., context information, a cryptographic context identifier, etc.) and/or a slice of the memory address itself (e.g., as a tweak to a tweakable block cipher (e.g., XOR-encrypt-XOR-based tweaked-codebook mode with ciphertext stealing (XTS)). As used herein, a "tweak" may refer to, among other things, an extra input to a block cipher, in addition to the usual plaintext or ciphertext input and the key (e.g., secret key 116(1)). A tweak comprises one or more bits that represent a value. In one or more embodiments, a tweak may compose all or part of an initialization vector (IV) for a block cipher. When decryption of an address is performed, if the information used to create the tweak (e.g., implicit and explicit metadata, plaintext address slice of the memory address, etc.) corresponds to the original allocation of the memory address by a memory allocator (e.g., software allocation method), then the processor can correctly decrypt the address. Otherwise, a random address result will cause a fault and get caught by the processor. These cryptographic addresses (or address slices) may be further used by the processor as a tweak to the data encryption cipher used to encrypt/decrypt data they refer to (data referenced by the cryptographically encoded pointer), creating a cryptographic binding between the cryptographic addressing layer and data/code encryption. It should be noted that a tweak that is used as input to a block cipher to encrypt/decrypt a memory address is also referred to herein as an "address tweak". Similarly, a tweak that is used as input to a block cipher to encrypt/decrypt data is also referred to herein as a "data tweak".

By cryptographically encoding metadata into addresses and their referenced data, cryptographic computing may reduce or remove the need for extra separate memory/storage to provide policy and context information/metadata. This can save up to billions of dollars in the computing industry (e.g., in dynamic random access memory (DRAM) expenses) due to the reduction of metadata alone. Customers can reap these savings in memory costs while still getting the security, safety and error-free functionality they want with cryptographic computing. By allowing safe speculation, the fundamentally cryptographic separation policies of cryptographic computing may allow the processor to speculate freely and provide increased performance.

In cryptographic computing, where data security is fundamentally linked to cryptographic memory addressing, processing and fine grain cryptographic access controls to data are important. Cryptographic computing transforms all compute vectors from the CPU to GPU, accelerators to FPGAs, etc. With cryptographic computing, protections may be cryptographic, where processors and accelerators alike utilize secret keys and ciphers to provide access control and separation at increasingly fine granularities. Further, instead of virtual machine and process separation, individual functions may become the boundary, address spaces are shared while pointers are encrypted, with keys providing controlled access down to individual data objects. Capabilities may thus become entwined in the cryptographic operations to provide granular access control to data objects while preventing buffer overflows, type confusion and temporal (e.g. use-after-free) vulnerabilities at every level of the system. Cryptographic code may execute natively, safely, and without the need for interpreters or managed runtimes to provide memory and type safety. Memory may move from isolated domains and containers to globally shared memory models where data is accessible based on cryptographic access control mechanisms and gone are difficult-to-scale distributed permissions, paging and associated control structures. Even files may be safely stored directly in memory (e.g., in non-volatile memory modules, such as non-volatile dual-inline memory modules (NVDIMMs)), being individually encrypted, cryptographically sized, and incorruptible from software errors. This may have implications for functional safety, reliability, and multi-tenancy, potentially allowing for more speculation for improving processing performance.

Cryptography continues to become faster and lighter. For instance, the Advanced Encryption Standard (AES) has been the mainstay for data encryption for decades, using a 128 bit block cipher. Meanwhile, memory addressing is typically 64 bits today. Although embodiments herein may be illustrated and explained with reference to 64-bit memory addressing for 64 computers, the disclosed embodiments are not intended to be so limited and can easily be adapted to accommodate 32 bits, 128 bits, or any other available bit sizes for pointers. Likewise, embodiments herein may further be adapted to accommodate various sizes of a block cipher (e.g., 64 bit, 48 bit, 32 bit, 16 bit, etc. using Simon, Speck, tweakable K-cipher, PRINCE or any other block cipher).

Lightweight ciphers suitable for pointer encryption have emerged recently. The PRINCE cipher, for example, can be implemented in 3 clocks requiring as little as 799 $\mu m^2$ of area in the 10 nm process, providing half the latency of AES in a tenth the Silicon area. Cryptographic computing may utilize these new ciphers, as well as others, introducing novel computer architecture concepts including, but not limited to: (i) cryptographic addressing, i.e., the encryption of data pointers at the processor using, as tweaks, contextual information about the referenced data (e.g., metadata embedded in the pointer and/or external metadata), a slice of the address itself, or any suitable combination thereof; and (ii) encryption of the data itself at the core, using cryptographically encoded pointers or portions thereof, non-cryptographically encoded pointers or portion(s) thereof, contextual information about the reference data, or any suitable combination thereof as tweaks for the data encryption. A variety of encryption modes that are tweakable can be used for this purpose of including metadata (e.g. counter mode (CTR) and XOR-encrypt-XOR (XEX)-based tweaked-codebook mode with ciphertext stealing (XTS)). In addition to encryption providing data confidentiality, its implicit integrity may allow the processor to determine if the data is being properly decrypted using the correct keystream and tweak. In some block cipher encryption modes, the block cipher creates a keystream, which is then combined (e.g., using XOR operation) with an input block to produce the encrypted or decrypted block. In some block ciphers, the keystream is fed into the next block cipher to perform encryption or decryption.

The "Metadata Wall" may refer to the problem of additionally fetching metadata about memory operations such as access control, object type/size, and version. Today's computer architecture requires the processor to lookup metadata, or data about data, to determine if memory accesses are allowed. The additional memory accesses for metadata can impact performance, additional storage for the metadata is required, and the metadata itself needs to be protected in order to provide security. Some current solutions that add metadata in the form of bounds tables that the hardware would use to detect buffer overflows have been shown to have up to 4× performance impact with 400% memory overheads for some workloads. Similarly, shadow stack metadata enables Control-flow Enforcement Technology, and memory tagging uses metadata for versioning and capabilities add metadata for verifying data types. Memory tagging is not suitable for mitigating type confusion and protecting against uninitialized use variables. In addition, although the overhead of memory tagging may be reduced using error-correcting code bits, it can nevertheless require additional devices, which can increase costs. Capability machines may also use fat pointers to embed security metadata in-line with pointers, imposing substantial memory overheads (e.g., 25% in pointer heavy applications) due to doubling the pointer size.

In contrast, cryptographic computing may provide metadata codified as tweaks to cryptographic addressing and data, cryptographic addressing and code, or a combination thereof, removing potential performance and memory overheads caused by the inclusion of such metadata. The resulting ciphertext may need no additional protections beyond the secret key, allowing reuse of the same memory as the data. As further discussed herein, cryptographic computing may solve a myriad of vulnerabilities with the same unified mechanism, using computation instead of memory.

FIG. 1 is a simplified block diagram of an example computing device 100 configured with secure memory access logic according to at least one embodiment of the present disclosure. In the example shown, the computing device 100 includes a processor 102 having a set of secure memory access logic 150 and a number of registers 112. The secure memory access logic 150 utilizes metadata about an indirect address 114, which is encoded into unused bits of the indirect address 114 (e.g., non-canonical bits of a 64-bit address, or a range of addresses set aside, e.g., by the operating system, such that the corresponding high order bits of the address range may be used to store the metadata), in order to secure and/or provide access control to memory locations pointed to by the indirect address 114. For example, the metadata encoding and decoding provided by the secure memory access logic 150 can prevent the indirect address 114 from being manipulated to cause a buffer overflow, and/or can prevent program code from accessing memory that it does not have permission to access. Address encoding logic 152 of the secure memory access logic 150 is invoked when memory is allocated (e.g., by an operating system, in the heap) and provided to executing programs in any of a number of different ways, including by using a function such as malloc, alloc, or new; or implicitly via the loader, or statically allocating memory by the compiler, etc. As a result, the indirect address 114, which points to the allocated memory, is encoded with the address metadata.

The address metadata can include valid range metadata. The valid range metadata allows executing programs to manipulate the value of the indirect address 114 within a valid range, but will corrupt the indirect address 114 if the memory is accessed using the indirect address 114 beyond the valid range. Alternatively or in addition, the valid range metadata can be used to identify a valid code range, e.g., a range of memory that program code is permitted to access (e.g. the encoded range information can be used to set explicit ranges on registers). Other information that can be encoded in the address metadata includes access (or permission) restrictions on the indirect address 114 (e.g., whether the indirect address 114 can be used to write, execute, or read the referenced memory).

In at least some other embodiments that will be further described herein, other metadata (or context information) can be encoded in the unused bits of indirect address 114 such as a size of plaintext address slices (e.g., number of bits in a plaintext slice of a memory address embedded in the indirect address), a memory allocation size (e.g., bytes of allocated memory referenced by the indirect address), a type of the data or code (e.g., class of data or code defined by programming language), permissions (e.g., read, write, and execute permissions of the indirect address), a location of the data or code (e.g., where the data or code is stored), the memory location where the pointer itself is to be stored, an ownership of the data or code, a version of the indirect address (e.g., a sequential number that is incremented each time an indirect address is created for newly allocated memory, determines current ownership of the referenced allocated memory in time), a tag of randomized bits (e.g., generated for association with the indirect address), a privilege level (e.g., user or supervisor), a cryptographic context identifier (or crypto context ID) (e.g., randomized or deterministically unique value for each indirect address), etc. For example, in one embodiment, the address metadata can include size metadata that encodes the size of a plaintext address slice in the indirect address. The size metadata may specify a number of lowest order bits in the indirect address that can be modified by the executing program. The size metadata is dependent on the amount of memory requested by a program. Accordingly, if 16 bytes are requested, then size metadata is encoded as 4 (or 00100 in five upper bits of the pointer) and the 4 lowest bits of the pointer are designated as modifiable bits to allow addressing to the requested 16 bytes of memory. In some embodiments, the address metadata may include a tag of randomized bits associated with the indirect address to make the tag unpredictable for an adversary. An adversary may try to guess the tag value so that the adversary is able to access the memory referenced by the pointer, and randomizing the tag value may make it less likely that the adversary will successfully guess the value compared to a deterministic approach for generating the tag value. In some embodiments, the pointer may include a version number (or other deterministically different value) determining current ownership of the referenced allocated data in time instead of or in addition to a randomized tag value. Even if an adversary is able to guess the current tag value or version number for a region of memory, e.g., because the algorithm for generating the version numbers is predictable, the adversary may still be unable to correctly generate the corresponding encrypted portion of the pointer due to the adversary not having access to the key that will later be used to decrypt that portion of the pointer.

Address decoding logic 162 verifies the encoded metadata on memory read and write operations that utilize processor instructions such as MOV, where a general purpose register is used as a memory address to read a value from memory (e.g., load) or to write a value to memory (e.g., store), as well as on other operations that involve the "use" of memory (such as arithmetic instructions with memory operands, e.g. ADD, and control transfer instructions, e.g. CALL/JMP etc.). These are considered memory operands, which may specify a location in memory at which the destination address for the control transfer is stored. The example secure memory access logic 150 is embodied as part of processor instructions (e.g., as part of the processor instruction set architecture), or microcode (e.g., instructions that are stored in read-only memory and executed directly by the processor 102). In other embodiments, portions of the secure memory access logic 150 may be embodied as hardware, firmware, software, or a combination thereof (e.g., as programming code executed by a privileged system component 142 of the computing device 100). For example, the secure memory access logic 150 may be embodied in software as an instruction set emulator (e.g., a binary instrumentation tool such as a PIN Tool) that emulates the instruction logic utilizing the encoded addresses as disclosed herein.

The secure memory access logic 150 is executable by the computing device 100 to provide security for indirect addresses "inline," e.g., during execution of a program (such as a user space software application) by the computing device 100. As used herein, the terms "indirect address" and "pointer" may each refer to, among other things, an address (e.g. virtual address or linear address) of a memory location at which other data or instructions are stored. In an example, a register that stores an encoded memory address of a memory location where data or code is stored may act as a pointer. As such, the indirect address 114 may be embodied as, for example, a data pointer (which refers to a location of data), a code pointer (which refers to a location of executable code), an instruction pointer, or a stack pointer. Indirect addresses may be referred to by other terminology, such as "pointer," "address pointer," or "pointer address." As used herein, "metadata" may refer to, among other things, information about or relating to an indirect address 114, such as a valid data range, a valid code range, pointer access permissions, a size of plaintext address slice (e.g., encoded as a power in bits), a memory allocation size, a type of the data or code, a location of the data or code, an ownership of the data or code, a version of the indirect address, a tag of randomized bits, version, a privilege level of software, a cryptographic context identifier, etc.

As used herein, "memory retrieval instruction" may refer to, among other things, a "MOV" or "LOAD" instruction or any other instruction that causes data to be read, copied, or otherwise accessed at one storage location, e.g., memory, and moved into another storage location, e.g., registers (where "memory" may refer to main memory or cache, e.g., a form of random access memory, and "register" may refer to a processor register, e.g., hardware), or any instruction that accesses or manipulates memory. Also as used herein, "memory store instruction" may refer to, among other things, a "MOV" or "STORE" instruction or any other instruction that causes data to be read, copied, or otherwise accessed at one storage location, e.g., register, and moved into another storage location, e.g., memory, or any instruction that accesses or manipulates memory.

However, the indirect address encoding/decoding technology disclosed herein is not limited to MOV or load/store instructions. For example, control transfer instructions such as call and jump instructions can be adapted to handle encoded indirect addresses in a similar manner as described herein with respect to MOV instructions, wherein code is to execute within a valid address range. Likewise, the instruction pointer (e.g., register) may be range bound given the encoded address specified by the control transfer instruction (e.g. JMP/CALL) results in an encoded address being used for the instruction pointer, thus restricting valid program execution to within a valid address range (effectively, the program counter can increment correctly until it reaches the end of the encoded range). Furthermore, in some architectures, any number of processor instructions may have a memory operand in the form of an indirect address (e.g. arithmetic operations such as ADD, SUB, MUL, AND, OR, XOR, etc. may have a source/destination memory reference in the form of an indirect address and/or a source/destination register operand). In other architectures, however, the format of memory operands may vary. For example, registers may be combined in some way (e.g., by addition) to produce an effective address. Additionally, other parameters may optionally be included, such as a scaling factor that multiplies one of the register values (e.g., the index) and/or a constant displacement value embedded in the instruction that is directly added. Further, it should be noted that while the illustrative embodiments refer to "instructions," such instructions may be embodied as, e.g., processor instructions, operating system routines, or other forms of computer program code.

The example secure memory access logic 150 includes address encoding logic 152 (which includes metadata encoding logic 156 and address encrypting logic 158), memory store instruction logic 170 (which includes data encrypting logic 174 and address decoding logic 162), and memory retrieval instruction logic 180 (which includes data decrypting logic 184 and address decoding logic 162). Illustratively, the address decoding logic 162, which includes address decrypting logic 164 and address formation logic 166, is embodied in memory store instruction logic 170 and memory retrieval instruction logic 180, but may be embodied in other processor instructions, or as a separate instruction or series of instructions, or as higher-level code executed by a privileged system component such as an operating system kernel or virtual machine monitor, or as an instruction set emulator. As described in more detail below, the address encoding logic 152 and the address decoding logic 162 each operate on an indirect address 114 using metadata (e.g., one or more of valid range, permission metadata, size (power), memory allocation size, type, location, ownership, version, tag value, privilege level (e.g., user or supervisor), crypto context ID, etc.) and a secret key (e.g., secret key 116(1)), in order to secure the indirect address 114 at the memory allocation/access level. Also as described in more detail below, the data encrypting logic 174 and data decrypting logic 184 each operate on data (referenced by indirect address 114) using at least a portion of the indirect address and a secret key (e.g., secret key 116(2)), in order to secure the data at the memory location referenced by the indirect address 114 by binding the data encryption to the indirect address.

The example indirect address 114 is embodied as a register 112 (e.g., a general purpose register of the processor 102). The example secret keys 116(1)-116(N) may be generated by a key creation module 148 of a privileged system component 142, and stored in one of the registers 112 (e.g., a special purpose register or machine specific register (MSR)), or another memory location that is readable by the processor 102. In some embodiments, the secret keys 116(1)-116(N) may be stored in a location that is readable only by the processor. In other embodiments, the secret keys 116(1)-116(N) used to secure indirect addresses, data, and code can be stored in another memory location, such as in firmware, in a secure portion of the data storage device 126 or another data storage device, or another form of memory suitable for performing the functions described herein. In some embodiments, the secret keys 116(1)-116(N) may be transmitted across a secure communications channel and restored by an executive (such as an operating system or a virtual machine monitor, e.g., the privileged system component 142 described below). In virtualized environments in which virtual machines are migrated from one machine to another, and/or in cases in which a virtual machine, process or program running on the computing device 100 begins a sleeping/hibernating mode after an indirect address and the referenced data and/or code are secured using secret keys, and then later resumes, the secret keys will need to be recovered and restored. In these cases, the secret keys can be stored or possibly transmitted across a (secure) communications channel prior to a sleeping/hibernating mode, and then retrieved/restored by an executive (such as an operating system or a virtual machine monitor, e.g., the privileged system component 142).

It should be noted that embodiments described herein allow for any number of secret keys to be used for a particular program. In one example, the same secret key may be used for all indirect addresses used in a program. In another example, a different secret key may be used for each indirect address associated with a different memory allocation or for each predefined group of memory addresses associated with different memory allocations. In yet further embodiments, the same secret key used for an address encryption/decryption may also be used for encrypting the data bound to that address. In other embodiments, one secret key may be used for address encryption/decryption, while a different secret key may be used for data encryption/decryption bound to that address. For ease of explanation, embodiments further described herein refer to "secret address key" or "address key" to refer to the use of a secret key in encryption and decryption operations of memory addresses and "secret data key" or "data key" to refer to the use of a secret key in operations to encrypt and decrypt data.

On (or during) a memory allocation operation (e.g., a "malloc"), memory allocation logic 146 allocates a range of memory for a buffer and returns the indirect address 114 and the metadata (e.g., one or more of range, permission metadata, size (power), memory allocation size, type, location, ownership, version, tag, privilege level, crypto context ID, etc.). For example, the memory allocation logic 146 may encode plaintext range information in the indirect address 114 (e.g., in the unused/non-canonical bits, prior to encryption), or supply the metadata as one or more separate parameters to the instruction, where the parameter(s) specify the range, code permission information, size (power), memory allocation size, type, location, ownership, version, tag, privilege level (e.g., user or supervisor), crypto context ID, or some suitable combination thereof. Illustratively, the memory allocation logic 146 is embodied in a memory manager module 144 of the privileged system component 142. The memory allocation logic 146 initiates the address encoding logic 152. The address encoding logic 152 includes metadata encoding logic 156, which encodes the indirect address 114 with the metadata (e.g., range, permission metadata, size (power), memory allocation size, type, location, ownership, version, tag value, privilege level, crypto context ID, some suitable combination thereof, etc.) and potentially an "adjustment," for example if range metadata is encoded, as described below. The address encoding logic 152 stores the metadata in an unused portion of the indirect address 114 (e.g., non-canonical bits of a 64-bit address). For some metadata or combinations of metadata, the indirect address 114 may be encoded in a larger address space (e.g., 128-bit address, 256-bit address) to accommodate the size of the metadata or combination of metadata.

To determine valid range metadata, example range rule logic selects the valid range metadata to indicate an upper limit for the size of the buffer referenced by the indirect address 114. Address adjustment logic adjusts the valid range metadata as needed so that the upper address bits (e.g., most significant bits) of the addresses in the address range do not change as long as the indirect address 114 refers to a memory location that is within the valid range indicated by the range metadata. This enables the indirect address 114 to be manipulated (e.g., by software performing arithmetic operations, etc.) but only so long as the manipulations do not cause the indirect address 114 to go outside the valid range (e.g., overflow the buffer).

In an embodiment, address encoding logic 152 uses the valid range metadata to select a portion (or slice) of the indirect address 114 to be encrypted. In other embodiments, the slice of the indirect address 114 to be encrypted may be known a priori (e.g., upper 32 bits, lower 32 bits, etc.). The address encrypting logic 158 encrypts the selected slice of the indirect address 114 (and the adjustment, in some embodiments), using the secret address key 116(1) and an address tweak, as described further below. On a memory access operation (e.g., a read, write, or execute operation), the address decoding logic 162 decodes the previously-encoded indirect address 114. To do this, the address decrypting logic 164 decrypts the encrypted slice of the indirect address 114 (and in some embodiments, the encrypted adjustment) using the secret key 116(1) and the address tweak, as described further below.

The indirect address 114 is returned to its original (e.g., canonical) form, based on appropriate operations (e.g. address formation logic 166) in order to restore the original value of the indirect address 114 (e.g., the true, original linear memory address). To do this in at least one possible embodiment, the address formation logic 166 may remove the address metadata encoded in the unused bits of the indirect address 114, e.g., return the unused bits to their original form). If the indirect address 114 decodes successfully, the memory access operation completes successfully. However, if the encoded indirect address 114 has been manipulated (e.g., by software, inadvertently or by an attacker) so that its value falls outside the valid range indicated by the range metadata (e.g., overflows the buffer), the indirect address 114 will be corrupted as a result of the decrypting process performed by the address decrypting logic 164. A corrupted indirect address will raise a fault (e.g., a general protection fault or a Page Fault if the address is not mapped as present from the paging structures/page tables). One condition that may lead to a fault being generated is a sparse address space. In this scenario, a corrupted address is likely to land on an unmapped page and generate a page fault. In this way, the secure memory access logic 150 enables the computing device 100 to provide indirect address security against buffer overflow attacks and similar exploits. Embodiments of the indirect address security technologies disclosed herein can also be used for software debugging purposes or as an access control mechanism to prevent software from accessing areas of memory for which the software does not have permission. Additionally, in comparison to other buffer overflow mitigation techniques, embodiments of the disclosed indirect address security technologies can operate without any additional memory reads/writes, or without any additional instructions, or without any binary modifications, or without the need to recompile legacy code. Moreover, embodiments of the disclosed technologies are responsive to adversaries that can read memory and overwrite pointer values, as well as adversaries that can create/select arbitrary pointer values. Further, embodiments of the disclosed technologies can scale from very small memory ranges to very large memory ranges, or can cascade memory ranges within other memory ranges by using different encoded pointers. Still further, embodiments of the disclosed technologies are effective with dynamic memory allocation (e.g., due to the ability to programmatically create range encoded pointers inline). Additionally, embodiments of the disclosed technologies can be extended to provide code block (code location) access controls to data. Further, embodiments of the disclosed technologies are compatible with 64-bit versions of the x86 instruction set, as well as ARM, MIPS, PowerPC and other processor architectures, including wider (e.g., greater than 64-bit) address bit architectures and smaller (e.g. 32-bit) architectures by reserving address ranges for the metadata containing addresses.

Some embodiments of the disclosed technologies utilize aspects of address adjustment logic and address restoration logic to support legacy code compatibility, as described below. As used herein, "legacy code" may refer to a version of computer code that was designed to work on an earlier, or now-obsolete, or no-longer-supported computer architecture. For example, legacy code may include software that was originally developed for a 32-bit processor, but which is now running on a 64-bit processor. "Legacy code" also refers to a version of computer code designed without using or being adapted to use dedicated instructions for encoding and encrypting indirect addresses as described herein. At least some embodiments disclosed herein can be implemented without using new program instructions and accordingly, without the need for recompiling legacy code.

Referring now in more detail to FIG. 1, the computing device 100 may be embodied as any type of electronic device for performing the functions described herein. For example, the computing device 100 may be embodied as, without limitation, a smart phone, a tablet computer, a wearable computing device, a laptop computer, a notebook computer, a mobile computing device, a cellular telephone, a handset, a messaging device, a vehicle telematics device, a server computer, a workstation, a distributed computing system, a multiprocessor system, a consumer electronic device, and/or any other computing device configured to perform the functions described herein. As shown in FIG. 1, the example computing device 100 includes at least one processor 102 embodied with the secure memory access logic 150.

The computing device 100 also includes memory 122, an input/output subsystem 124, a data storage device 126, a display device 128, a user interface (UI) subsystem 130, a communication subsystem 132, at least one user space application 134, and the privileged system component 142 (which, illustratively, includes the memory manager module 144 and the key creation module 148). The computing device 100 may include other or additional components, such as those commonly found in a mobile and/or stationary computers (e.g., various sensors and input/output devices), in other embodiments. Additionally, in some embodiments, one or more of the example components may be incorporated in, or otherwise form a portion of, another component. Each of the components of the computing device 100 may be embodied as software, firmware, hardware, or a combination of software and hardware.

The processor 102 may be embodied as any type of processor capable of performing the functions described herein. For example, the processor 102 may be embodied as a multi-core processor, other multiple-CPU processor or processing/controlling circuit, or multiple diverse processing units or circuits (e.g., CPU and GPU, etc.). The processor 102 has a number of registers 112, which include general purpose registers and special purpose registers. The indirect address 114 and the secret keys 116(1)-116(N) are stored in registers 112. The memory 122 of the computing device 100 may be embodied as any type of volatile or non-volatile memory or data storage capable of performing the functions described herein. In operation, the memory 122 may store various data and software used during operation of the computing device 100, as well as operating systems, applications, programs, libraries, and drivers.

The memory 122 is communicatively coupled to the processor 102, e.g., via the I/O subsystem 124. The I/O subsystem 124 may be embodied as circuitry and/or components to facilitate input/output operations with the processor 102, the memory 122, and other components of the computing device 100. For example, the I/O subsystem 124 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 102, the memory 122, and/or other components of the computing device 100, on a single integrated circuit chip.

The data storage device 126 may be embodied as any type of physical device or devices configured for short-term or long-term storage of data such as, for example, memory devices and circuits, memory cards, hard disk drives, solid-state drives, flash memory or other read-only memory, memory devices that are combinations of read-only memory and random access memory, or other data storage devices.

The display device 128 may be embodied as any type of display capable of displaying digital information such as a liquid crystal display (LCD), a light emitting diode (LED), a plasma display, a cathode ray tube (CRT), or other type of display device. In some embodiments, the display device 128 may be coupled to a touch screen or other human computer interface device to allow user interaction with the computing device 100. The display device 128 may be part of the user interface (UI) subsystem 130. The user interface subsystem 130 may include a number of additional devices to facilitate user interaction with the computing device 100, including physical or virtual control buttons or keys, a microphone, a speaker, a unidirectional or bidirectional still and/or video camera, and/or others. The user interface subsystem 130 may also include devices, such as motion sensors, proximity sensors, and eye tracking devices, which may be configured to detect, capture, and process various other forms of human interactions involving the computing device 100.

The computing device 100 further includes a communication subsystem 132, which may be embodied as any communication circuit, device, or collection thereof, capable of enabling communications between the computing device 100 and other electronic devices. The communication subsystem 132 may be configured to use any one or more communication technology (e.g., wireless or wired communications) and associated protocols (e.g., Ethernet, Bluetooth™, Wi-Fi™, WiMAX, 3G/LTE, etc.) to effect such communication. The communication subsystem 132 may be embodied as a network adapter, including a wireless network adapter.

The example computing device 100 also includes a number of computer program components, such as the user space application 134 and the privileged system component 142. The user space application 134 may be embodied as any computer application (e.g., software, firmware, hardware, or a combination thereof) that interacts directly or indirectly with an end user via, for example, the display device 128 or the UI subsystem 130. Some examples of user space applications 134 include word processing programs, document viewers/readers, web browsers, electronic mail programs, messaging services, computer games, camera and video applications, etc. Among other things, the privileged system component 142 facilitates the communication between the user space applications 134 and the hardware components of the computing device 100. Portions of the privileged system component 142 may be embodied as any operating system capable of performing the functions described herein, such as a version of WINDOWS by Microsoft Corporation, ANDROID by Google, Inc., and/or others. Alternatively or in addition, a portion of the privileged system component 142 may be embodied as any type of virtual machine monitor capable of performing the functions described herein (e.g., a type I or type II hypervisor).

The example privileged system component 142 includes a number of computer program components, such as the memory manager module 144 and the key creation module 148. Each of the components of the privileged system component 142 may be embodied as software, firmware, hardware, or a combination of software and hardware. For example, the components of the privileged system component 142 may be embodied as modules of an operating system kernel, a virtual machine monitor, or a hypervisor. The memory manager module 144 allocates portions of memory 122 to the various processes running on the computing device 100 (e.g., as ranges of virtual memory addresses). The memory manager module 144 is embodied as, for example, a loader, a memory manager service, or a heap management service. The key creation module 148 creates the secret keys 116(1)-116(N) (e.g., secret address keys and secret data keys) and writes them to a register or registers to which the processor 102 has read access (e.g., a special purpose register). To create a secret key, the key creation module 148 may execute, for example, a random number generator or another algorithm capable of generating a secret key that can perform the functions described herein.

It should be noted that a myriad of approaches could be used to generate or obtain a key for embodiments disclosed herein. For example, although the key creation module 148 is shown as being part of computing device 100, one or more secret keys could be obtained from any suitable external source using any suitable authentication processes to securely communicate the key to computing device 100, which may include generating the key as part of those processes. Furthermore, privileged system component 142 may be part of a trusted execution environment (TEE), virtual machine, processor 102, a co-processor (not shown), or any other suitable hardware, firmware, or software in computing device 100 or securely connected to computing device 100. Moreover, the key may be "secret", which is intended to mean that its value is kept hidden, inaccessible, obfuscated, or otherwise secured from unauthorized actors (e.g., software, firmware, machines, extraneous hardware components, and humans).

Figure 2:
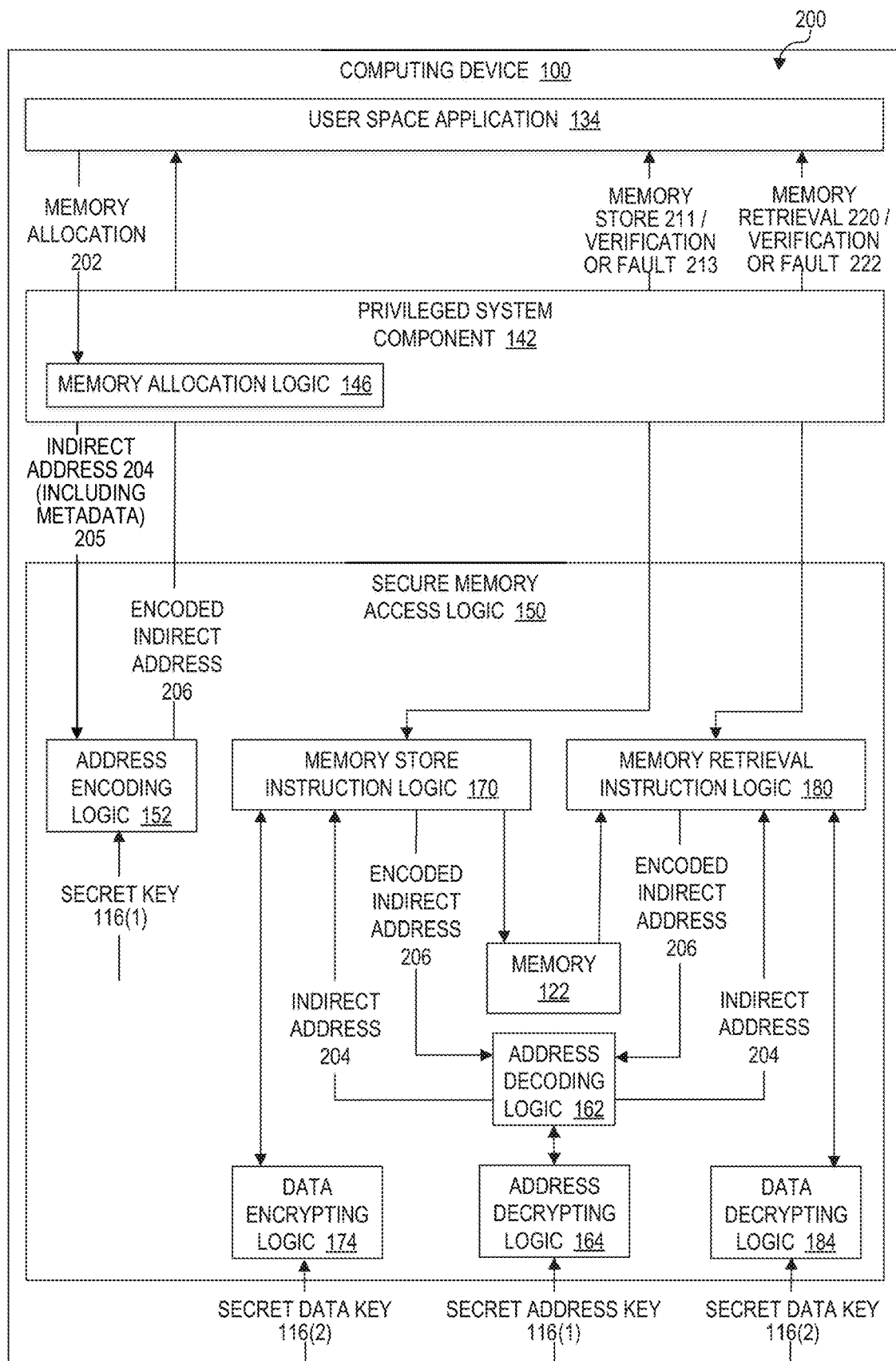
FIG. 2 is a simplified environment diagram illustrating an application of the secure memory access logic of FIG. 1 according to at least one embodiment of the present disclosure.

FIG. 2 is a simplified environment diagram illustrating an application of the secure memory access logic of FIG. 1 according to at least one embodiment of the present disclosure. In some embodiments, the computing device 100 may establish an environment 200 during operation (e.g., native and/or virtual runtime or "execution" environments). The various modules depicted in the example environment 200 may be embodied as hardware, firmware, software, or a combination thereof. In the environment 200, the user space application 134 (or the privileged system component 142, e.g., in loading a user space application 134) may, from time to time, during the operation of the computing device 100, issue a memory allocation 202. The memory allocation 202 may be translated (e.g., compiled or interpreted), as needed, by the memory allocation logic 146 of the privileged system component 142 before being passed on to the processor 102. In the processor 102, the address encoding logic 152 is executed in response to the memory allocation 202 (e.g., in place of a conventional "malloc" instruction/function call). Whereas a conventional malloc instruction simply allocates memory and returns an (unsecured) pointer, the address encoding logic 152 encodes an indirect address 204, including metadata 205 (e.g., the range permission information, size (power), memory allocation size, type, location, ownership, version, tag, privilege level, crypto context ID or key, or any combination thereof, etc.), as described herein, and returns an encoded indirect address 206. The metadata may be embedded in the indirect address or pointer (e.g., a standard 64-bit register or enlarged register such as 128 bits or 256 bits to fit more metadata) in a plaintext format, embedded within another operand that is provided to the pointer encryption/decryption instructions and data access instructions, stored in a control register, stored in a table in memory, or provided via any combination thereof. For example, the size (power) metadata and tag value may be embedded in the pointer and the crypto context ID may be stored in a control register.

Similarly, the user space application 134 or the privileged system component 142 may issue a memory store 211 from time to time, which may be handled by the processor 102 as a processor instruction that reads from a register 112 (or other storage unit) and writes to memory 122 or cache using indirect address 114 (e.g. a STORE, MOV instruction). Using the STORE instruction as an example, the memory store instruction logic 170 stores data only after successfully executing address decoding logic 162 to decode the encoded indirect address 206 and also successfully executing data encrypting logic 174 based on a data tweak and secret data key 116(2) to encrypt the data to be stored at a memory location pointed to by the indirect address 204. Successful execution of address decoding logic 162 is based on successful execution of address decrypting logic 164, which uses an address tweak and secret address key 116(1) to decrypt the encrypted address slice of the encoded indirect address 206.

Similarly, the user space application 134 or the privileged system component 142 may issue a memory load 220 from time to time, which may be handled by the processor 102 as a processor instruction that reads from memory 122 and writes to a register 112 using an indirect address 114 (e.g. a LOAD, MOV instruction). Using the LOAD instruction as an example, the memory retrieval instruction logic 180 performs the memory access only after successfully executing the address decoding logic 162 to decode the encoded indirect address 206. Successful execution of address decoding logic 162 is based on successful execution of address decrypting logic 164, which uses an address tweak and secret address key 116(1) to decrypt the encrypted address slice of the encoded indirect address 206. Once the indirect address 204 is returned and memory 122 is accessed to load data from the memory location pointed to by the indirect address 204, the loaded data may be decrypted by executing the data decrypting logic 184 based on a data tweak and secret data key 116(2). Successful execution of data decrypting logic 184 depends on whether the portions of the indirect address used to create a data tweak to decrypt the data, and the additional metadata (if any) used to create the data tweak, correspond to the original allocation of the memory location pointed to by the indirect address.

While the address decoding logic 162 is shown as a separate module from memory store instruction logic 170 and memory retrieval instruction logic 180 in FIG. 2, it should be understood that the address decoding logic 162 can be incorporated into the instruction logic 170 and/or 180 or can be embodied as a separate set of instructions. Further, it should be understood that the address decoding logic 162 can be incorporated into or referenced by other types of instructions, alternatively or in addition to the LOAD, STORE, and MOV instructions (e.g., arithmetic instructions with memory operands, call, JMP, etc.). For example, control transfer instructions such as call and JMP can load the encoded pointer address for the code to execute into the processor's program counter register (e.g. instruction pointer) (e.g., the RIP, where RIP is the instruction pointer register in 64-bit code). The instruction pointer register can then be queried by a program and as a result, the current program counter address will be the encoded form (offset to the current program counter location).

If the address decoding logic 162 successfully decodes the encoded indirect address 206, which includes the address decrypting logic 164 successfully decrypting the encrypted address slice in the encoded indirect address, the original indirect address 204 is returned to the privileged system component 142 and the memory access is completed, or program execution begins at the new program counter location (in the case of control flow changes). If the encoded indirect address 206 does not successfully decode, a fault is raised. Based on the successful completion or failure of memory store 211, an appropriate verification or fault signal 213 is returned to the user space application 134. Similarly, based on the successful completion or failure of memory load 220, an appropriate verification or fault signal 222 is returned to the user space application 134.

Figure 3A:
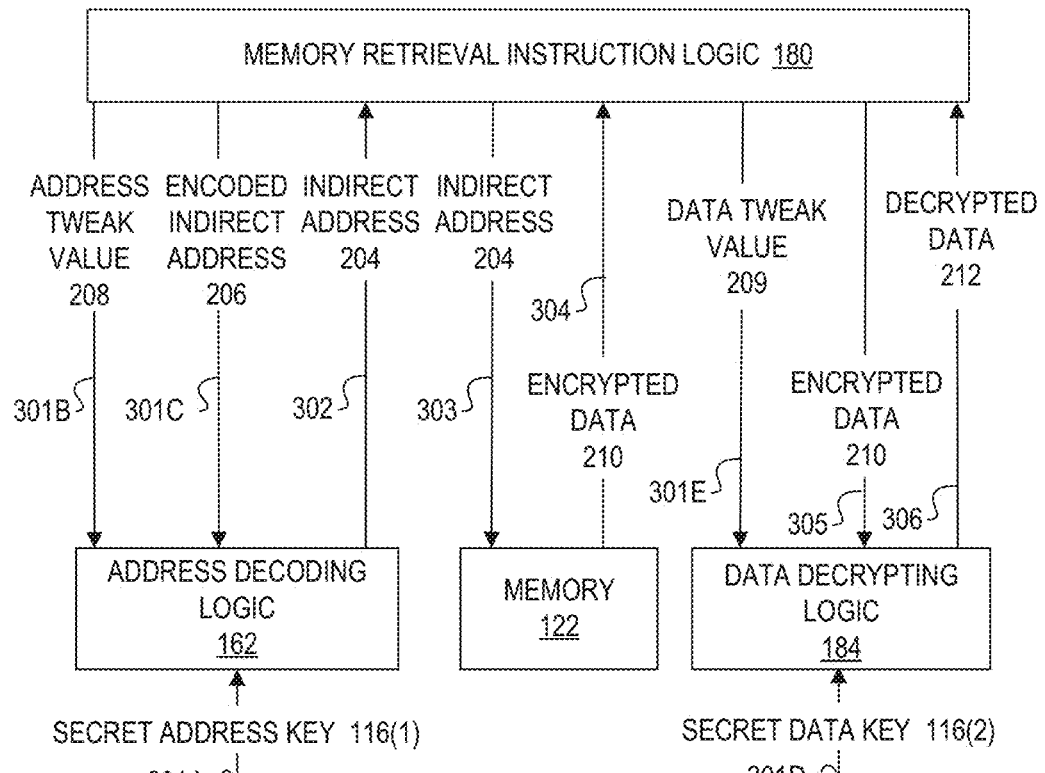
FIG. 3A is a simplified sequence diagram illustrating an application of memory retrieval instruction logic according to at least one embodiment.

FIG. 3A is a simplified sequence diagram illustrating a sequence of operations associated with the memory retrieval instruction logic 180 shown in FIG. 2. A memory load is initiated by memory retrieval instruction logic 180 based on the encoded indirect address 206. Address decoding logic 162 obtains the secret address key 116(1) at 301A and an address tweak 208 at 301B. The secret address key 116(1) and the address tweak 208 are used by the address decoding logic 162 to decode the encoded indirect address 206 at 301C. If the encoded indirect address 206 includes an encrypted address slice of the memory address, then address decoding logic 162 can decrypt the encrypted address slice in the encoded indirect address 206. If the encoded indirect address 206 is successfully decoded by address decoding logic 162, then the decoded indirect address 204 is output at 302.

Data decrypting logic 184 obtains the secret data key 116(2) at 301D and a data tweak 209 at 301E, which are used by the data decrypting logic 184 to decrypt encrypted data 210 at 305. Data tweak 209 is derived from encoded indirect address 204 in various possible embodiments as will be further described herein. It should be noted that, in at least some embodiments, data decrypting logic 184 may begin its decryption algorithm prior to receiving encrypted data 210 at 305, and in parallel with address decoding logic 162. In this embodiment, a counter mode block cipher, for example, may perform an encryption operation based on the data tweak 209 and the secret data key 116(2) to generate a keystream, which can be used once the encrypted data 210 is received.

At 303, memory retrieval instruction logic 180 accesses memory 122 based on the indirect address 204 that was output at 302 by address decoding logic 162. At 304, the encrypted data 210 is retrieved (e.g., load, read, move, etc.) from memory 122. At 305, the encrypted data 210 is provided to data decrypting logic 184, which can use the already-generated keystream to decrypt the encrypted data 210 (e.g., by performing an exclusive OR (XOR) function). If the encrypted data 210 is successfully decrypted by data decrypting logic 184, then decrypted data 212 is output at 306.

Figure 3B:
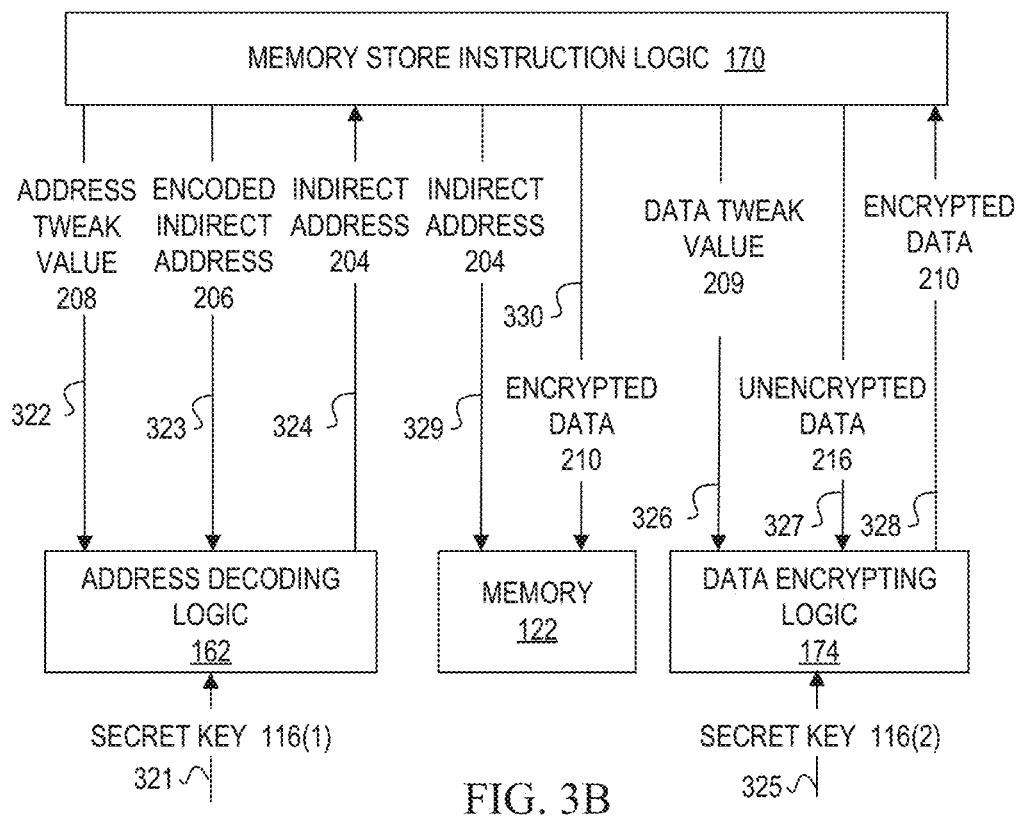
FIG. 3B is a simplified sequence diagram illustrating an application of a memory store instruction logic according to at least one embodiment.

FIG. 3B is a simplified sequence diagram illustrating a sequence of operations associated with the memory store instruction logic 170 shown in FIG. 2. A memory store is initiated by memory store instruction logic 170 based on the encoded indirect address 206. Address decoding logic 162 obtains the secret address key 116(1) at 321 and the address tweak 208 at 322. The secret address key 116(1) and the address tweak 208 are used by the address decoding logic 162 to decode the encoded indirect address 206 at 323. If the encoded indirect address 206 includes an encrypted address slice of the memory address, then address decoding logic 162 can decrypt the encrypted address slice in the encoded indirect address 206. If the encoded indirect address 206 is successfully decoded by address decoding logic 162, then the decoded indirect address 204 is output at 324.

Data encrypting logic 174 obtains the secret data key 116(2) at 325 and the data tweak 209 at 326, which are used by the data encrypting logic 174 to encrypt unencrypted data 216 at 327. Data tweak 209 is derived from encoded indirect address 204 in various possible embodiments as will be further described herein. If the unencrypted data 216 is successfully encrypted by data encrypting logic 174, then the encrypted data 210 is output at 328. At 329, memory store instruction logic 170 accesses memory 122 based on the indirect address 204, and at 330, the encrypted data 210 is stored in the memory 122. It should be noted that address decoding logic 162 and data encrypting logic 174 may be performed in parallel, partially in parallel, in sequence, or in any other order or timing. Some embodiments may use the unencrypted portion of an address (partial address) to lookup a translation lookaside buffer (TLB) to see if a matching portion of the address is present in a TLB entry, proceeding with that TLB address mapping while the encrypted portion of the address decoding/decryption completes. However, encrypted data 210 is not stored in memory 122 until both address decoding logic 162 and data encrypting logic 174 have been successfully performed.

Figure 4:
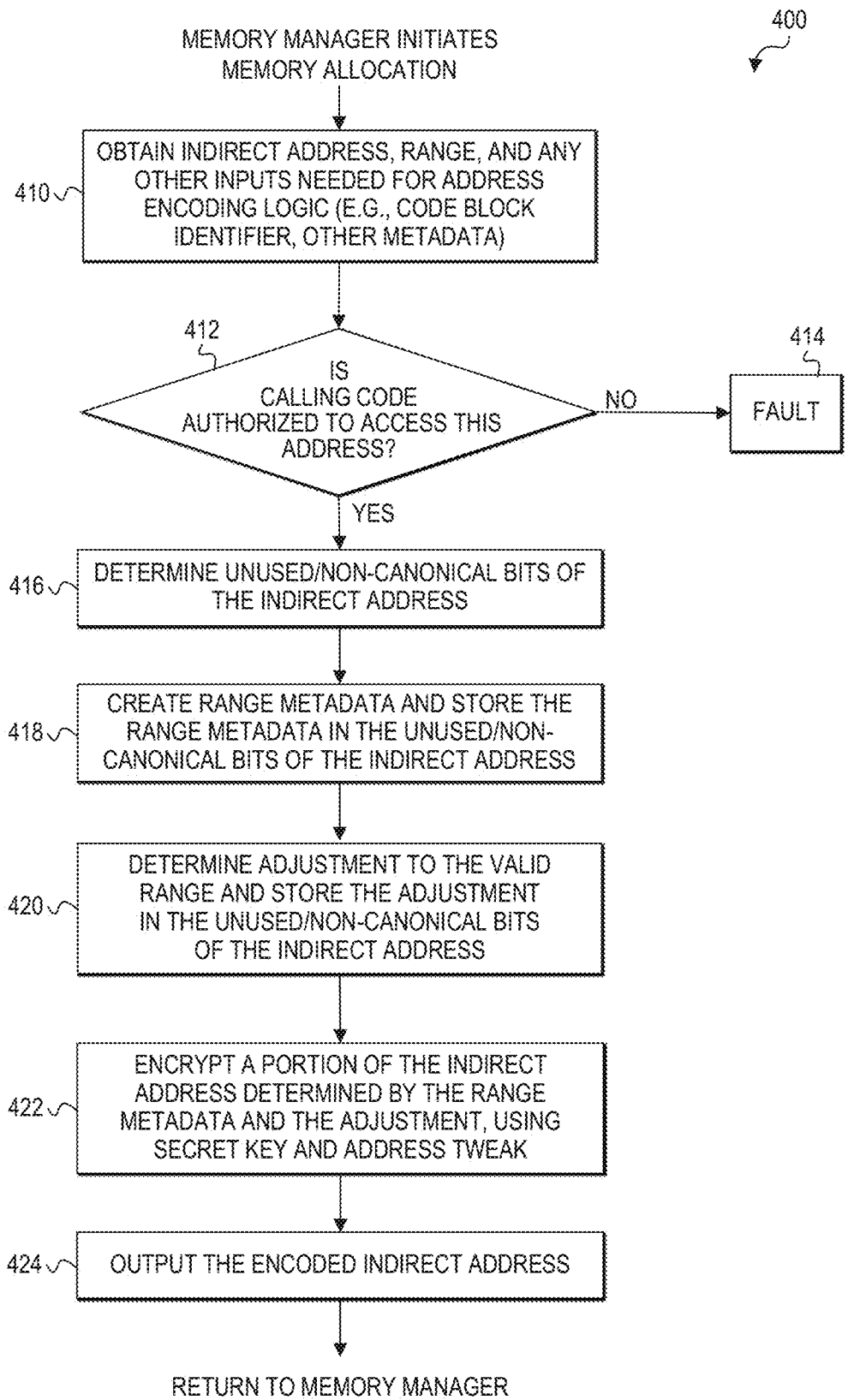
FIG. 4 is a simplified flow diagram of at least one embodiment of a process for providing security for an indirect address as disclosed herein, which may be executed by the computing device of FIG. 1.

Referring now to FIG. 4, an example process 400 for securing an indirect address is shown. Portions of the process 400 may be executed by hardware, firmware, and/or software of the computing device 100 (e.g., by the processor 102 executing the address encoding logic 152). The process 400 begins in response to a memory allocation (e.g., by a memory manager module). In block 410, the computing device 100 obtains the indirect address, address range, and other inputs needed to encode the indirect address (e.g., a code block identifier, instruction pointer, and/or metadata for tweaks, as described herein). In block 412, the computing device 100 determines whether the calling code (e.g., the code initiating the memory allocation) is authorized to access the indirect address received in block 410 (e.g., indirect address 204). To do this, the computing device 100 may perform an access control check by verifying the instruction pointer or caller privilege level information for the calling code, which may be obtained from, for example, a heap manager of the memory manager module 144. If the computing device 100 determines that the calling code is not authorized to access the indirect address, a fault is raised (414). If the computing device 100 determines that the calling code is authorized to access the indirect address, the computing device 100 proceeds to block 416. In block 416, the computing device 100 determines the unused (e.g., non-canonical) address bits of the indirect address to perform the address range encoding or other metadata encoding (e.g., size (power) metadata, tag value, etc.). To do this, the computing device 100 may simply use the higher (e.g., most significant) unused/non-canonical bits of the indirect address. It should be noted that the encoded addresses do not need to be architecturally non-canonical. Rather, the unused/non-canonical addresses can simply be a range of memory set aside by, for example, the privileged system component 142, to enable the address encoding as disclosed herein.

In block 418, the computing device 100 creates the metadata (e.g., valid range and/or permission data) and stores the metadata in the unused/non-canonical bits of the indirect address selected in block 416. Illustratively, the metadata indicates an upper limit on the size of the buffer pointed to by the indirect address. To create the metadata, the computing device 100 converts the indirect address values to a center location in which the most significant canonical address bits do not change for the valid memory range. In some embodiments, the range metadata includes an "exponent" to determine the 2's power of the memory range size (effectively determining the number of mutable and immutable address bits). In some cases, an "adjustment" is used to force values to the end of the 2's power range as described below. In other embodiments, the adjustment may be used to force the buffer to the beginning of the 2's power range when buffer "underflow" needs to be addressed (as opposed to buffer "overflow"). Using the exponent metadata, any 2's power memory range can be defined (e.g., 2, 4, 8, 16 . . . 2^64).

The following is a simple example of range metadata encoding. The addresses 0000b-0011b fit the range 0-3 where the upper two bits do not change. However, if a pointer is modified to go to the index 4, one of the upper bits will change. Accordingly, the valid range metadata can be encoded as [2] (for the upper two bits to encode a range of 4) and the valid range metadata can be stored in the higher non-canonical bits, e.g., "[2] 00xxb." In this example, the exponent would be 2 bits in size (e.g., values [1-4]), to cover the 4 bit addresses used in the example. Table 1 below illustrates a number of additional, simplified examples.

TABLE 1

Address encoding examples

| Real address range | Size | Encoded address | Comment |
|---|---|---|---|
| 1001b-1100b | 4 bytes | [2] {3} 11xx | Adjust +3 to fit all in 11xxb |
| 1001b-1101b | 5 bytes | [3] {1} 1xxx | Adjust +1 to end of range |
| 1110b-1111b | 2 bytes | [1] {0} 111x | Fits in lowest power of 2 |
| 1101b-1110b | 2 bytes | [1] {1} 111x | Adjust +1 to fit all in 111xb |
| 0000b-1111b | 16 byte | [4] {0} xxxx | Full range |
| 1010b-1010b | 1 byte | [0] {0} 1010 | Exact match |
| 1011b-1101b | 3 bytes | [2] {2} 11xx | Adjust +2 to end of range |

In Table 1, the encoded address is represented using a format that is similar to a floating point format. In the encoded addresses in the third column of Table 1, the number in brackets, e.g., [2], is the exponent or valid range metadata; the number in braces, e.g., {3}, is the adjustment value, and the address to the right of the adjustment value indicates the unused/non-canonical bits in which the valid range metadata and adjustment value are stored. In block 420, the computing device 100 determines the adjustment (or "offset") to be applied to the valid range, and stores the adjustment value in the unused/non-canonical bits of the indirect address. In some embodiments, the adjustment is used to force the encoded range to the end of a 2's power boundary. This sets a very specific upper bound on the buffer size. In this way, an encoded version of the original (not encoded) valid address range can be created. The encoded version can be designed such that the least number of upper bits will change over the valid range (e.g., so that encryption of the upper bits will detect/amplify modifications to the encoded address on decryption). The encoding is reversible, such that the original intended valid address range is returned as long as it is modified within the range. In the example above, the range 0-3 decimal (0000b-0011b binary) can be encoded as [2] {0} 00xxb (where "xx" means those bits can take any value for the range: 00, 01, 10, 11). In another example, the range 1-4 decimal (0001b-0100b) can be encoded as [2] {−1} 00xxb (where the adjustment is subtracted in order to keep the upper bits constant). Alternatively, the same range 1-4 decimal (0001b-0100b), can be encoded as [2] {3} 01xxb (this time adding an adjustment of 3 in order to keep the upper bits constant). With either representation, the encoded version decodes back to the original address range 1-4. In still another example, if the buffer size is 4 KB, a 10-bit adjustment value with a resolution of 4 bytes can be used.

Other embodiments may use a signed adjustment value (e.g., 2's compliment) where the buffer may be either adjusted to the beginning or end of the 2's power boundary depending on the sign (+/−) of the adjustment. Such embodiments can provide protection from either buffer overflow or underflow situations depending on the adjustment sign. In cases where 16 bits are available in unused/non-canonical addresses (e.g., in current 64-bit processors), 10 of the available bits can be used for the adjustment and the remaining 6 bits can be used for the valid range metadata (e.g., exponent value/2's power). If the exponent value reaches a range beyond a 4 KB page, the adjustment can expand by a 2's multiplier to allow adjustments of large buffers within even larger power of 2 ranges (noting that in some embodiments, 4096 bytes are fully covered with a 10-bit adjustment value allowing the adjustment to "adjust" a buffer to end with the very last 4 byte word in a 4 KB page before the upper (2's power) bits will change). Such an adjustment (e.g., incremented by 1) will adjust the buffer location 4 bytes at a time. Any other choice of initial adjustment size and word size is possible in other embodiments. In another example, if the exponent has a value of 13, then the adjustment value can be multiplied by 2 so that the adjustment can still encompass the full 2's power range (in this case, two 4 KB pages, if adjusting by 8 bytes at a time), and so on (e.g. an exponent value of 14 means the adjustment value is multiplied by 4, and an exponent value of 15 means the adjustment value is multiplied by 8 and so on, allowing the adjustment to encompass the full 2 powers range).

In block 422, the computing device 100 encrypts a portion of the indirect address, where the portion of the indirect address to be encrypted is determined by the valid range metadata (e.g., exponent/2's power) and the adjustment value. The valid range metadata determines the number of the most significant address bits of the encoded address that are to be encrypted (e.g., down to a minimum number so some address bits will always be encrypted). In some embodiments, the adjustment value is encrypted as well (e.g., to create a reasonable block size for a block cipher). In some embodiments, the most significant bits of the used bits/canonical address identified in the valid range metadata are encrypted with a secret address key (e.g., the secret address key 116(1)), using the valid range metadata (which may or may not include the adjustment value) as an address tweak. In the illustrated embodiments, the valid range metadata (e.g., exponent/2's power) would not be encrypted because the processor uses the valid range metadata plaintext to determine the number of bits to decrypt. However, the valid range metadata (e.g., exponent/two's power) can be used as a tweak in the case of a tweakable block cipher (and thereby affect the encrypted bits). Other data values that may be used as tweaks include, but are not necessarily limited to: data stored in the unused bits of the indirect address, the upper limit on the buffer size, an exponent of a two's power boundary selected as the upper limit on the buffer size, an adjustment value applied to the two's power boundary, a code block identifier, instruction pointer data, permission information encoded in the metadata, version number (useful when reassigning/revoking pointers that were previously assigned to a program, version may be maintained by the processor in a register), and/or other metadata described herein (e.g., plaintext address slice size, memory allocation size, type, location, ownership, tag, privilege level, crypto context ID, or any suitable combination thereof).

As used herein, a "tweak" may refer to, among other things, a second input to a block cipher, in addition to the usual plaintext or ciphertext input and the key (e.g., the secret key 116(1)-116(N)). In at least some embodiments, a tweak may compose all or part of an initialization vector (IV) for a block cipher. Encrypting the upper two canonical bits enables the computing device 100 to detect when the indirect address has been illegally changed, because the encryption algorithm will cause the illegally-changed upper bits to produce a random sequence of bits that are non-deterministic to an adversary, which likely results in a fault when the illegally-changed indirect address is used.

The portion of the indirect address to be encrypted (e.g., the upper used/canonical bits) is encrypted using a cipher mode encryption algorithm, such as a tweakable block cipher, using the valid range metadata and adjustment (e.g., [2] {−1}, in the above example) as a tweak. Some examples of tweakable block ciphers include: XOR-encrypt-XOR (XEX), Liskov, Rivest, and Wagner (LRW), and XEX-based tweaked-codebook mode with ciphertext stealing (XTS). Other bit diffusion methods in which any single bit change in the cipher text results in changes across the entire decrypted plaintext can be used. If desired, alternative embodiments can trade off security for performance by using non-cryptographic methods that still achieve reasonable bit diffusion analogous to a block cipher.

The cipher selected for the encryption can be implemented in hardware, using an algorithm that has a bit-selectable or otherwise variable block size (e.g. any block cipher or similar diffusion algorithm with appropriate block sizes that may constructed to utilize a tweak), or an algorithm that allows a fixed block size with a tweak using the remaining unencrypted bits (e.g., the extra bits outside the fixed block size). A cipher that has a bit-selectable block size may accept as an input (in some cases, along with the plaintext to be encrypted) a bit-length parameter that specifies how many bits of the plaintext are to be encrypted. In some cases, the bit-length parameter specifies the same number of bits that are in the plaintext, and in other cases, the bit-length parameter specifies a number of bits in the plaintext less than the length of the entire plaintext. The cipher encrypts the plaintext bits using an encryption key (which may be of the same or different length from the bit-length parameter). In cases where the encryption key is longer than the bit-length parameter, a subset of the bits of the key equal to the bit-length parameter may be used in the cipher. The cipher encrypts as many bits from the plaintext as specified by the bit-length parameter using a sequence of logical operations that include at least two logical AND operations and two logical XOR operations. Each of the operations is performed both on the bits of the plaintext and on the bits of the key; that is, each of the operations is performed on at least one plaintext bit and at least one key bit. In this manner, both confusion and diffusion between the plaintext and the ciphertext may be achieved. This bit-length parameterizable cipher according to the present disclosure may be referred to as a K-cipher.

A K-cipher may also be configured to receive a tweak input so that encryption (and decryption) is based on the encryption key and the tweak input. For example, the tweak input may be added to a certain number of round keys in a key schedule generated by the K-cipher. The tweak input may have the same length as the round keys and may be configured in any suitable manner, including tweak inputs that are described herein with reference to various embodiments.

In some embodiments, the cipher has sufficient bit diffusion so that any bit change made to the encrypted address bits will equally affect (cascade through) all bit positions when decrypted. This provides the basis for a corrupted address given any change or bounds violation. Using this method, if the adversary attempts to tamper with the metadata (e.g., the exponent or adjustment values, or the encrypted most significant bits) the resulting decoded address will be corrupted. In the 64-bit address space, address corruption will result in a fault with high probability, thus allowing the address corruption (and pointer access or bounds violation) to be caught by the privileged system component 142 (e.g., an operating system/executive/VMM/ alternative mode/debug trace/management processor/subsystem, etc.).

In the example above, if the indirect address/pointer value is incremented beyond 3, modifying the indirect address/pointer in this way will corrupt the upper canonical bits and cause a non-deterministic memory access that cannot be controlled by an adversary. For instance, going beyond a buffer size by one byte will result in a random memory access that will page fault with high probability. This is due to the bit diffusion properties of the cipher to ensure that even one-bit changes will diffuse through all of the most significant bits. As a result of the adjustment, which forces values to the end of the 2's power range, buffer overflows cause corruption of the encrypted address bits.

The cipher tweak can be extended to include a code block identifier to provide access controls over which code blocks (e.g., blocks of the calling code) are permitted to use an indirect address/pointer to access memory. Additionally, instruction pointer (which may be referred to as the "program counter") information or ranges can be encoded as part of the pointer encryption tweak (also referred to herein as "address tweak"). The instruction pointer information can be used to limit the scope of what code can access what data. For example, all code can be arranged within fixed blocks of memory within the 64-bit address space. Code with similar access permissions can be grouped together in the same block or range. The address tweak can include the identifier for the block of memory from which an instruction is executing. In this way, code and data can be associated, and access controlled, such that an adversary coming from a different code block will not be able to access data of the protected block using the encrypted pointers, because the encrypted pointers will not decode properly if the wrong code block identifier is used as an address tweak. Further, when a block of code calls, e.g., malloc, to allocate memory to itself, malloc can return the encrypted address using the calling code's memory block to ensure private access to the allocated memory (so long as the allocated memory isn't freed and then reallocated to another code block). Alternatively, other methods of identifying the calling code can be used in the address tweak, such as protection keys. Still further, the metadata for read/write/execute access that is used by the processor 102 to control access to memory can be used as part of the address tweak for the encrypted address bits. Additionally, the instruction pointer may itself be represented as an encoded pointer (e.g., range-based). In this case, the metadata and encrypted address bits can be used as part of the "tweak" identifying the code block accessing a data pointer or requesting a memory allocation/assignment. At 424, the encoded indirect address may be output and control returned to memory manager 144.

Figure 5:
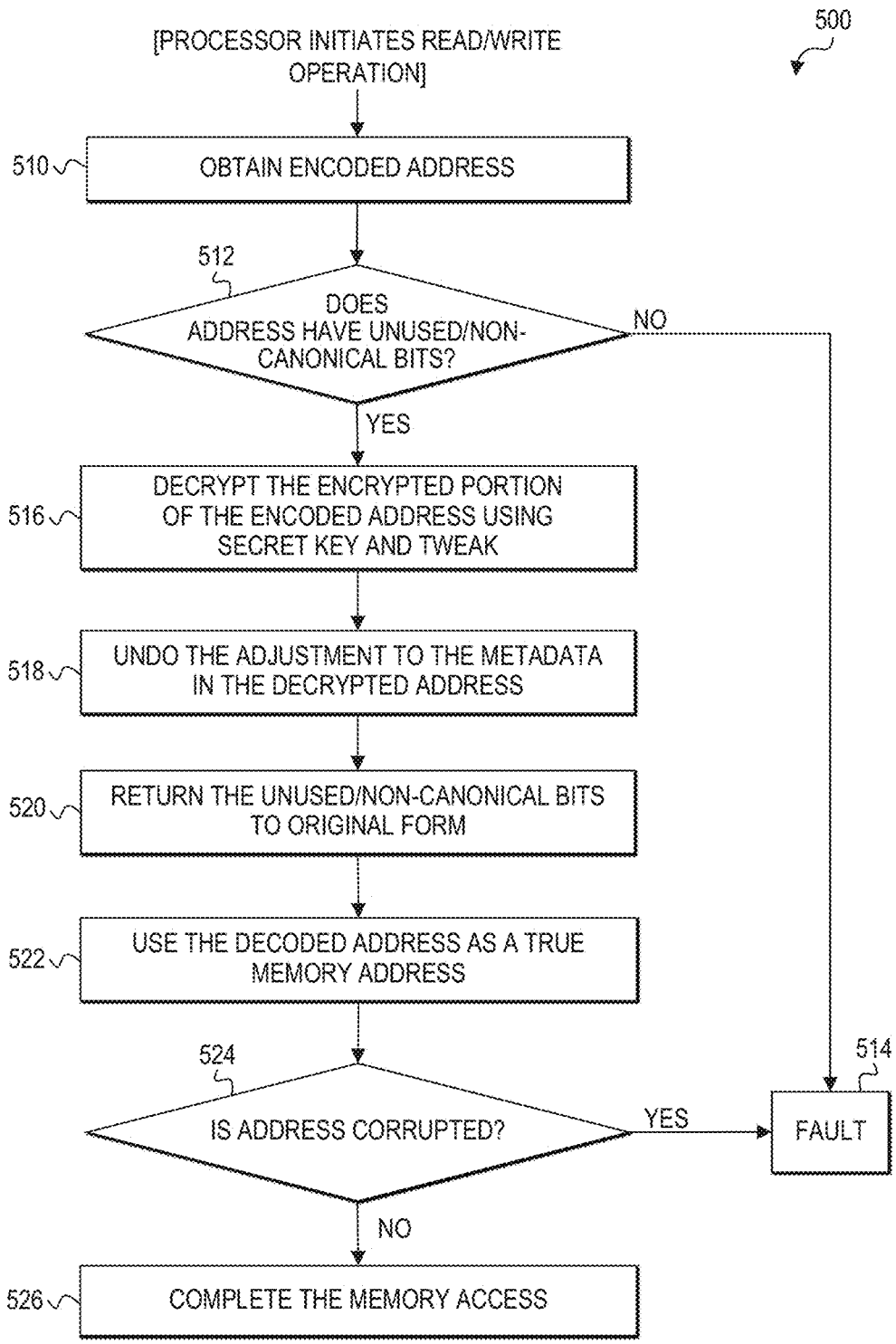
FIG. 5 is a simplified flow diagram of at least one embodiment of a process for verifying a previously secured indirect address as disclosed herein, which may be executed by the computing device of FIG. 1.

Referring now to FIG. 5, an example process 500 for decoding an indirect address is shown. Portions of the process 500 may be executed by hardware, firmware, and/or software of the computing device 100 (e.g., by the processor 102 executing the secure mov logic and/or the address decoding logic 162). The process 500 begins in response to a memory access operation such as a read, write, or execute operation, e.g., a MOV instruction. Of course, different processor architectures may refer to the "MOV" functionality by different names for the instructions or different options/parameters. As such, the disclosed embodiments apply to all types of "MOV" functionality across different architectures, irrespective of the terminology used to refer to such functionality. Further, the MOV instruction is one example, and any instruction that can access memory to read/write data can apply the address encoding and decoding methods disclosed herein.

In block 510, the computing device 100 obtains the encoded indirect address (e.g., the encoded address 206, which may be obtained from a register 112). In block 512, the computing device 100 determines whether the encoded address obtained in block 510 has unused or non-canonical bits. If the computing device 100 determines that the encoded address does not have unused/non-canonical bit (e.g., the address doesn't fall within the non-canonical, or otherwise reserved, range of addresses, whether the address range is 32-bit, 64-bit, 128-bit or whatever range an alternate architecture may require), a fault is raised (514). If the computing device 100 determines that the encoded address has unused/non-canonical bits (e.g., the address falls with the canonical or reserved address range), the computing device 100 proceeds to block 516. In block 516, the computing device 100 decrypts the encrypted portion of the encoded address, using the decryption algorithm counterpart of the encryption algorithm used in block 422 of FIG. 4, and using the same secret key and tweak as used by the encryption algorithm in block 422 of FIG. 4.

In block 518, the computing device 100 "undoes" the adjustment to the range metadata in the decrypted address (e.g., by subtracting the decrypted adjustment value in the unused/non-canonical bits from the full decrypted value of the indirect address). In block 520, the computing device 100 returns the decrypted indirect address to its original (e.g., canonical) form by, for example, removing the unused/non-canonical bits.

In block 522, the computing device 100 uses the decoded address output by block 520 as a "true" (e.g., virtual or linear) memory address (e.g., as a pointer). In block 524, the computing device 100 determines whether the decoded address used as a memory address/pointer at block 522 is a corrupted address. If the decoded address is corrupted, a fault is raised (514). If the decoded address is not corrupted, the computing device 100 completes the memory access operation successfully, using the decoded address as a memory address/pointer, in block 526.

In this way, the process 500 allows the computing device 100 to verify the range-encoded indirect address and enforce the embedded range check before converting the range-encoded address into a real memory address. Additionally, invalid adjustment values (e.g., adjustment values that go beyond the 2's power range), can be used to determine with some probability when a corruption occurs as well as invalid address values or metadata reserved to detect when corruption occurs. Even if corruption is not detected, the resulting address would not be deterministic (and therefore usable) to an adversary. In addition to the buffer overflow mitigation techniques described above, there are other applications of the pointer address encoding technologies disclosed herein. For example, processor instructions can be restricted by privilege level or caller location authorization (e.g., an instruction pointer block or range of a heap manager). Additional instructions can be added in cases in which the program code itself can control its own pointers and ranges. These instructions may use a larger encoded pointer range as input, and may produce a smaller/equal range pointer (more restrictive) falling within the larger buffer's range if the code executing this instruction belongs to the code block that owns the original (superset) buffer pointer (which can be determined by the instruction pointer). For example, the memory manager module 144 can allocate the call stack and provide a large range pointer to the call stack (e.g., for the stack pointer). Code segments that are authorized to act on the call stack may then use this processor instruction to encode sub range pointers to buffers implicitly created on the stack. Compilers can automatically augment code to do this as stack operations are performed (local variables created, etc.), thus, protecting even individual data structures or individual variables on the stack. That is, the disclosed techniques enable encoding buffer sizes down to individual variable sizes (e.g., a 32-bit integer can be encoded as a pointer to a buffer of 4 bytes).

Similarly, code blocks that own a pointer can use similar instructions to transfer control/ownership to another/different code block by generating a newly encoded pointer for the target/receiving code block based on the original, e.g., by selecting a smaller buffer size for assignment to another code block. Such an instruction would take as input parameters the resulting buffer size, the original data pointer and an encoded pointer for the targeted code range (that the pointer is being assigned). Such an instruction can decode the input encoded pointer using the instruction pointer of the calling code block as a tweak, reduce the range if the input range is smaller than the input encoded pointer, and use the input encoded pointer to the targeted code block/range as part of the tweak when producing the output encoded pointer (now accessible to the newly assigned code block for the extent of the specified range). Other input parameters could be, for example, additional metadata, such as read/write/execute permissions (possibly as a subset of the original) for the targeted code.

To provide access control, the instruction pointer, or an encoded instruction pointer comprising of a range identified with a similar exponent, adjustment and encrypted indirect address bits, can be used as part of the tweak. The instruction pointer can similarly be encoded as an executable range/buffer of memory where the program is stored. When used as a tweak for the data pointer (e.g., an indirect address 114), the instruction pointer can control access to data by different pieces of program code. Further, the encoded instruction pointer value can be queried by programs for RIP relative addressing. (e.g. the instruction pointer register can be read by a program and then used to call/jump to relative offsets within the program's valid range, or read/write data within the program's valid range by using the encoded instruction pointer value).

Additionally, data pointers may be created and converted by new processor instructions (or operating system routines), allowing ownership of a data pointer (e.g., an indirect address 114) to be extended to other code/program ranges. That is, the owner program/code of a data pointer (whose instruction pointer range was used as part of the tweak for the data pointer) can call, e.g., an operating system routine (or processor instruction) that will produce a new data pointer that can be used by another program/code range. In this case, the new instructions/operating system routine will decode the original data pointer that was encoded as described herein and re-encode the range using the new program/code range metadata as the tweak, thereby producing a data pointer that will decode properly when accessed from an instruction pointer operating in the new address range. The new instruction/routine may also take as a parameter a smaller range encoding, thereby allowing the program owning the original data pointer to subset the data buffer size to a smaller region of memory accessible by the new program/code range.

Further, a 64 bit-stack pointer can be encoded as described herein, and as such, should be updated accordingly by the processor 102 on stack pushes and pops, calls and returns conforming to the allocated range of the stack. After decoding a MOV instruction to the stack pointer, the processor 102 may choose to cache the decrypted version of the stack pointer for direct memory access efficiency, however, the processor 102 may continue to track the range condition to assure stack overflows do not occur.

With instruction pointer relative addressing, the program counter register can be read and used to calculate offsets for position independent code (PIC) and data. The instruction pointer can also be encoded such that legacy instruction pointer relative position independent code will still function correctly. In this case, the encoded instruction pointer register may have a range conforming to the extent of the relocated program code and data (including text sections) in memory. In addition to memory accesses, PIC programs may utilize indirect jumps (JMP) and calls based on RIP relative addressing. As such, the JMP and CALL instructions can be modified to handle encoded pointer addresses, converting them into the actual linear memory address similar to the MOV instruction. Instruction pointer relative jumps and calls outside of the pointer's bounds may result in a corrupted target address for the jump/call instruction, which is very likely caught with a fault. The loader can also fix relocatable symbol tables to properly encode the extent of the function pointers for their respective code sections and memory locations. This instruction pointer-range pointer can also be used as a flexible code block/identifier tweak to access control data pointers with their associated code. Additionally, encoded range pointers on the call stack can be encrypted to provide control flow integrity between calls and returns while retaining the range encoding when decrypted on returns. Not all values of the 6-bit exponent metadata are actually used (e.g., with 64-bit addressing). For example, in 64-bit addressing, values that go beyond 48 will collide with the non-canonical bits and therefore will never be utilized. Thus, exponent values above 48/57 can be redefined to indicate that other interpretations of the adjustment region can be defined. It should be noted that the number 57 is based on five-level paging. This interpretation of the high order exponent values allows alternative uses of the unused/non-canonical address bits to coexist with the disclosed address encoding mechanisms. Other embodiments can use these undefined values to selectively determine if the adjustment data is or isn't present. For example, an exponent value beyond 48 can indicate no adjustment is present/needed for the buffer, and only the 2's power is valid, setting the 2's power back to the beginning without adjustments. This approach can enable better utilization of the address space by selectively determining what metadata is required for the encoded addresses, and selectively extending the available address bits into the space previously reserved for the adjustment value.

FIG. 6 is a diagram of an example pointer 610 according to at least one embodiment of the present disclosure. In particular, FIG. 6 shows a cryptographically encoded 64-bit pointer (address) in its base format, using exponent (power) metadata but not an offset. The pointer 610 may be the output of the process 400 of FIG. 4, in some instances. In the example shown, the encoded pointer includes a size (exponent) metadata portion 602 (e.g., 5 bits in the example shown) indicating a size of a mutable plaintext portion 608 (e.g. 6 bits in the example shown) of the pointer 610 (e.g., a number of low order address bits that comprise the mutable plaintext portion 608 of the pointer 610, these bits may be manipulated freely by software for pointer arithmetic). In some embodiments, the size portion 602 may include power (exponent) metadata bits that indicate a size based on a power of 2.

As shown in FIG. 6, the size metadata portion 602 may indicate the number of bits that compose the immutable plaintext portion 606 and the mutable plaintext portion 608. In certain embodiments, the total number of bits that make up the immutable plaintext portion 606 and the mutable plaintext portion 608 may be constant, with the sizes of the respective portions being dictated by the size metadata portion 602. For example, if the power metadata value is 0, there are no mutable plaintext bits and all 27 remaining address bits (i.e., immutable plaintext portion 606) are used as a tweak to generate ciphertext portion 604 from an address slice (i.e., a subset of the linear address bits), where the ciphertext portion 604 is adjacent to and more significant than the immutable plaintext portion 606. As a further example, if the power metadata value is 1, then there is one bit of mutable plaintext, if the power metadata value is 2, then there are 2 bits of mutable plaintext, up to 27 bits of mutable plaintext resulting in no immutable plaintext bits (606). The mutable plaintext portion 608 may be manipulated by software, e.g. for pointer arithmetic or other operations. The ciphertext portion 604 (e.g., 32 bits in the example shown) of the pointer 610 may be encrypted with a small tweakable block cipher (e.g., a SIMON, SPECK, or tweakable K-cipher at a 32-bit block size, or other variable bit size tweakable block cipher). The remaining address bits compose immutable plaintext portion 606 (e.g. 21 bits in the example shown) and are used as part of the tweak for the tweakable block cipher used to encrypt the ciphertext portion 604. While these bits are also a plaintext (non-encrypted) portion of the address, they cannot be modified by software (e.g. pointer arithmetic) like the bits of mutable plaintext portion 608 without causing the ciphertext portion 604 to decrypt incorrectly. The base pointer format shown in FIG. 6 allows for cryptographically describing object sizes and their location in memory. In some cases, the exponent/power/size metadata portion 602 could be provided as a separate parameter in addition to the pointer; however, in some cases (e.g., as shown) the bits of the size metadata portion 602 may be integrated with the pointer 610 to provide legacy compatibility in certain cases.

It should also be noted that in an alternative embodiments, the size metadata portion 602 may indicate the number of bits that compose the immutable plaintext portion 606, and thus dictate the number of bits remaining to make up the mutable plaintext portion 608. For example, if the power metadata value is 0, there are no immutable plaintext bits (606) and all 27 remaining address bits (i.e., mutable plaintext portion 608) may be manipulated by software. As a further example, if the power metadata value is 1, then there is one bit of immutable plaintext, if the power metadata value is 2, then there are 2 bits of immutable plaintext, up to 27 bits of immutable plaintext resulting in no mutable plaintext bits (608), and thus, no bits that can be manipulated by software.

Also, although pointer 610 is illustrated and described based on using 32 bits for the ciphertext portion 604, the pointer format is not intended to be so limited. The address slice to be encrypted may be selected based on readily available 32-bit block encryption ciphers. However, an encryption cipher using any other block size (e.g., 27, 16, variable, etc.), may be used instead. If the number of ciphertext bits is adjusted (upward or downward), the remaining address bits to be encoded (e.g., immutable and mutable portions) may be adjusted accordingly. For example, if the ciphertext portion is adjusted to be 16 bits, then the combined immutable and mutable plaintext portions (606 and 608) could be encoded in 43 bits. In this scenario, however, an additional bit may be added to the size metadata portion 602, with the combined immutable and mutable portions being reduced to 42 bits, so that the size metadata portion 602 can indicate any possible number of bits (e.g., 0-42 bits) to compose the immutable plaintext portion 606 and the mutable plaintext portion 608.

In one or more embodiments, size metadata portion 602 of pointer 610 may accommodate special values to indicate how the pointer 610 is to be handled by software using the pointer. In one embodiment, special values may be defined to indicate that the pointer is to be treated as a conventional or legacy pointer (e.g., not as a cryptographically encoded pointer). For example, reserved values 11111 and 00000 may indicate the pointer is a conventional or legacy pointer (as these are the legacy non-canonical encodings for the upper linear address bits between user and supervisor space). Any other values can indicate that the pointer is encoded as a cryptographically encoded pointer. Thus, both types of pointers (e.g., conventional and cryptographically encoded) can potentially be used in the same address space. In other embodiments, one or more of the most significant bits in a cryptographically encoded pointer may be reserved to indicate the whether the pointer is a legacy pointer or a cryptographically encoded pointer. For example, the two most significant bits may be encoded as reserved bits. When the reserved bits have the same value, this indicates that the pointer is a legacy pointer. In yet another embodiment, the two most significant bits may be encoded as a tag/version number (e.g., random or deterministically different value). Designating additional bits as reserved bits, however, necessitates bits from other regions of the pointer to be dropped. In one example, if two bits are used as reserved bits or tag/version bits, then two other bits may be dropped from the lower portions (immutable plaintext bits 606 and mutable plaintext bits 608) if the pointer size stays the same.

When a processor is running in a cryptographic mode and accessing memory using an encoded pointer (address) (e.g., a pointer formatted in the same or similar manner to pointer 610 of FIG. 6) to get the actual linear/virtual address memory location, the processor takes the encoded address format and decrypts the ciphertext portion (e.g., 604 of FIG. 6) using the variable number of immutable plaintext bits (e.g., 606 in FIG. 6) determined by the size/power/exponent metadata bits (e.g., 602 of FIG. 6) and a secret key. In some instances, the size/power/exponent metadata and/or other metadata or context information may be included as part of the tweak for decrypting the ciphertext portion 604 (also referred to herein as "address tweak"). If the address decrypts incorrectly, the processor may cause a general protection fault (#GP) or page fault due to the attempted memory access with corrupted linear/virtual address.

As used herein, "context information" is intended to include any metadata or other information related to a memory allocation, its associated memory address, its associated pointer, the software for which the memory was allocated, and/or the contents of the allocated memory. For example, context information may include, but is not limited to, one or more of a size indicating the bytes of memory that are allocated, a size indicating the number of bits that compose immutable and mutable plaintext (address) portions of a pointer, a tag containing randomized bits associated with the memory address, permission information indicating access permissions for the data stored in the allocated memory, a version number of a pointer that may be used for reassigning/revoking pointers that were previously assigned to a program, a type or class of the data stored in the allocated memory, a privilege level indicating a user or supervisor mode of the software for which the memory was allocated, and a crypto (cryptographic) context identifier including a randomized or deterministically unique value for a memory address. One or more pointer encoding embodiments may use any single item of context information as part of a tweak (address tweak or data tweak), or may use any suitable combination of context information items.

Context information may be stored in any type of storage, which may be based on particular needs and implementations. For example, one or more items of context information may be embedded in a standard-sized (e.g., 64-bit) pointer, such as pointer 610. In this scenario, the context information may be stored in the upper most bits (602) in place of, or in addition to, the size metadata. Other example types of storage for context information include, but are not necessarily limited to embedding the context information in a pointer that has been enlarged to fit more or bigger tweaks (e.g., a 128-bit pointer, a 265-bit pointer, etc.), embedding the context information within another operand that is provided to the pointer encryption instructions and to the data access instructions, and/or storing the context information in a control register. A control register may be automatically selected by an instruction to be used as a crypto input (e.g., if there is just one register storing that type of tweak). Otherwise a control register may be selected using some other instruction operand such as a field in the pointer itself or in a context operand supplied with data access instructions (e.g., special load and store instructions) configured for the particular operand encoding embodiment. For example, an index field of an access instruction could be used to select a register containing a key or tweak for the data (or code). Generally, for tweaks that are only updated when switching contexts, the item(s) used for the tweak may be especially suited for storage in a register. Other tweaks that are more closely associated with a particular pointer may be more suitable for being embedded in the pointer or passed in an instruction operand. As previously noted, however, any item of context information may be embedded or stored in any type of storage.

FIGS. 7A-7D are diagrams that graphically represent allocations for various encodings in the size portion 602 of pointer 610. Each address space portion covered by a given value of the plaintext corresponding to the encrypted address slice 604 contains a certain number of allocation slots depending on the width of the size field (e.g., size portion 602). Supporting a larger number of allocation slots is desirable to provide flexibility for software in how it arranges allocations. Systems that support a large number of allocation slots also offer a higher degree of cryptographic diversity for mitigating memory safety vulnerabilities within a given quantity of data, since the encryption of the pointer and data are bound to the allocation slot (both its size and its address) in pointer encodings that include a size field. In other words, software can more effectively mitigate memory safety vulnerabilities when it can pick from a larger number of different allocation slots when allocating or re-allocating objects so that it is less likely to need to reuse a previously-allocated slot that may still be referenced by a stale pointer. Having a larger space of possible slots also reduces the probability of an adversary guessing a currently-populated slot if the adversary has the ability to generate pointers to guessed slots. This may not be included in every threat model, but it may be realistic in scenarios such as libraries that include their own custom allocators and thus may generate new pointers to enforce memory safety within their allocations. It may be desirable to constrain a compromised or malicious library from accessing memory outside of its authorized region, and thus to consider the library as a potential adversary.

Software can further harden memory allocations by unmapping pages with no active allocations and by moving allocations between different slots. The latter hardening approach may be feasible if the software responsible for moving allocations is able to identify all pointers that reference an allocation being moved so that those pointers can be updated to reference the new location.

Pointer encodings that do not include a size field, but rather just a tag field provide a number of potential allocation slots determined as the total number of byte-aligned ranges within the address space portion as defined above. However, the encryption of the pointer and data are bound only to the tag value. This makes it more tractable for an adversary to harvest sufficient pointers to enumerate all tag values within the address space portion and thus collect all possible corresponding values for the encrypted portion of the pointer that may be reused to access data with any tag value in the address space portion.

In some embodiments, the pointer is not encrypted at all, so only data encryption is bound to the tag value and the address space portion is in fact the entire accessible address space for the current mode. For example, software conventions of popular operating systems for Intel Architecture processors supporting four-level paging define an address width of 47 bits for applications.

Thus, in threat models that do not permit an adversary to directly generate encrypted pointers based on guessed allocation slots and tag values but rather only permit an adversary to corrupt existing pointers, including a size field in the encoding may significantly reduce the probability of an adversary gaining access to an allocation relative to encodings that do not include a size field. In pointer encodings including a size field, it is unlikely that an adversary can generate valid, encrypted pointers to allocation slots for which the adversary has not previously observed a pointer to that exact allocation slot. However, if a size field is not included in the pointer encoding, an adversary may corrupt address bits to point anywhere within the address space portion that matches the other metadata, e.g. tag value, and successfully access that data.

The number of allocation slots within an address space portion can be computed as follows for pointer encodings that include a size field:

$$\sum_{i=0}^{n-1} |A_i|$$

where n is the number of supported sizes, and $A_i$ is the set of allocation slots with size i. The following equations may be used to compute n and $A_i$:

$$n = 2^{bitwidth(size)}$$

$$A_i = \{x | x \equiv 0 \pmod{2^{bitwidth(mutable\ plaintext_i)}} \wedge x < 2^{bitwidth(mutable\ plaintext_i) + bitwidth(immutable\ plaintext_i)}\}$$

where bitwidth(field) denotes the bitwidth of the named field.

In some embodiments, n may be smaller than the maximum value computed above due to other constraints limiting the range of size values. It not necessary that the size field represents every possible allocation size. Common sizes may be represented with a smaller size field by indirectly representing a smaller set of common allocation values (e.g. size value 0 represents single data element or code allocation, size value 1 indicates 16B allocations, size value 2 indicates 64B allocations and so on, or any other combination). Similarly, sizes can contain implicit offsets, for example, representing intermediate allocation values (e.g. size value 1 indicates 16B allocation, size value 2 indicates an 16B allocation offset by 8 bytes, or any other combination).

Various example address space layouts are depicted in FIGS. 7A-7D. In FIG. 7A, a one-bit graphical representation 700 illustrates the difference between encoding a 1-bit tag value 702 for a given value of the plaintext corresponding to the encrypted address slice 604 and a 1-bit size value 704 for an address space that can fit either a single large allocation or two small allocations, since the larger size value in this example is twice as large as the smaller size value. A 1-bit tag value 702 embedded in a pointer provides a value of either 0 or 1, and the allocation slots are not differentiated by their locations within the address space portion. However, a 1-bit size value 704 embedded in a pointer provides three distinct allocation slots for objects that bind the pointer and data encryption to both the value of the size field and the value of the immutable plaintext bits field in the pointer. A size value of zero (size 0) defines one allocation slot for an object, while a size value of one (size 1) defines two allocation slots for objects.

Note that an adversary attempting to guess the tag value or size value for an arbitrary location within the address space portion is equally likely to guess correctly. However, an adversary may have previous knowledge of likely size values for targeted allocations that reduce the effectiveness of the size field relative to a tag value for providing cryptographic diversity. For example, an adversary may know the approximate size range of some memory-mapped file containing sensitive data, which may enable the adversary to guess the smallest power-of-two size that is adequate to cover the mapping. Alternatively, an adversary may know the range of sizes that are most prevalent in some app and preferentially target the size that covers the most memory (i.e. the size that maximizes the size multiplied by the number of allocations with that size) if all data in the app has equal sensitivity. Extra weight may be given to larger sizes even if they cover a slightly smaller total area given the potential for the adversary to follow up on a successful guess by accessing adjacent areas in the object to disclose or corrupt additional information in a large object. Extra weight may also be given to particular sizes that an adversary may know are more likely to contain especially sensitive information.

In FIG. 7B, a 2-bit graphical representation 710 illustrates the difference between encoding a 2-bit tag value 712 and a 2-bit size value 714. A 2-bit tag value 712 embedded in a pointer provides a value of 0 through 3. However, a 2-bit size value 714 embedded in a pointer enables allocations of fifteen possible allocation slots for objects. A size value of zero (size 0) defines one allocation slot for an object, a size value of one (size 1) defines two allocation slots for objects, a size value of two (size 2) defines four allocation slots for objects, and a size value of three (size 3) defines eight allocation slots for objects. However, the listed allocation slot quantities have been computed just within a single address space portion. An address space may encompass many address space portions, e.g. 1024 usermode address space portions for the pointer encoding shown in FIG. 6 based on addressing conventions for popular operating systems on Intel Architecture with four-level paging. Thus, not shown, the number of allocation slots provided within each address space portion by a size field of 5 bits as in FIG. 6 that ranges from 0 to 27 can be computed as follows:

$$\Sigma_{n=0}^{27} 2^n = 2^{28} - 1 = 268{,}435{,}455$$

This can be multiplied by the number of possible distinct values for the plaintext corresponding to the encrypted address slice 604 to compute the total number of allocation slots provided within the entire address space based on addressing conventions for popular operating systems on Intel Architecture with four-level paging:

$$2^{20} * 268{,}435{,}455 = 281{,}474{,}975{,}662{,}080$$

FIG. 7C shows a graphical representation 720 of encoding space redundancies with 3 bits with overlapping allocation slots representing versions over time. In some scenarios, certain size values that can be encoded in the size portion may be too large to be expressed for indicating the number of bits in the immutable and mutable plaintext portions of the pointer. Instead, these redundant sizes can be used to introduce a time dimension to the memory allocations, that is, version. Accordingly, a size portion 722 embedded in a pointer may encode both a size value and a versioning or change in time for the same object size. For example, if the size portion has three bits, then eight different size values (0 through 7) can be encoded, which defines fifteen possible allocation slots in a first address layer 724. If another bit is added to the size portion, then the number of size values that can be encoded doubles to 16. If the immutable and mutable portions contain only eight bits, then more size values (0 through 15) are available than possible bit ranges (8 bits) for encoding allocation slot locations. Accordingly, the additional size values (8 through 15) can define fifteen possible allocation slots in a second address layer 726. The first and second address layers 724 and 726 can represent different versions (or different times) for the pointer created in the same memory space for the same object size. In this way, a memory allocator may at one time allocate a object of a particular size at a particular location in the memory space, free said object, and then reallocate another object of the same size at the same (now freed) location but with a different version in order to effect the address dependent data decryption. In this way the previous (freed) pointer value to the same memory location for the same object size cannot access the encrypted data for the newly allocated object of the same size at the same location due to the different version number. In a similar way the number of bits used to indicate size and version can be increased allowing a large number of versions for any object of any size at any position in the memory space.

FIG. 7D shows a graphical representation 730 of encoding space redundancies with 3 bits with overlapping and concentrated allocation slots. In some scenarios, a size portion 732 can use versioning when a program frequently frees and reallocates memory of the same smaller size. In the scenario of FIG. 7D, sizes 2 and 3 are the most commonly freed and then reallocated memory sizes. Accordingly, with a 2-bit size portion in a 3-bit total size+version (i.e. with one version bit), instead of having two versions of every size, versions could be concentrated on one size. For example, the encoding could have three versions 736 and 734 for size 2 and 3 objects, respectively, and only one version 739 for size 0 objects and one version 738 for size 1 objects. Thus, concentrating a wrap around for the most allocated size (or sizes) maximizes versioning for that specific size or sizes (e.g., many versions of sizes 2 and 3, one version of the other sizes). This is in contrast to the previously-described embodiment in which each size encoding maps to a single size, regardless of version. In the latter embodiment, the mapping between size encodings and sizes varies depending on the version. In this example, the one-to-one mapping between encodings and sizes could be used for version 0 whereas two encodings could map to each of sizes 2 and 3 for version 1.

Size and tag/version metadata can be particularly advantageous in security attack detection. A use-after-free attack can occur when certain memory is allocated to a second pointer after it has been freed. If the original pointer is used again and points to some place within the re-allocated memory and changes data, this can be used to read or corrupt the memory. Versioning metadata can allow such attacks to be prevented and/or detected when the wrong version (old pointer) is being used by making the data encryption/integrity dependent on the pointer version (e.g. using the pointer encoded with a previously freed version will not properly decrypt the data allocated and written using a pointer encoded with the new version). Other embodiments may select a different data encryption/decryption key based on the version value, for example, by using the version as an index into a key table.

Figure 8:
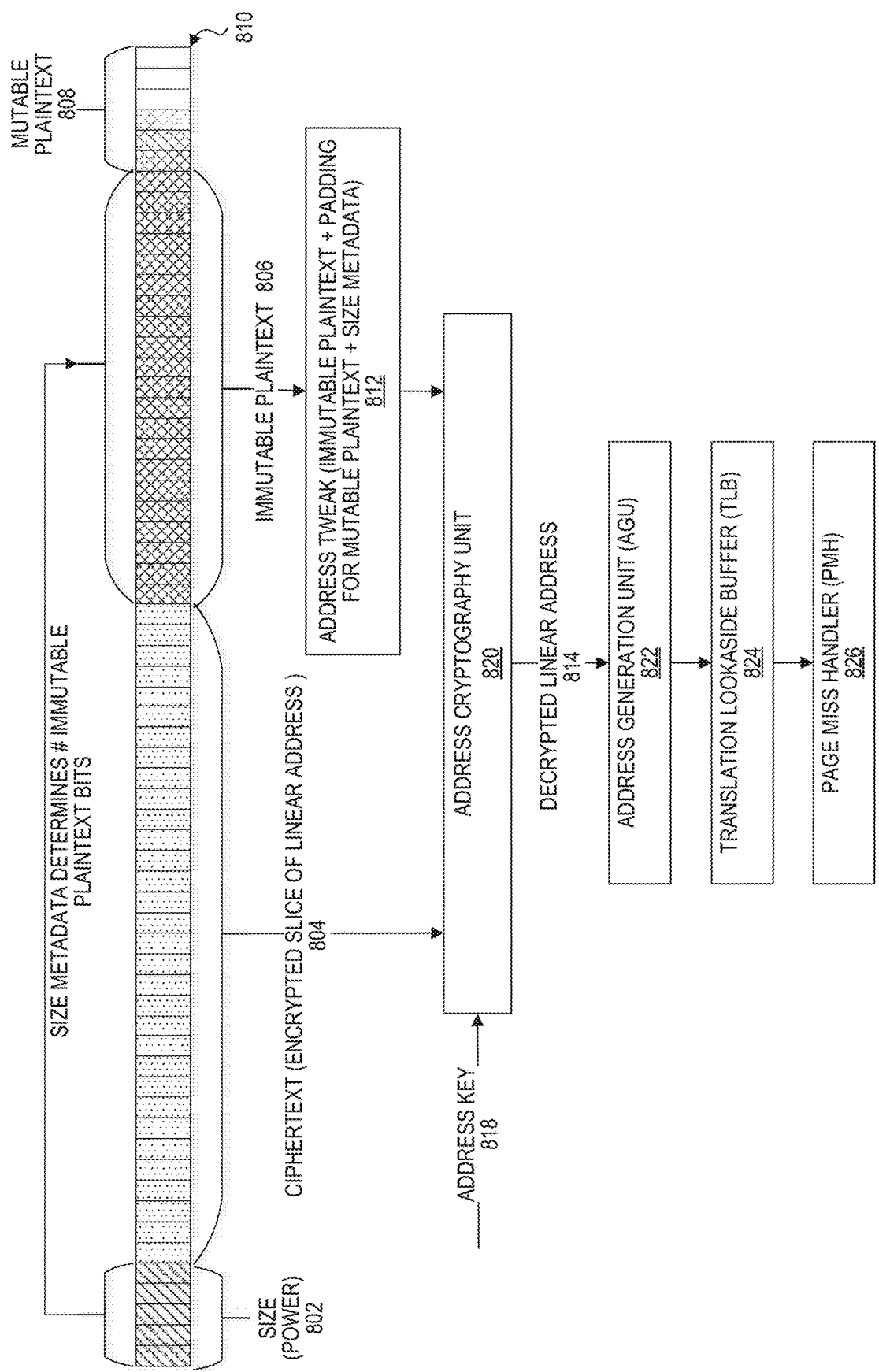
FIG. 8 is a diagram of an environment for decrypting a cryptographically encoded pointer to produce a linear address according to at least one embodiment.

Turning to FIG. 8, FIG. 8 is a diagram illustrating hardware components for decoding a cryptographically encoded pointer according to at least one embodiment. In this example, a pointer 810 is cryptographically encoded based on a memory address (e.g., linear or virtual address) of allocated memory, as previously described herein (e.g., pointer 610 of FIG. 6). Pointer 810 includes a size portion 802, a ciphertext portion 804, an immutable plaintext portion 806, and a mutable plaintext portion 808. An address cryptography unit 820 is used to decode pointer 810 to obtain a decrypted linear address 814. Additional hardware units such as an address generation unit (AGU) 822, a translation lookaside buffer (TLB), and a page miss handler (PMH) 826, for example, transform the decrypted linear address 814 into a physical address for accessing data in the allocated memory referenced by pointer 810.

Address cryptography unit 820 includes a cryptographic algorithm for decrypting the ciphertext portion 804 of pointer 810. The ciphertext portion 804 is an encrypted slice of the memory address that points to (or references) the allocated memory. In at least one embodiment, address cryptography unit 820 includes a block cipher that performs decryption of the encrypted address slice based on an address key 818 and a second input (also referred to herein as "tweak" or "address tweak") 812. Generally, a block cipher is an encryption algorithm that uses a symmetric key to encrypt a block of data in a way that provides confidentiality with properties such as bit diffusion and confusion that are important for preventing an adversary from predictably manipulating the decrypted address slice. At least some block cipher embodiments include an initialization vector (IV), which is a fixed-size input that is random, pseudorandom, or nonrepeating, depending on the particular block cipher requirements. For embodiments using a block cipher that requires an initialization vector, address tweak 812 may compose all or part of the initialization vector. In some embodiments, the address tweak may comprise one or more items of context information from the pointer (e.g., size metadata portion 802 in the example of FIG. 8), from another register, from memory, and/or from an instruction operand.

Embodiments disclosed herein allow for various pointer encodings and, therefore, various tweaks. A tweak (address tweak or data tweak) may include a random value, a deterministically different value for different memory allocations, a semantic meaning that cannot be randomized or generated as an arbitrary value, or any suitable combination thereof. Randomness and/or deterministically different values may be used as a tweak (or as part of a tweak) to diversify the cryptography. Such tweaks are referred to herein as "crypto context identifier" or "crypto context ID" and may take the form of a random tweak (or initialization vector), a deterministic tweak (or initialization vector) generated and controlled by trusted software, or a random cryptographic key. Certain tweaks, however, may have a semantic meaning that cannot be randomized or generated as an arbitrary value. For example, a size field in context information is used by the CPU to select ranges of pointer bits for processing. Accordingly, the size portion of an encoded pointer, such as pointer 810, is to have a well-defined interpretation for each size value.

In the embodiment shown in FIG. 8, address tweak 812 is obtained entirely from pointer 810 without additional look-ups in other storage locations (e.g., registers, other memory, instruction operands). Address tweak 812 includes the immutable plaintext bits (e.g., 806), padding for the mutable plaintext bits (e.g., 808), and the size metadata (e.g., 802). The padding can be any reserved value that is used to fill the variable, modifiable part of the plaintext address (i.e., mutable plaintext portion 808). For example, the padding could be all zeros, all ones, or any other designated value. If the size metadata does not define any mutable plaintext portion (e.g., if size value=0) then padding is not needed. Conversely, if the size metadata defines the mutable plaintext portion as comprising all of the plaintext address bits (e.g., if size value=27), then no immutable plaintext portion is encoded and the entire 27 bits are filled with padding (e.g., all zeros). In the example pointer 810, the immutable plaintext portion includes 21 bits and the padding includes 6 bits. Address key 818 may be generated or obtained in any suitable manner as previously described herein, for example, with respect to privileged system component 142 and key creation module 148 of FIG. 1.

Any suitable block cipher cryptographic algorithm may be implemented as address cryptography unit 820. For example, a small tweakable block cipher (e.g., a SIMON, SPECK, tweakable K-cipher at a 32-bit block size, or other variable bit size tweakable block cipher may be used). The Advanced Encryption Standard (AES) offers various block ciphers that may be implemented in any number of ways to achieve encryption/decryption of a block of data such as ciphertext 804. For example, an AES xor-encrypt-xor (XEX) based tweaked-codebook mode with ciphertext stealing (AES-XTS) may be suitable. In other embodiments, an AES counter (CTR) mode of operation could be implemented.

Once decryption of the ciphertext portion 804 is successful, address cryptography unit 820 can also generate decrypted linear address 814 based on the decrypted slice of the linear address. The decrypted slice of the linear address is concatenated with the immutable plaintext portion and the mutable plaintext portion 808. In addition, sign extension may be performed on the most significant bit of the decrypted slice of the linear address to pad or set the upper bits to a particular value.

Figure 9:
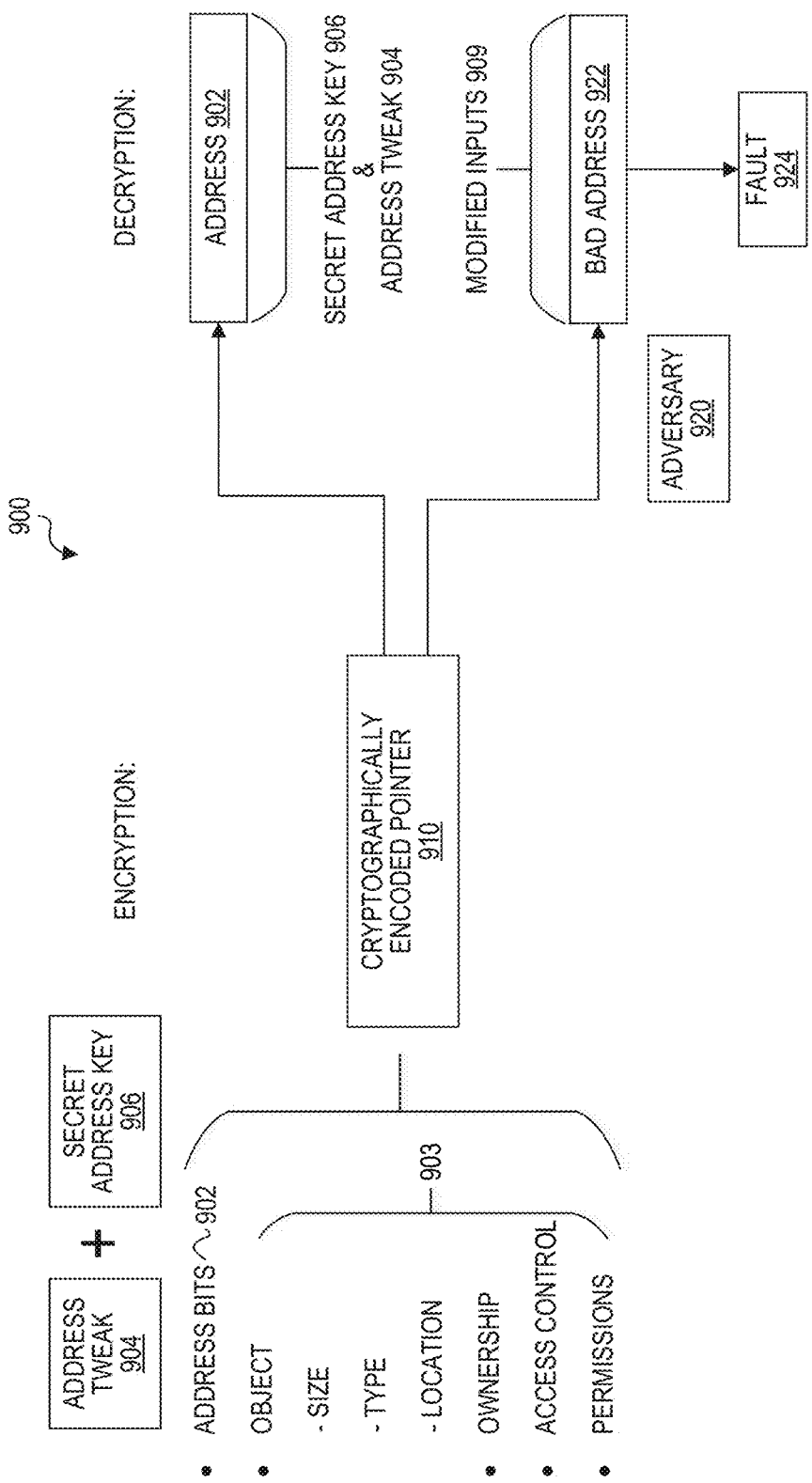
FIG. 9 is a diagram of an example adversary attempting to use a cryptographically encoded pointer to access memory according to at least one embodiment.

FIG. 9 is a diagram 900 of an example adversary 920 (e.g., malicious software, malicious user, bot, defective software, etc.) attempting to use a cryptographically encoded pointer 910 to access memory according to at least one embodiment. The example shown in FIG. 9 illustrates an address 902 being encrypted by a cryptographic algorithm using context information 903 (e.g., context information such as size of object, type of object, location of object, ownership information, access control, permissions) as an address tweak 904 to encrypt a memory address slice to obtain the ciphertext. A secret address key 906 may also be used by the encryption algorithm. The cryptographically encoded pointer 910 with an encrypted slice (ciphertext) of the address is then accessible to software and, if manipulated correctly (e.g., only mutable plaintext bits) and the CPU can provide the same implicit information when the pointer is returned to the CPU, the correct original address will be decoded.

The address tweak is intended, among other purposes, to distinguish pointers to overlapping memory regions from each other when those pointers are valid at different times and to prevent an adversary from guessing the correct address tweak value and encrypted pointer slice to obtain unauthorized access to memory. An adversary without the correct implicit information (such as the accessing function is in the wrong memory location) or the ciphertext portion of the pointer was changed incorrectly, then the processor will decode the address incorrectly, resulting in a bad/faulting memory access. For instance, in the example shown, metadata tweaks (e.g., address bits, object (size, type, and/or location), ownership, access controls, permissions, etc.) and a secret address key are used to encrypt a virtual address. If an adversary modifies an input to the decryption process (e.g., changes the encoded pointer value or provides the wrong size information) as indicated by modified inputs 909, the pointer may be decrypted to a random (or bad) address 922 that may result in a fault 924 as shown. On the other hand, if the correct tweak(s) 904 and secret address key 906 are used as shown in the top branch of the diagram, a correct memory address 902 may be obtained from the decryption process.

Figure 10:
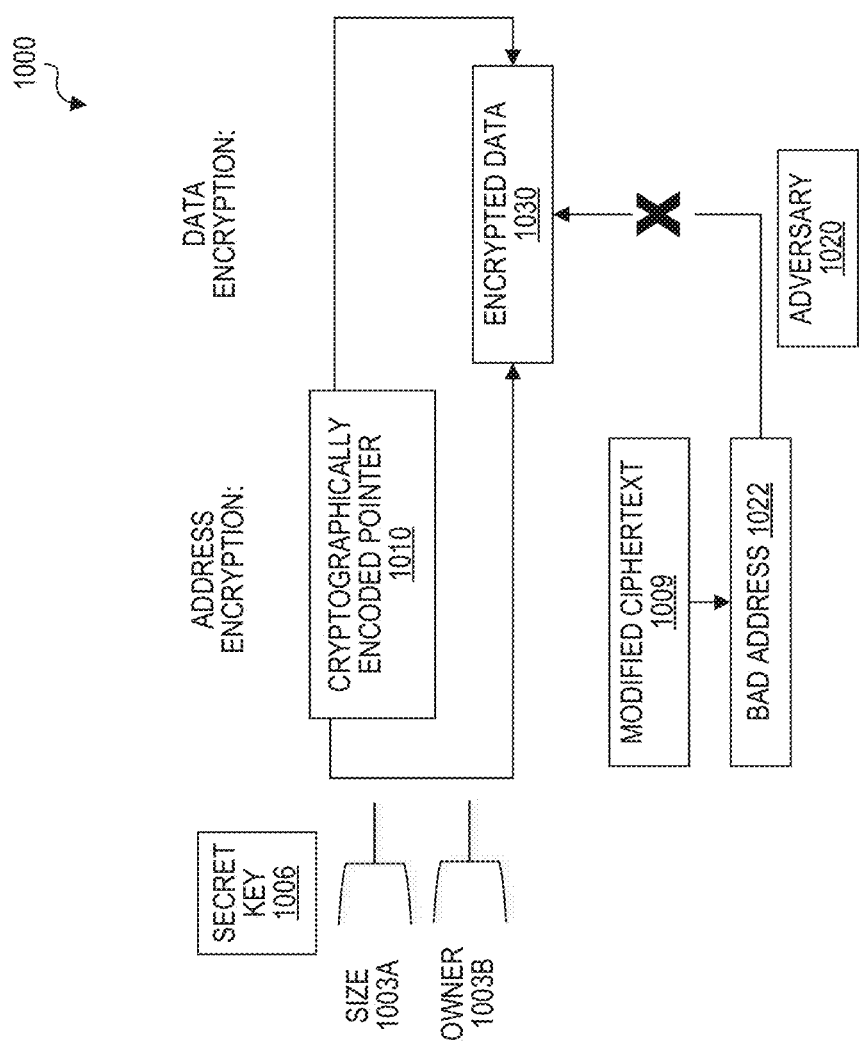
FIG. 10 is a diagram of another example adversary attempting to use a cryptographically encoded pointer to access memory according to at least one embodiment.

FIG. 10 is a diagram 1000 of another example adversary 1020 (e.g., malicious software, malicious user, bot, defective software, etc.) attempting to use a cryptographically encoded pointer 1010 to access memory according to at least one embodiment. In particular, in the example shown, the pointer 1010 is encrypted based on a secret address key 1006 and an address tweak that includes two items of context information. In this example, the context information includes a size value 1003A (e.g., number of immutable bits in pointer or a number of mutable bits in pointer) and owner metadata 1003B (e.g., owner of software and/or data being accessed). As previously described herein, however, any suitable item of context information, portion of memory address, or suitable combination thereof may be used as a tweak to encrypt the memory address slice embedded in the pointer (e.g., ciphertext portion 604, 804). A memory address slice that is embedded in pointers may be encrypted multiple times with multiple levels of contextual metadata included. In other embodiments, a memory address slice that is embedded in a pointer may be encrypted once with an address tweak containing one or more items of context information, a portion of the memory address, or any suitable combination thereof.

Data encryption may then be dependent on the pointer encoding. For instance, when encrypting data on a memory store (write) operation, the processor can take the ciphertext of the encoded address in pointer 1010 as a data tweak to encrypt the data referenced by the encoded pointer 1010. Here, the processor can use a tweakable block cipher and a secret data encryption key to encrypt the data using the encoded address ciphertext as part of the data tweak. The plaintext portion of the pointer may also be used as part of the data tweak depending on the tweak size of the cipher. For example, a store of a 64-bit register may use the PRINCE cipher with a 64-bit block size, and the encoded pointer ciphertext (604) and offset to that 64-bit block may be used as the data tweak. Similarly, 32-bit block size ciphers (e.g. SPECK, SIMON, tweakable K-cipher) could be used when running in 32-bit mode or to encrypt and store 32-bit sized registers, using the encoded address ciphertext (604) and the offset to that 32-bit memory block as a data tweak. Similarly, larger size block ciphers such as AES may be used to store a 128-bit AVX register to memory using the encoded memory address ciphertext (604) and offset to the 128 bit memory block as a data tweak. Alternatively, a smaller block size cipher (e.g. 64-bits) can be used to encrypt and store a larger register 128-bits in parts, encrypting the upper half with a data tweak for the upper half and separately encrypting the bottom half with a different data tweak. It should be noted that in at least some implementations, depending on the block cipher block size and the pointer size, then the entire pointer or any selected contents thereof can be used as a data tweak or part of a data tweak for the block cipher. For example, pointer 810 of FIG. 8 may be used as a data tweak for encrypting data with an AES counter mode cipher having a 128-bit block size.

As in FIG. 9, in the diagram of FIG. 10, decrypting encrypted data 1030 with an invalid encoded address (e.g., modified ciphertext 1009) will either result in a fault due to the pointer value decoding to a bad address 1022, or, even if the decrypted address is valid (non-faulting), the data at that location may be encrypted with a different tweak (e.g., resulting in an invalid keystream). Thus, even if an adversary attempts an unauthorized access and guesses an address tweak that causes the decrypted pointer to refer to the targeted memory, that memory is encrypted in such a way that it is bound to authorized pointers. Consequently, the adversary's access is likely to only return garbled data or induce a detectable integrity violation if integrity is enforced.

In this manner, data cryptography may be dependent on the cryptographic address encoding. A memory manager may use this to its benefit by allocating different sized objects from the heap to ensure that the ciphertext in the pointer is always different for each malloc/new instruction. For example, when freeing an allocation for 8 bytes, the next reallocation of that same location in memory may be given to an allocation of 4 bytes to produce a different ciphertext (604) for the newly allocated buffer. If the freed 8 byte allocation pointer was later incorrectly reused to access the memory location, the contents of the current 4 byte allocation will be encrypted with a different keystream/tweak such that the freed 8 byte allocation pointer will not properly decrypt the new data.

In some embodiments, data integrity can be validated by the processor implicitly based on entropy or pattern tests, as data decrypted with the wrong tweak/keystream may appear random vs. properly decoded data which will exhibit patterns. Implicit integrity is an optimization where the processor looks up integrity values (e.g. Message Authentication Code/MAC) stored in memory corresponding to the (encrypted) data every time. When the processor loads a register from memory, it may either verify the implicit integrity of the corresponding portion of the memory used to load the register/port, or, if the entropy is uncertain, the processor may look up an integrity value for that portion of the memory (e.g., based on its memory address where the register is being loaded from) to verify the contents of memory belong to that keystream/tweak. If the integrity value in memory does not match the memory (data) contents being loaded into a register given the current encoded address (tweak, keystream), an integrity violation (exception/fault) may be generated by the processor.

A write for ownership operation can be used to change the contents of memory from using one keystream to using another keystream, and this may be a privileged operation (e.g., performed by the memory manager, or determined by the permissions used with DECRYPTPTR) to allocate memory without causing integrity violations. The write for ownership may change the data and corresponding integrity values (e.g., ICVs/MACs) to match the written data contents with the new keystream/tweak. Meanwhile, normal writes will first read the old data/integrity values from memory using the encoded address being used to store (write) the register contents to memory to first verify that the correct keystream/tweaks are being used (this is a read for ownership check). In this way, attempts to overwrite memory belonging to someone else (different key/tweak) is detected and prevented.

Figure 11:
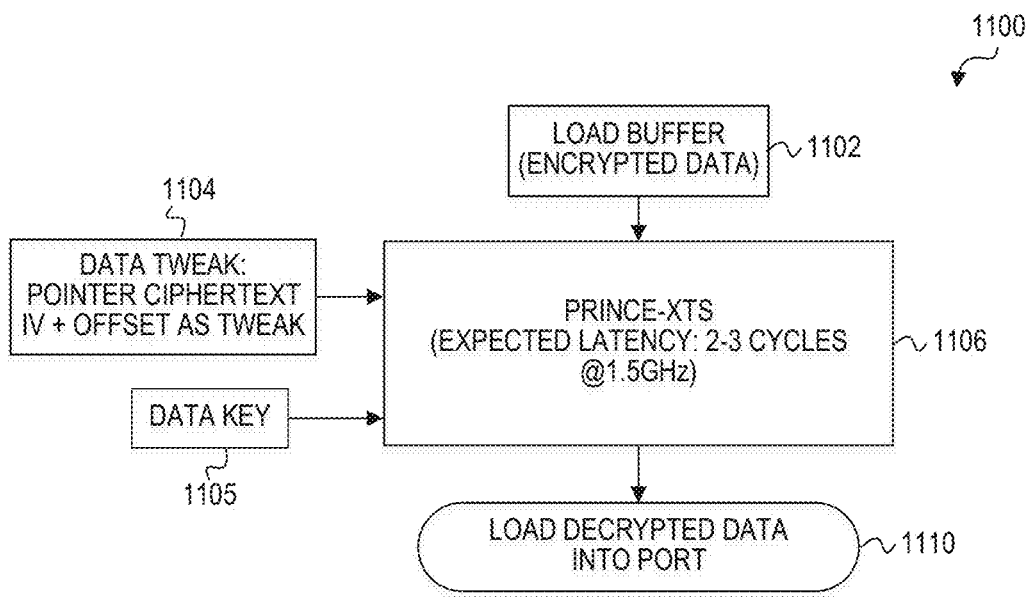
FIG. 11 is a block diagram of an XEX-based Tweaked CodeBook Mode with ciphertext stealing (XTS) block cipher that may be used for encryption and decryption in accordance with at least one embodiment.
Figure 12:
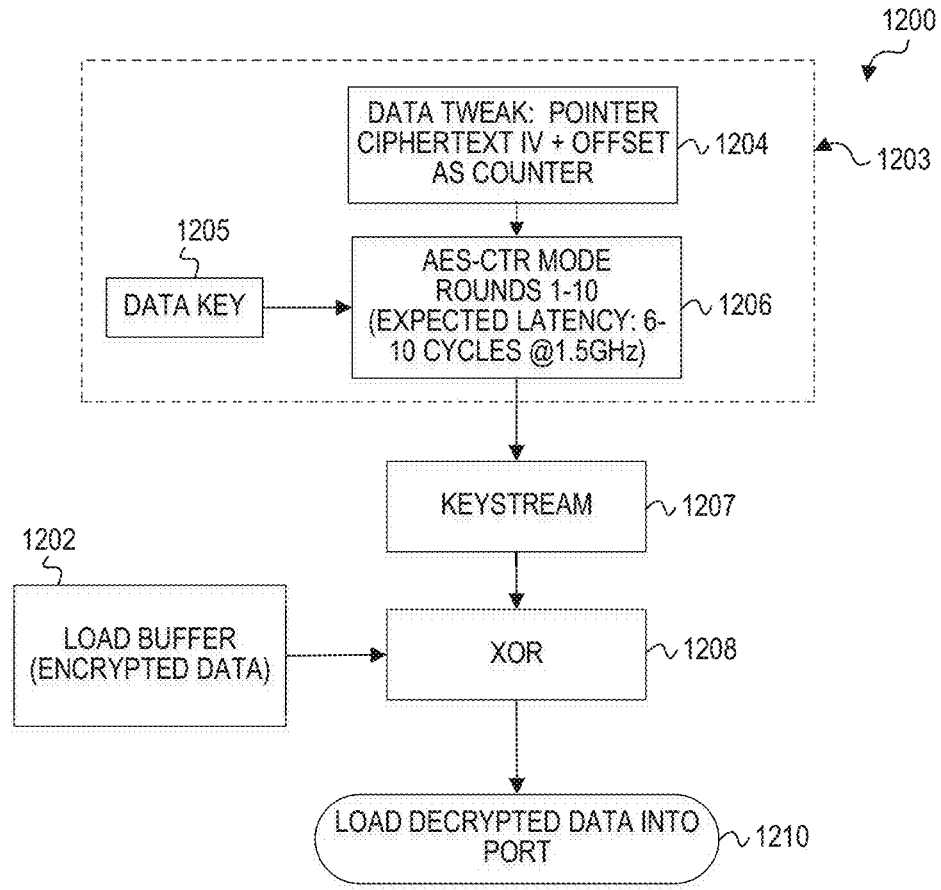
FIG. 12 is a block diagram of an Advanced Encryption Standard (AES) counter mode block cipher that may be used for encryption and decryption in accordance with at least one embodiment.

FIGS. 11 and 12 are block diagrams illustrating example block ciphers for decrypting data according to embodiments described herein. The block ciphers illustrated in FIGS. 11 and 12 are not intended to be limiting as numerous different tweakable block ciphers in various sizes may be used for encrypting and decrypting data (and memory address slices) according to particular needs and implementations of the embodiments disclosed herein.

FIG. 11 shows an Advanced Encryption Standard (AES) XEX-based tweaked codebook mode with ciphertext stealing (XTS-AES) decryption flow 1100 for decrypting encrypted data that is referenced by a cryptographically encoded pointer, such as pointer 610 or 810. AES is a block cipher that operates on blocks (e.g., fixed-length groups of bits) of data. The XTS-AES algorithm is a mode of operation of the AES algorithm. XTS-AES is a tweakable block cipher that performs an XTS-AES encryption procedure and an XTS-AES decryption procedure using the same secret data key and the same data tweak. For example, a Prince-XTS block cipher 1106 can perform encryption of data based on a data tweak 1104 and a secret data key 1105 and can also perform the counterpart decryption of the encrypted data using the same data tweak 1104 and the same data key 1105.

With reference to decryption flow 1100, after data is encrypted by Prince-XTS block cipher 1106, when the encrypted data is subsequently accessed by software (e.g., load or store instructions, etc.), the encrypted data is loaded in a buffer at 1102 and fed into Prince-XTS block cipher 1106. Data tweak 1104 and data key 1105 are also input to the block cipher 1106. Data tweak 1104 can include ciphertext (e.g., 604) and an offset from a pointer referencing the memory location of the encrypted data. In at least one embodiment, the offset can include the immutable plaintext portion (e.g., 606) and the mutable plaintext portion (e.g., 608) of the pointer. The block cipher 1106 decrypts the encrypted data using the data tweak 1104 and the data key 1105. The decrypted data can be loaded into a port at 1110 for use by the software.

FIG. 12 shows an Advanced Encryption Standard (AES) counter mode (AES-CTR) decryption flow 1200 for decrypting encrypted data that is referenced by a cryptographically encoded pointer, such as pointer 610 or 810. An AES-CTR algorithm is a mode of operation of the AES algorithm. AES-CTR is a block cipher that can be used in an AES-CTR mode encryption procedure and an AES-CTR mode decryption procedure using the same secret data key and the same data tweak. For example, in an AES-CTR mode encryption procedure, an AES-CTR block cipher encrypts a data tweak based on a secret data key to create a keystream that then encrypts a block of data using an XOR operation. In a counterpart AES-CTR decryption procedure, the AES block cipher encrypts the same data tweak based on the same secret data key to create the keystream that then decrypts the corresponding block of encrypted data using an XOR operation.

In an example, prior to decryption flow 1200 being invoked, data is encrypted in an AES-CTR mode encryption procedure. In the AES-CTR mode encryption procedure, an AES-CTR mode block cipher 1206 encrypts a data tweak/initialization vector (IV) 1204 based on a secret data key 1205 to create a keystream 1207. The keystream 1207 is used in an XOR operation 1208 to encrypt a block of data. This may be performed for multiple blocks of data with AES-CTR block cipher 1206 encrypting a new data tweak for each block of data to be encrypted. The new data tweak may be computed by incrementing a counter in the data tweak. The counter (or tweak/IV) 1204 can include ciphertext (e.g., 604) and an offset from a pointer referencing the memory location of the encrypted data. In at least one embodiment, the offset can include the immutable plaintext portion (e.g., 606) and the mutable plaintext portion (e.g., 608) of the pointer. After the AES-CTR mode encryption procedure is completed and encrypted data is generated, decryption flow 1200 may be invoked when the encrypted data is accessed by software (e.g., load or store instructions, etc.). In the decryption flow 1200, the encrypted data generated by the AES-CTR mode encryption procedure is loaded into a buffer at 1202. The AES-CTR mode block cipher 1206 encrypts the same data tweak/IV 1204 based on the same secret data key 1205 to create the keystream 1207. The keystream 1207 is used in the XOR operation 1208 to decrypt the corresponding block of encrypted data that was previously generated by the AES-CTR mode encryption procedure. This may be performed for each block of encrypted data using a new data tweak (e.g., computed by incrementing the counter in the data tweak) for each block. The decrypted data can be loaded into a port at 1210 for use by the software.

Generally, when encrypting/decrypting data, it is advantageous to avoid using the same tweak/IV for every block of data within a given allocation. Thus, a value in the tweak/IV varies depending on the position of the particular block being processed. In certain block ciphers, such as AES-CTR mode (e.g., 1206), an initialization vector (IV) embodies this concept as it is transformed (e.g., incremented) when generating subsequent blocks of a keystream. However, embodiments herein allow software to access any block of an allocation from any memory access instruction. Thus, the relative offset of the access has to be incorporated in the tweak/IV. Incorporating an offset of the linear address encoded in the pointer is one possible way to achieve this in various embodiments using offsets, which are described herein.

It should also be noted that operations indicated at 1203 may be performed in parallel to operations to obtain encrypted data to be decrypted. The operations for obtaining the encrypted data include decoding a cryptographically encoded pointer to form a linear address and using the linear address to locate the encrypted data. The encrypted data may then be stored in the buffer at 1202.

Figure 13:
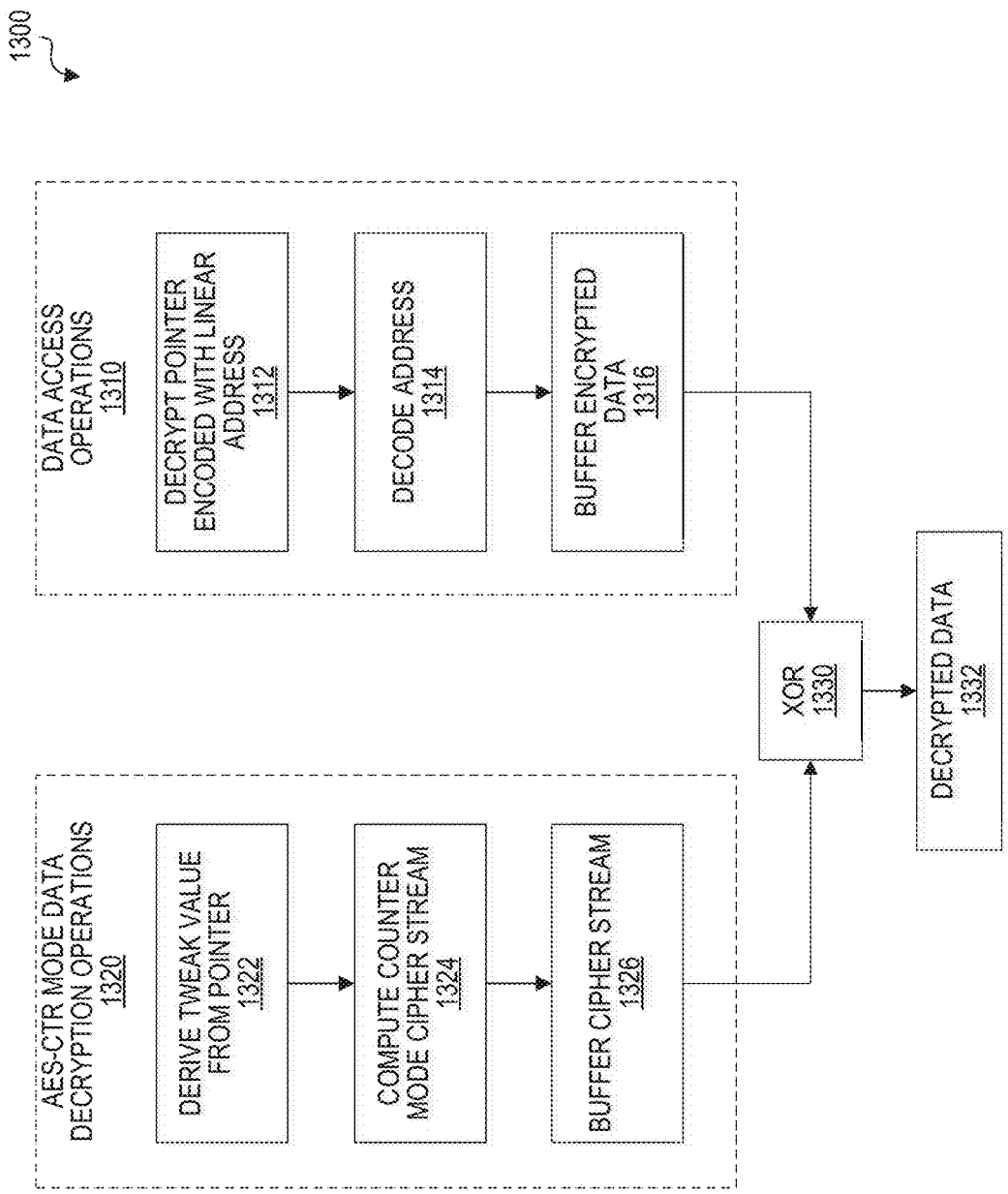
FIG. 13 is a flow diagram illustrating possible parallel processing of accessing encrypted data at a memory location referenced by a cryptographically encoded pointer according to at least one embodiment.

FIG. 13 is a simplified flow diagram illustrating an example process 1300 for accessing encrypted data, where the encryption is bound to pointer including an encrypted memory address slice (e.g., ciphertext portion 604, 804) according to or more embodiments. The flow diagram of FIG. 13 illustrates parallel processing that is possible when certain types of encryption/decryption techniques are implemented in one or more embodiments. In particular, if an embodiment uses an AES-CTR mode of operation (e.g., FIG. 12) for encrypting and decrypting data, then some of the counter mode operations for decrypting data (e.g., AES-CTR mode block cipher encryption operations 1320) can be performed in parallel with operations for accessing the data to be decrypted (e.g., data access operations 1310).

At 1312, a cryptographically encoded pointer (e.g., 610) is decrypted to obtain the plaintext of the ciphertext portion (e.g., 604) of the pointer. At 1314, the memory address in the pointer is decoded. For example, the decrypted address slice is concatenated with lower address bits (e.g., immutable plaintext portion 606). Additionally, an offset (e.g., mutable plaintext portion 606) may be combined with the linear address (e.g., concatenated with the immutable plaintext portion). In another embodiment further described below, the decrypted address slice may be concatenated with upper address bits stored externally (e.g., in a register). Once the memory address is decoded and the plaintext linear address is obtained, the physical address for the encrypted data in memory is obtained using any appropriate operations. At 1316, the encrypted data is obtained and stored in a buffer based on the physical address in memory.

To increase efficiency in processing, the AES-CTR mode block cipher encryption operations 1320 may be performed in parallel with the data access operations 1310. The AES-CTR mode block cipher encryption operations include, at 1322, derive a data tweak (e.g., initialization vector) from the cryptographically encoded pointer. As previously described, a data tweak may include the pointer ciphertext portion (604), the immutable plaintext portion 606, and padding for the mutable plaintext portion 608. However, other embodiments may use different variations or combinations of portions of the pointer. Moreover, other embodiments may use certain data derived from the encoded pointer combined with external context information. At 1324, the counter mode block cipher computes a counter mode cipher stream (keystream) by encrypting the data tweak based on a secret data key. At 1326, the cipher stream is stored in a buffer. Additional cipher streams may be computed based on incrementing the tweak value and encrypting the new data tweak with the secret data key. The cipher streams can be stored in the buffer so that all of the blocks (or cache lines) of the encrypted data can be decrypted. Once the encrypted data is stored at 1316, an XOR operation may be performed on each buffered cipher stream and corresponding block or cache line of encrypted data 1316. Each XOR operation 1330 produces a block of decrypted data 1332 for the associated block or cache line, which can be loaded, read, re-encrypted, or otherwise manipulated by the software as needed.

Figure 14:
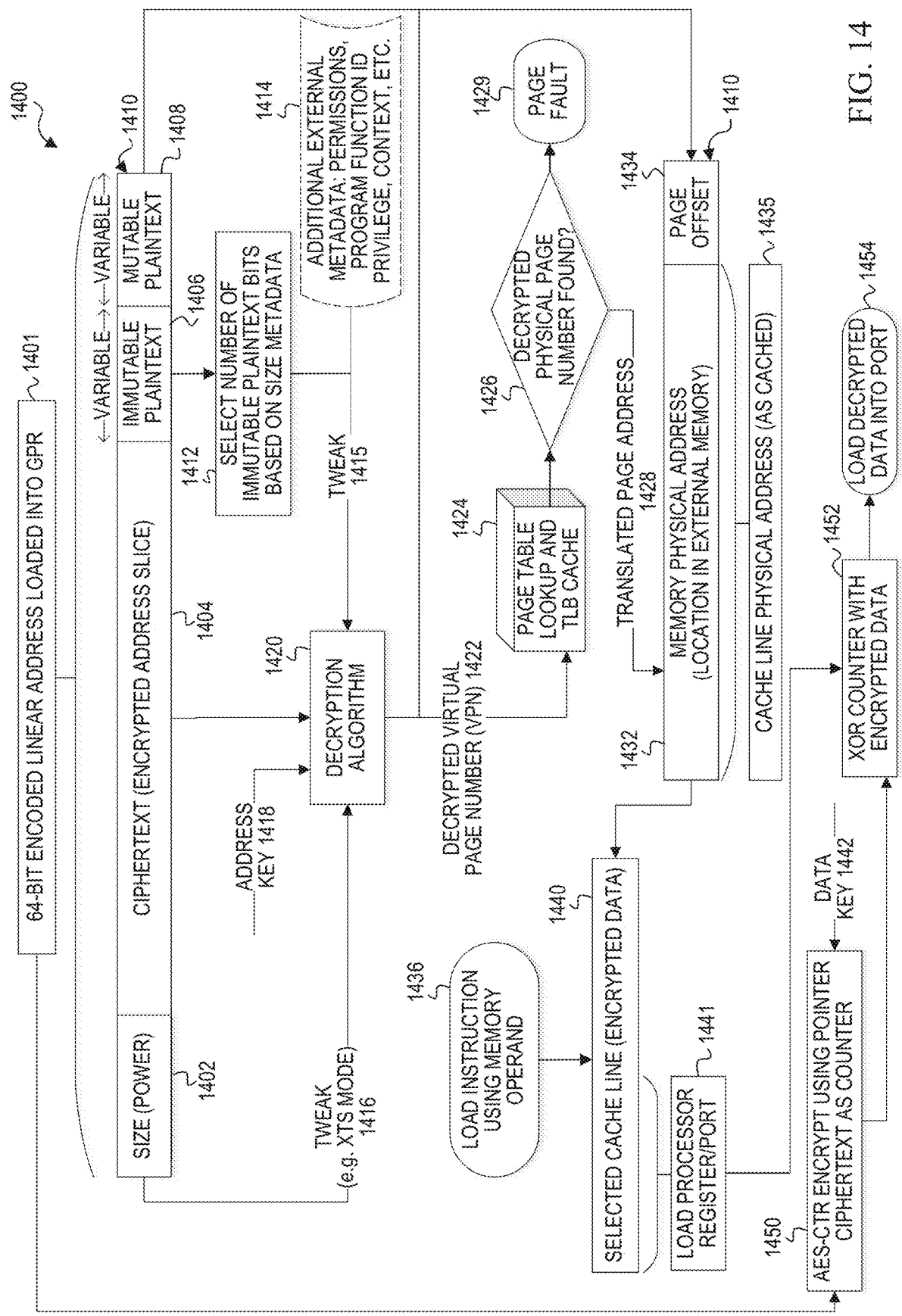
FIG. 14 is a simplified flow diagram illustrating an example process of binding an embodiment of a cryptographically encoded pointer to the encryption of the data referenced by that pointer according to at least one embodiment.

FIG. 14 is a simplified flow diagram illustrating an example process 1400 of obtaining data referenced by a cryptographically encoded pointer, where encryption of the data is bound to a ciphertext portion of an encoded linear address in the pointer according to at least one embodiment. At least some portions of process 1400 may be executed by hardware, firmware, and/or software of the computing device 100. In the example shown, at 1401, a 64-bit encoded linear address in a cryptographically encoded pointer 1410 is loaded into a general purpose register (GPR). A ciphertext portion 1404 (e.g., 604 of FIG. 6) of the encoded linear address is decrypted using the size (power) metadata portion 1402 (e.g., 602 of FIG. 6) and immutable plaintext portion 1406 (e.g., 606 of FIG. 6) as part of an address tweak. Although address tweaks 1416 and 1415 are indicated separately, this information may be combined in any suitable manner as a single address tweak for input to a decryption algorithm 1420 such as a tweakable block cipher (e.g., XTS-AES, LRW, etc.). At 1412, the size metadata portion 1402 is used to determine the number of bits in the immutable plaintext portion 1406 to be used as tweak 1415. In at least some embodiments, an additional one or more items of external context information or metadata 1414 may also be used as part of the tweak 1415 for the decryption algorithm 1420. The decryption algorithm 1420 decrypts ciphertext portion 1404 based on the address tweak (e.g., combination of address tweaks 1416 and 1415) and a secret address key 1418.

The ciphertext portion 1404 is decrypted by the decryption algorithm 1420, and the size metadata portion 1402 is removed from the GPR. After removing the size (power) metadata portion 1402 and concatenating with the portion of the plaintext address bits that select the page, this results in a decrypted virtual page number 1422 that is translated by a translation lookaside buffer into a physical page number. At 1424 a page table lookup is performed to translate the decrypted and decoded VPN 1422 to a physical page number. If a determination is made at 1426 that no physical page number is found, then a page fault is raised at 1429. If no fault occurs, then the translated page address 1428 is stored in the register 1410 as the memory physical address 1432, which is the cache line physical address 1435. The remainder of the plaintext bits (e.g., 1408) in the pointer that were not used for the virtual page number are used as the page offset 1434 to select a cache line of the data in the memory. In the example shown, a register 1441 is being loaded with a portion (e.g., a block) of the contents (i.e., encrypted data) of the selected cache line 1440 at the location determined by the plaintext address offset 1434.

In this example, the data is encrypted with a counter mode, e.g., AES Counter Mode (AES-CTR), at a particular size granularity (any suitable size), with the encoded address being used as the counter value (CTR), potentially concatenated with other metadata if the block cipher in use accepts sufficiently large inputs The plaintext offset can comprise the bits of the mutable plaintext portion 1408. The IV+CTR concatenated value (address tweak value) may then be encrypted at 1450 based on a secret data key 1442. The resulting keystream is then XORed at 1452 with the loaded cache line data being sent to a register or execution unit using the interface 1441 at the granularity matching the register store/load granularity. Thus, when a data load (e.g., read) is performed by the processor using an encoded address, the data may be decrypted using the secret data key 1442 (e.g. process key), and dependent on the encoded pointer ciphertext as a tweak and the appropriate offset given the memory location corresponding to the register load. In this way, the data encryption/decryption is dependent on the pointer used to access the data at the decoded memory location. In this way, each data object allocated in a memory may be cryptographically bound to the cryptographically encoded pointer used to access that data.

Figure 15:
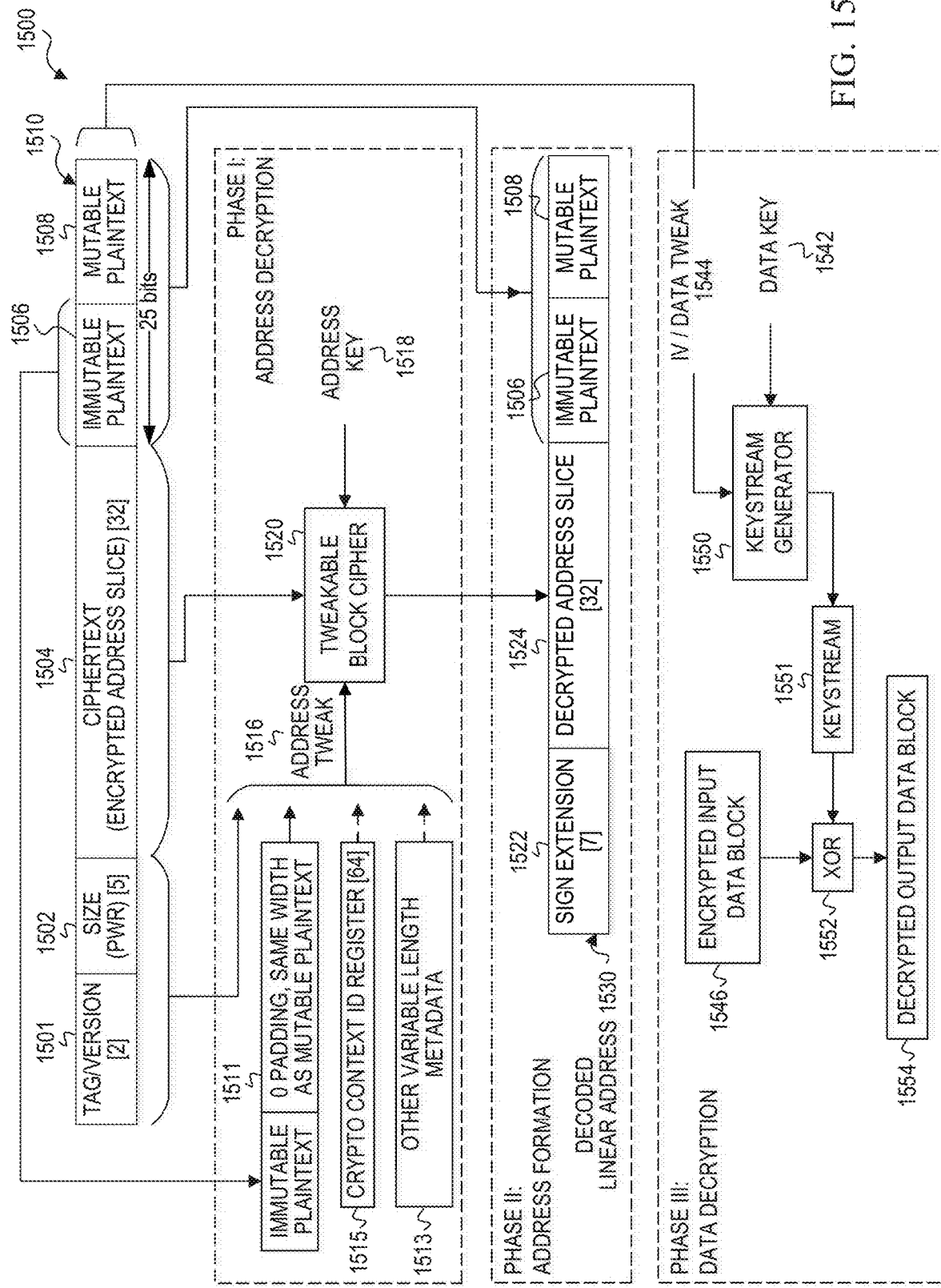
FIG. 15 is flow diagram illustrating an example process of binding a cryptographically encoded pointer to the encryption of the data referenced by that pointer according to at least one embodiment.

FIG. 15 is another detailed flow diagram illustrating an example process 1500 of obtaining data referenced by a cryptographically encoded pointer 1510, where encryption of the data is bound to the contents of the pointer according to at least one embodiment. At least some portions of process 1500 may be executed by hardware, firmware, and/or software of the computing device 100. In the example shown, pointer 1510 is embodied as a 64-bit encoded linear address including a 2-bit tag/version portion 1501, a 5-bit size (or power) metadata portion 1502, a 32-bit ciphertext portion 1504, a variable-bit immutable plaintext portion 1506, and a variable-bit mutable plaintext portion 1508.

Generally, pointer 1510 has a similar configuration to other pointers described herein (e.g., 610, 810, 1410). However, pointer 1510 includes a tag/version portion 1501, which may be a random or deterministically different value. In other embodiments, the two upper bits may be reserved bits that allow cryptographically encoded pointers to be used concurrently with legacy pointers. For example, the most significant bit can be used to indicate whether the address is located within the supervisor address space (e.g., "1") or within the user mode address space (e.g., "0"). The next most significant bit can be set to the opposite value of the supervisor bit to indicate that the pointer is cryptographically encoded or can be set to the same value of the supervisor bit to indicate that the pointer is not cryptographically encoded. In other embodiments, the legacy encoding may be achieved without dedicated reserved bits. Instead, legacy encoding can be achieved by encoding particular values in the size metadata portion 1502 (e.g., all 1s, all 0s). If the pointer 1510 includes the tag/version portion 1501, then these bits may also be encoded with the particular values (e.g., all 1s, all 0s) to allow legacy and conventional encoding to be used concurrently. In yet other embodiments, legacy encoding may be eliminated entirely if, for example, the concepts are not implemented to be compatible with legacy programs.

It should be noted that the size/power metadata portion 1502 may not be encrypted as it is used to determine the number of bits in the mutable and immutable plaintext portions of the pointer and, therefore, the number of bits used in the address tweak (e.g., immutable plaintext portion 1506). The tag/version portion 1501, however, is not used to determine the size of the address tweak. Therefore, the tag/version portion 1501 may alternatively be included as part of the encrypted portion of the address (i.e., ciphertext 1504) as long as the tag/version portion 1501 is not used in the address tweak. In this alternative embodiment, the block cipher would have a correspondingly larger block size to fit the tag/version portion, or the address bits included in the ciphertext would be reduced and a corresponding number of address bits would be included in the plaintext portion (i.e., 1506 and 1508). Additionally, it should be noted that, although the process 1500 is illustrated with the encoding shown in pointer 1510, which includes a tag/version (or reserved bits) portion 1501, process 1500 could be performed with other pointer encodings having a size/power metadata portion such as pointer 610, which does not include a tag/version (or reserved bits) portion. In this scenario, the tag/version (or reserved bits) portion may simply be eliminated from the address tweak.

The operations of process 1500 are identified in three phases: address decryption (Phase I), address formation (Phase II), and data decryption (Phase III). In Phase I, the linear address embedded in pointer 1510 is decrypted. Specifically, ciphertext portion 1504 of the encoded linear address is decrypted by a decryption algorithm such as a tweakable block cipher 1520 using an address key 1518 and an address tweak 1516. The address tweak 1516 can include bits of tag/version portion 1501, size metadata portion 1502, and immutable plaintext portion 1506, in addition to zeros padding 1511. The size metadata portion 1502 is used to determine the number of bits in immutable plaintext portion 1506 and the number bits in mutable plaintext portion 1508, which equals the number of bits for padding 1511 in the address tweak 1516. In at least some embodiments, an additional one or more items of variable length metadata 1517 may also be used as part of address tweak 1516 for the tweakable block cipher 1520. For example, the variable length metadata may include other context information or metadata (e.g., permissions, privilege level, type, location, ownership, etc.) as previously described herein. In yet further embodiments, a crypto context identifier register 1515 may be used as part of address tweak 1516. The crypto context identifier register 1515 may contain a unique value (e.g., randomly or deterministically generated) associated with a particular functional group (e.g., processes, subset of processes, virtual machines (VM), subset of VMs, etc.). The block cipher 1520 may be any suitable decryption algorithm (e.g., tweakable version of a 32 bit block size cipher such as SIMON, SPECK, K-cipher, or other variable block size cipher, or for larger addresses, PRINCE, XTS-AES block cipher, LRW, AES-CTR mode, etc. may be used) as noted herein.

When the ciphertext 1504 portion of the encoded linear address has been decrypted into a decrypted address slice 1524 by tweakable block cipher 1520, then a decoded linear address 1530 can be formed in Phase II. If the tag/version portion 1501 was included as part of the encrypted portion of the address (i.e., ciphertext 1504), then the tag/version portion in the decrypted base address slice 1524 should be overwritten with sign extension bits 1522 when forming the decoded linear address 1530. In at least one embodiment, the uppermost bits (e.g., tag/version portion 1501 and size portion 1502) can be set to the same bit value (e.g., 0 or 1). In addition, the bits of the immutable plaintext portion 1506 and mutable plaintext portion 1508 make up the lower bits of the decoded linear address 1530. In some embodiments, the processor may check whether a slice of the upper bits in decrypted address slice 1524 has an expected value as an indication of whether the decrypted address slice 1524 was decrypted incorrectly. For example, in some paging modes, some number of upper address bits are required to all have the same value (i.e. all 0's or all 1's). If the corresponding bits in the decrypted address slice 1524 have differing values, then that indicates that decrypted address slice 1524 was decrypted incorrectly. Some embodiments may generate a fault in that case. Some other embodiments may rely on existing canonicality checks to generate a fault in that case when the decoded linear address 1530 is used. Even if the upper bits do all have the same value, that may not conclusively indicate that decrypted address slice 1524 was decrypted correctly. Some embodiments may perform the aforementioned checks for expected bit values for both the minimum and maximum addresses to be accessed in the current operation so that a fault will likely be generated if any portion of the access is out-of-bounds. Other embodiments may only require that a particular portion of the access, e.g. the first byte, be within the bounds of the pointer, and thus only perform the aforementioned checks for expected bit values on the pointer for that portion of the access. Other embodiments may check both the minimum and maximum addresses for write operations but only check a single pointer value for reads, relying on data cryptography to likely prevent partially out-of-bounds reads from returning correct plaintext.

The decoded linear address 1530 is used to find the memory location of the encrypted data to be decrypted in Phase III. The encrypted data is decrypted by a decryption algorithm such as keystream generator 1550. In at least one embodiment, keystream generator 1550 can be implemented as an AES-CTR mode block cipher, at a particular size granularity (any suitable size). In this embodiment, the contents of the cryptographically encoded pointer are used as the initialization vector (IV) or data tweak 1544, with the plaintext offset (e.g., 1508) being used as the counter value (CTR). Generation of keystream 1551 may commence without waiting for encrypted address slice 1504 to complete. Keystream generator 1550 encrypts data tweak 1544 based on a data key 1542 to generate a keystream 1551. The value of data tweak 1544 may be adjusted to be congruent to 0 (modulo the block size of the keystream generator 1550) prior to being used as an input to the keystream generator. The value of the data tweak 1544 may have some suitable number of least significant bits set to 0 to satisfy this requirement and a prefix of the keystream 1551 may be discarded to account for that adjustment. The number of bytes of the keystream 1551 to discard may be computed by subtracting the adjusted value of the data tweak 1544 from the unadjusted value of the data tweak 1544. This adjustment may modify the values of immutable plaintext 1506 in pointers to objects smaller than the block size. However, the data encryption may be indirectly bound to the values of the modified immutable bits, since those bits may be incorporated in the tweak used to generate ciphertext 1504. If the memory to be decrypted crosses one or more block-aligned boundaries, the keystream generator 1550 may be re-invoked for the subsequent blocks with the data tweak 1544 being increased by an amount equal to the block size each time that it is re-invoked. A suffix of the generated keystream 1551 may be unneeded and thus discarded. An XOR operation 1552 is then performed on keystream 1551 and an encrypted input data block (or cache line) 1546 selected from the memory location referenced by the decoded linear address 1530. The granularity of the encrypted input data block 1546 matches the keystream 1551 output from of the keystream generator 1550, and the XOR operation 1552 produces a decrypted output data block 1554. Likewise, when storing data back to cache/memory the same operations may be performed, where the plaintext data from a processor register may be XORed with the keystream output 1551 for the encoded address 1544 and the resulting encrypted data written back to memory.

Figure 16:
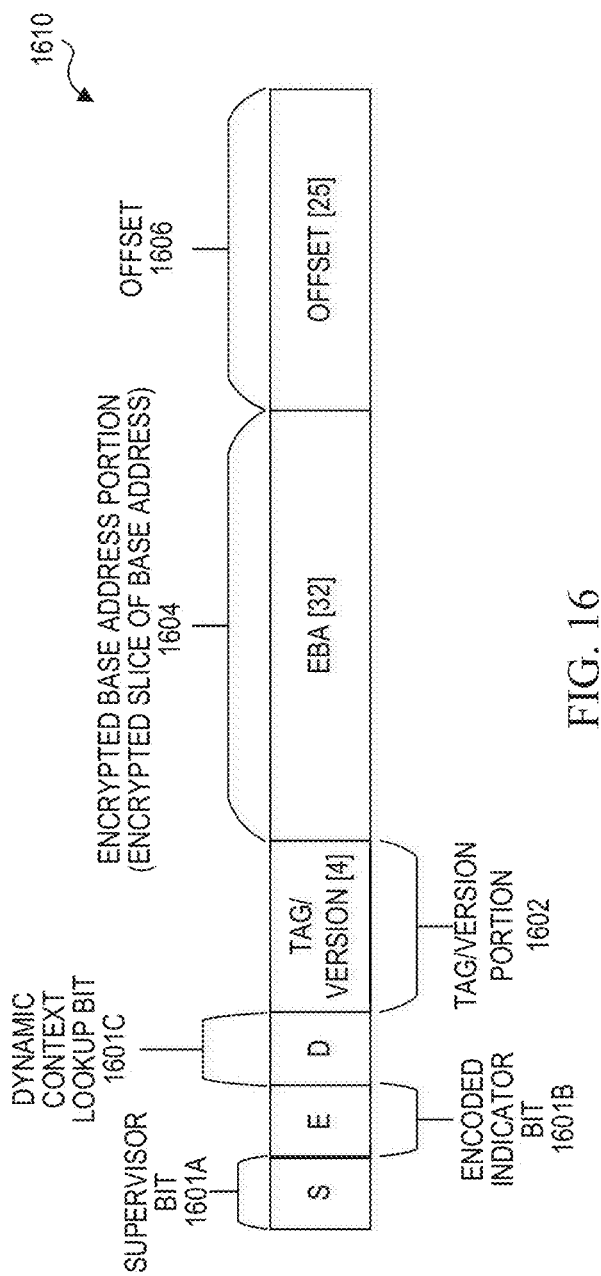
FIG. 16 is a diagram of another example pointer according to at least one embodiment of the present disclosure.

Turning to FIG. 16, FIG. 16 is a diagram of another embodiment of a cryptographically encoded pointer according to at least one embodiment in the present disclosure. In particular, FIG. 16 shows a cryptographically encoded 64-bit pointer 1610 (address) in an encrypted base address (EBA) format (also referred to herein as "EBA pointer"). In the example shown, the EBA pointer includes a supervisor bit (S-bit) 1601A, an encoded indicator bit (E-bit) 1601B, a dynamic context lookup bit (D-bit) 1601C, a 4-bit tag/version portion 1602, a 32-bit encrypted base address (EBA) portion 1604, and a 25-bit offset portion 1606. With typical canonical encoding, the bits that are adjacent to the most significant bit, and that are not part of the encoded address, have the same value as the most significant bit in order to be considered canonical (e.g., conventional or non-cryptographically encoded pointers). In a 64-bit register used for 57-bit paging, the most significant seven bits are not used as part of the 57 address bits. In an embodiment of EBA pointer 1610, the seven most significant bits can include three upper bits 1601A-1601C and four tag/version bits 1602.

Two upper bits (e.g., 1601A, 1601B) of a pointer can be encoded to indicate that the pointer is a cryptographically encoded pointer rather than a conventional pointer, so that both types of pointers can potentially be used in a single address space. For example, the supervisor bit 1601A is used to indicate whether the encoded linear address is in the supervisor address space (e.g., "1") or within the user mode address space (e.g., "0"). The encoded indicator bit 1601B can indicate whether the pointer is a cryptographically encoded pointer or a legacy pointer (i.e., not cryptographically encoded). For example, the encoded indicator bit 1601B can be set to the opposite value of the supervisor bit 1601A to indicate that the pointer is cryptographically encoded or can be set to the same value of the supervisor bit 1601A to indicate that the pointer is not cryptographically encoded. In other embodiments, the upper bits 1601A and 1601B may not be used. Instead, the legacy encoding could be achieved without dedicated bits by encoding special values in the tag/version portion 1602 (e.g., all 1s, all 0s) to indicate that the pointer is not cryptographically encoded. These special values (i.e., all 1s, all 0s) are the legacy non-canonical encodings for the upper linear address bits between user and supervisor space. Any other values in the tag/version portion can indicate that the pointer is encoded as a cryptographically encoded pointer with a tag/version portion. Thus, both types of pointers (e.g., conventional and cryptographically encoded with a tag/version portion) can potentially be used in the same address space. In yet other embodiments, legacy encoding may be eliminated entirely if, for example, the concepts are not implemented to be compatible with legacy programs. The optional dynamic context lookup bit 1601C can be used to indicate how context information is to be obtained for use in an address tweak to decrypt the encoded linear base address slice in the pointer and/or in a data tweak to decrypt the encrypted data. For example, the dynamic context lookup bit 1601C can indicate whether the context information is to be obtained statically (e.g., in registers, embedded in code) or dynamically (e.g., in memory). This feature is optional, however, and in at least some embodiments, the context information may be stored in a consistent location (e.g., storage structure in memory).

Tag/version portion 1602 can be used in the address tweak and the data tweak, and can be a number or value that is unique to the memory allocation or memory region referenced by a particular valid pointer. In one example, tag/version portion 1602 is a randomized string of bits (e.g., 4 bits or any other suitable size). In another example, tag/version portion 1602 is a deterministic value such as a sequential number that is incremented by a predefined amount each time a pointer is generated for a particular memory allocation. Versioning may be implemented at any suitable granularity (e.g., by program, by particular linear address, etc.). The tag/version portion adds diversity to the encryption of an address tweak and/or a data tweak. However, the address encryption and data encryption may be sufficiently secure using the context information in the tweaks or using the context information and upper address bits in the tweaks, without the tag/version portion.

In EBA pointer 1610, a linear base address of the data is encoded. A 64-bit pointer may not have enough space to encode the entire base address of the data. Therefore, a slice of the base address is encrypted and stored in the pointer. In this example, bits 3 through 34 of the base address are encrypted and compose the encrypted base address portion 1604 of EBA pointer 1610. The upper address bits (UAB) that are not embedded in pointer 1610 are stored separately from the pointer. When decoding the pointer, the upper address bits can be pulled from a table entry associated with the data (or code), from a separate register, from an operand in the data access instruction, or from a register that covers multiple objects (or code segments). The remaining 25 bits in the pointer comprise an offset within the data. The offset specifies the number of bytes beyond the base address to which the pointer 1610 is pointing. Typically, the offset portion 1606 is set to zeros. It should be apparent, however, that instructions could be defined to initialize the offset portion 1606 to any desired number based on particular needs and implementations. The offset may be manipulated by software, e.g. for pointer arithmetic or other operations. The encrypted base address portion 1604 (e.g., 32 bits in the example shown) of the EBA pointer 1610 may be encrypted with a small tweakable block cipher (e.g., SIMON, SPECK, or K-cipher at a 32-bit block size, or other variable bit size tweakable block cipher).

Figure 17:
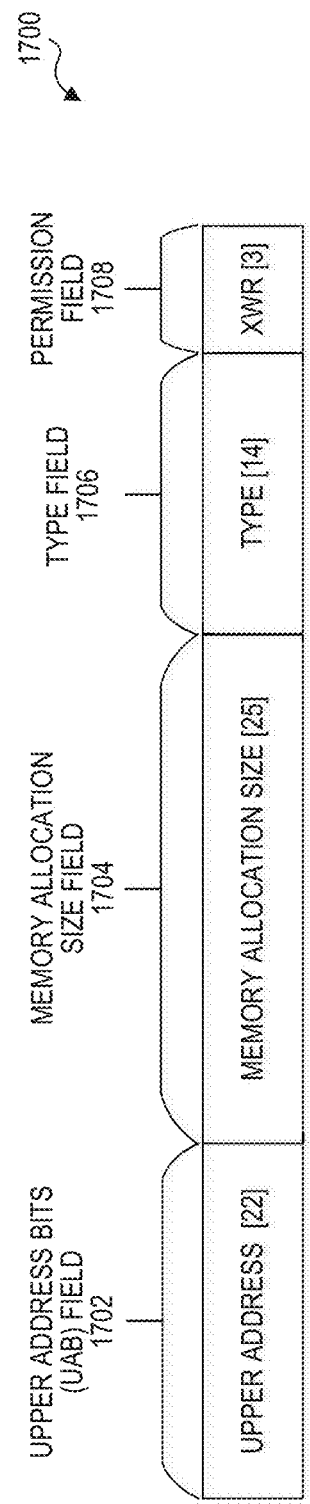
FIG. 17 is a diagram of an example of context information according to at least one embodiment of the present disclosure.

FIG. 17 is a diagram of example context information 1700 that can be used when encoding and decoding a pointer with an encrypted base address, such as EBA pointer 1610. In at least one embodiment, context information 1700 is one table entry that is stored separately from the pointer and that can be dynamically accessed to retrieve context information needed to encrypt or decrypt a slice of an encoded linear address and possibly data referenced by the linear address. In this example, context information 1700 includes upper address bits (UAB) field 1702, memory allocation size field 1704, type field 1706, and permission field 1708.

UAB field 1702 includes the upper bits that are to be concatenated with the decrypted base address from the pointer 1610. For example, the encrypted base address portion 1604 may contain only 32 bits (encrypted) of the linear address (e.g., bits 3 to 34), the UAB field 1702 in context information 1700 may contain 22 bits, and the lowest three bits (bits 0-2) can be set to "0" to align the base address to an 8-byte boundary. The lowest three bits may not be encoded in the pointer. Once the encrypted base address portion 1604 is decrypted, the bits in the UAB field 1702 can be obtained from context information 1700 stored in memory or from a register and concatenated with the decrypted base address slice. The lower three bits set to "0" may also be concatenated at the end of the address.

Context information may be embedded in code (e.g., in an instruction operand) or may be stored in memory. It should be noted that if larger registers (e.g., 128-bit register, 256-bit register, etc.) are used for the cryptographically encoded pointers, then the entire base address may be encoded in the pointer. For 64-bit registers, however, the encrypted base address portion (e.g., 1604) may be too narrow to specify a complete base address. Consequently, upper address bits can be pulled from another storage location during a memory access request (e.g., load, store). In some scenarios, upper address bits may be stored in memory for example, with other context information. In other scenarios, upper address bits (e.g., 1702) may be stored in a register, while some or all of the other context information is stored in memory. In this scenario, the UAB field 1702 in context information 1700 may be fixed to zero since the upper address bits to be concatenated with the decrypted base address slice can be supplied implicitly by a control register.

The memory allocation size field 1704 can be encoded with the exact size of the data at the memory location referenced by pointer 1610. The memory allocation size field 1704 may be limited to 25 bits to match the width of the offset portion 1606 in pointer 1610. When a data access is being performed, the offset portion 1606 in the pointer 1610 is checked by the processor to ensure that it does not exceed the value in memory allocation size field 1704.

The type field 1706 may contain fourteen bits and is used for programming languages that specify different classes. In certain programming languages, an error can result by using a pointer to an object of a particular class to obtain data (or an object) of a different class and then attempting to treat the data based on the different class. Accordingly, type of data (e.g., object type) can be determined and stored as part of in context information 1700 for a pointer when memory is allocated for the data and a pointer is generated. When the pointer is accessed in the program, the type information specified as part of context information 1700 can be matched against an expected type ID specified in the program to mitigate type confusion vulnerabilities.

The permission field 1708 may contain 3 permissions bits (XWR). This is a layer of permissions on top of the paging permissions such as read, write, and execute. Permissions can be determined based on an intersection operation performed on the paging permissions and the context permissions. For example, if the permission bits indicate that a pointer is only readable, then even if the page table says the memory that is mapped is writeable, then write access is going to be denied by the processor because the most restrictive permissions are chosen. In another example, if the context permissions indicate that memory is readable and writeable, but the page table says it is only readable, the write access could be denied.

Figure 18A:
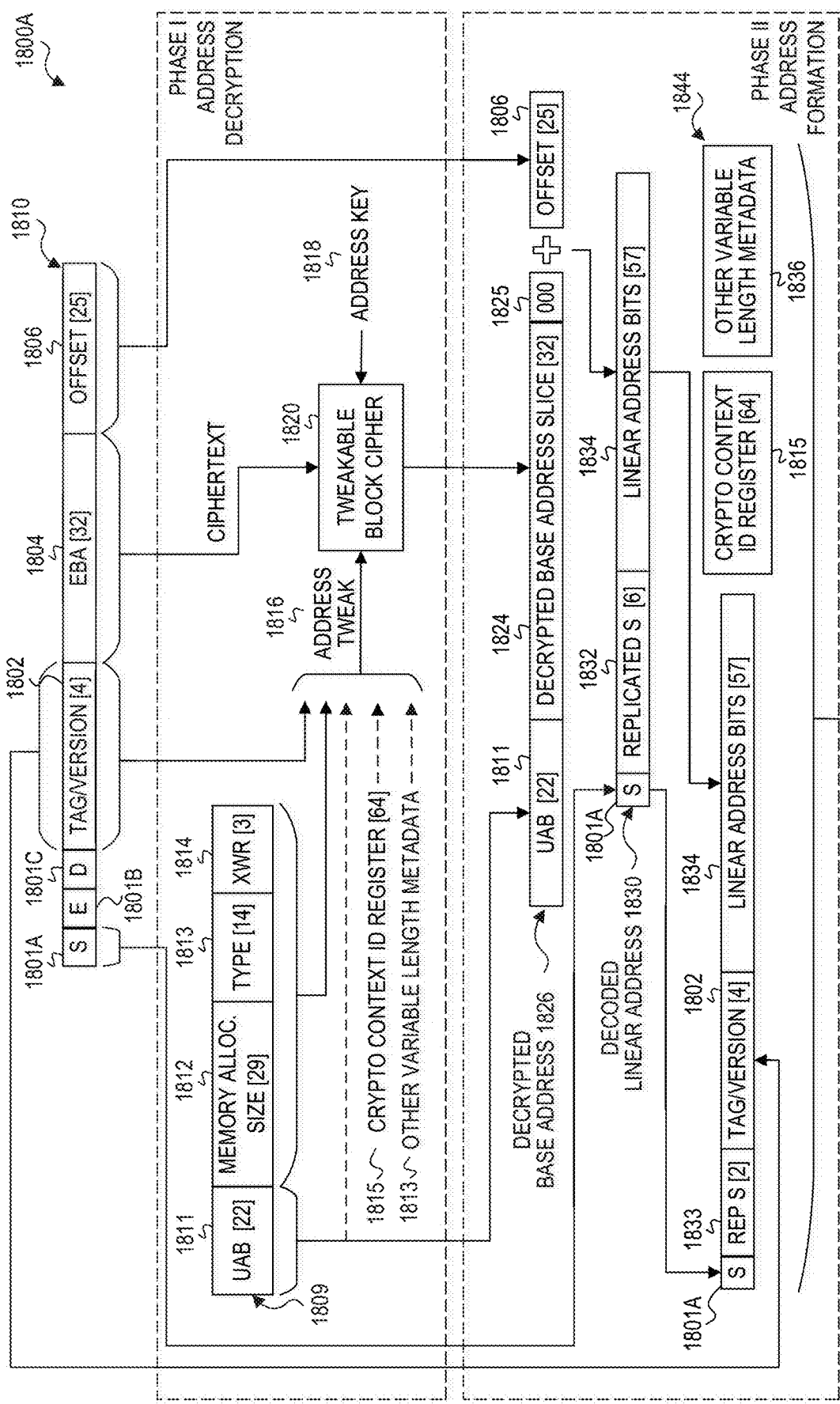
FIGS. 18A-18B are flow diagrams illustrating an example process of binding another cryptographically encoded pointer to the encryption of the data referenced by that pointer according to at least one embodiment.
Figure 18B:
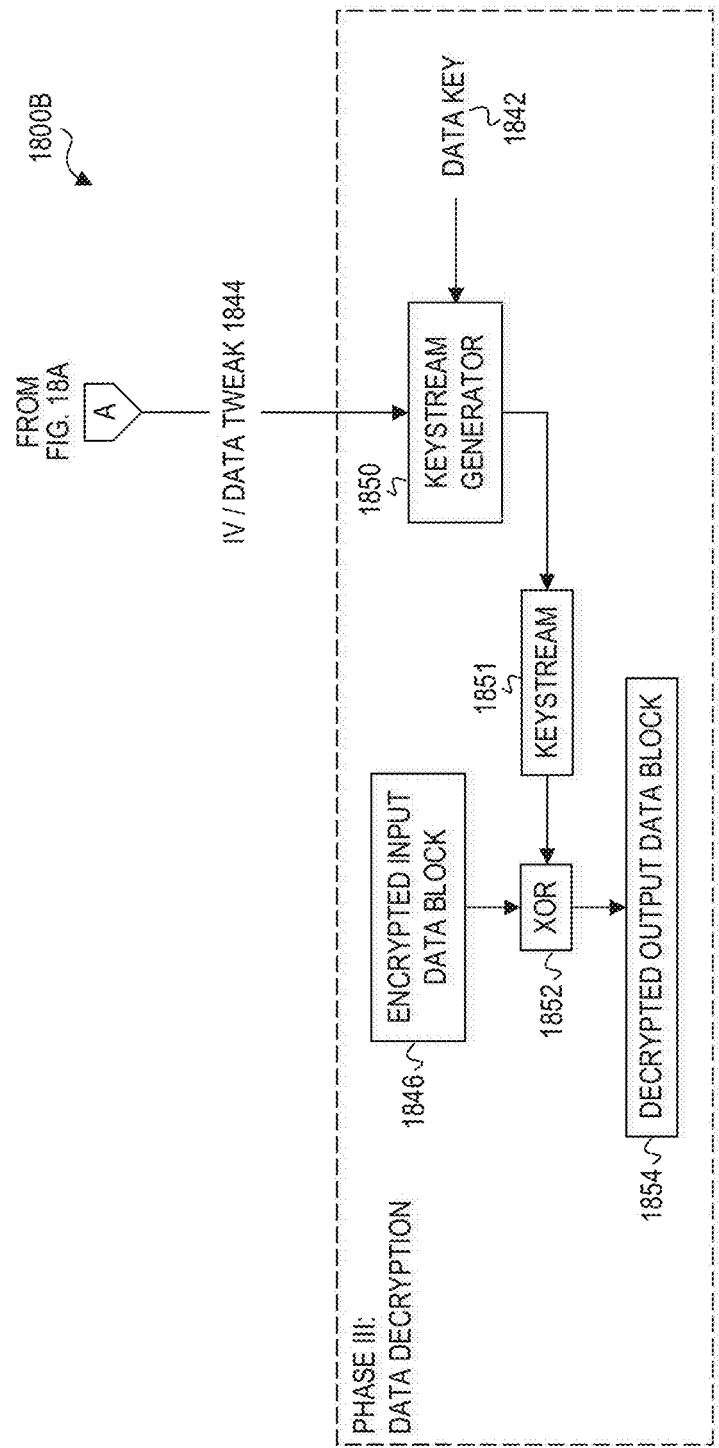

FIGS. 18A-18B illustrate a detailed flow diagram of an example process 1800A-1800B of obtaining data referenced by an embodiment of a cryptographically encoded pointer 1810, where encryption of the data is bound to the contents of the pointer. At least some portions of process 1800A-1800B may be executed by hardware, firmware, and/or software of the computing device 100. In the example shown, pointer 1810 is embodied as a 64-bit encoded linear address including a reserved portion that includes a supervisor bit (S-bit) 1801A, an encoded indicator bit (E-bit) 1801B, and a dynamic context lookup bit (D-bit) 1801C. Pointer 1810 also includes a tag/version portion 1802, an encrypted base address portion 1804, and an offset portion 1806. Generally, pointer 1810 has a similar configuration to pointer 1610.

The operations of process 1800A-1800B are identified in three phases: address decryption (Phase I), address formation (Phase II), and data decryption (Phase III). In Phase I, the linear address embedded in pointer 1810 is decrypted. Specifically, the EBA portion 1804 of the encoded linear address is decrypted by a decryption algorithm such as a tweakable block cipher 1820 using an address key 1818 and an address tweak 1816. The address tweak 1816 can include bits of tag/version portion 1802. Alternatively, the tag/version portion 1802 may be encrypted as part of the EBA portion 1804 as long as the tag/version portion 1802 is not used in the address tweak. In this alternative embodiment, the block cipher would have a correspondingly larger block size to fit the tag/version portion, or a longer slice of upper address bits may be supplied from the context information. Whether encrypted or not, the tag/version portion 1802 may be used in a data tweak for the data encryption. Additionally, one or more items of context information 1809 may be included in the address tweak 1816. For example, bits of memory allocation size field 1812, type field 1813, and permission field 1814 from context information 1809 can be included in address tweak 1816. In further embodiments, the plaintext upper address bits 1811 may also be used as part of address tweak 1816. In yet further embodiments, a crypto context identifier register 1815 may be used as part of address tweak 1816. The crypto context identifier register 1815 may contain a unique value (e.g., randomly or deterministically generated) associated with a particular functional group (e.g., processes, subset of processes, virtual machines (VM), subset of VMs, etc.). In at least some embodiments, an additional one or more items of variable length metadata 1817 may also be used as part of address tweak 1816 for the tweakable block cipher 1820. For example, the variable length metadata may include other context information or metadata (e.g., privilege level, location, ownership, etc.) as previously described herein. The block cipher 1820 may be any suitable decryption algorithm (e.g., XTS-AES block cipher, LRW, AES-CTR mode, etc.) as noted herein.

When the EBA portion 1804 of the encoded linear address has been decrypted into a decrypted base address slice 1824 by tweakable block cipher 1820, then a decoded linear address 1830 can be formed in Phase II. First, if the tag/version portion 1802 was encrypted as part of the EBA portion 1804, then the tag/version portion should be excluded from the decrypted base address slice 1824 when forming the decoded linear address 1830. Next, upper address bits 1811 can be obtained from context information in a register (or from other storage as previously described herein) and concatenated to the decrypted base address slice 1824. In at least some embodiments, base alignment bits 1825 are concatenated with the decrypted base address slice 1824 to form the least significant bits. This could also be accomplished by a left-shifting operation that performs an appropriate number of bit shifts. In this example, base alignment bits 1825 include three bits. The base alignment bits 1825 are set to zero in order to align the address to an 8-byte boundary. A decoded linear address 1830 is formed by adding the offset in offset portion 1806 of the pointer 1810 to the decrypted base address 1826 to obtain linear address bits 1834. Also, the supervisor bit 1801A is replicated in the unused/non-canonical bits (e.g., adjacent six bits 1832), and all unused/non-canonical bits are concatenated with the linear address bits 1834. In some embodiments, it is the most significant bit of the linear address bits 1834 that is replicated to fill the more significant bits in the decoded linear address 1830.

The decoded linear address 1830 is used to find the memory location of the encrypted data to be decrypted in Phase III. In addition, the decoded linear address 1830 and the encoded pointer 1810 can be used to create a data tweak 1844 for decrypting the encrypted data. As shown in Phase II of FIG. 18A, data tweak 1844 can include the tag/version portion 1802 of the encoded pointer 1810 and the linear address bits 1834 of the decoded linear address 1830. In addition, the S-bit 1801A may be included and replicated as needed, for example, to fill any remaining unused/non-canonical bits 1833. In addition, other context information may be included in data tweak 1844. For example, the crypto context ID register 1815 may be included in the tweak and/or any other variable length metadata 1836 may also be included in the tweak. Variable length metadata 1836 may include other context information or metadata (e.g., privilege level, location, ownership, type, permissions, memory allocation size, etc.) as previously described herein. It may be particularly advantageous for data tweak 1844 to include the memory allocation size and linear address bits 1834 combined with one or more of the following: (1) type; (2) tag/version; (3) type and tag/version; (4) crypto context ID; or (5) crypto context ID and permission level. Using the plaintext linear address bits 1834 in the IV/data tweak 1844 rather than encrypted pointer bits, e.g. EBA 1804, enables multiple pointers with different bounds, permissions, or other metadata to simultaneously reference the same allocation and to all correctly encrypt and decrypt data such that it can be accessed using any pointer in that group. Metadata that is not permitted to vary within groups of pointers that may be used simultaneously to access the same memory may be included in IV/data tweak 1844, since including metadata that is permitted to vary within that group may cause data to be incorrectly decrypted when accessed using some pointer in that group if it was previously encrypted using another pointer in that group with differing metadata that is included in IV/data tweak 1844.

In some embodiments, it may be advantageous to add a copy of the decrypted base address 1826 (or the decrypted base address slice 1824) as part of the data tweak 1844. To illustrate the advantages of this approach, consider sequential overlapping memory allocations where an object A is allocated and freed, and subsequently, an object B is allocated at an overlapping location. Even though the two allocations overlapped at separate times, but with different base addresses having the same tag/version, using a dangling pointer to the overlapping memory location will not enable correct decryption of even the overlapping parts of the object B since they have different base addresses.

The encrypted data obtained by the decoded linear address 1830, is decrypted in Phase III shown in FIG. 18B. The data decryption may commence once the data key 1842 becomes available and the IV/data tweak 1844 has been computed, which may require waiting for EBA 1804 to be decrypted. The encrypted data is decrypted by a decryption algorithm such as keystream generator 1850. In at least one embodiment, keystream generator 1850 can be implemented as an AES-CTR mode block cipher, at a particular size granularity (any suitable size). In this embodiment, the data tweak 1844 (or initialization vector) for the keystream generator 1850 is derived from the decoded linear address 1830 (e.g., linear address bits 1834, supervisor bit 1801A, two replicated bits 1833) and from the encoded pointer (e.g., tag bits of tag/version portion 1802). Data tweak 1844 may additionally include external context information (e.g., crypto context ID register 1815 and/or other variable length metadata 1836). Keystream generator 1850 encrypts the data tweak 1844 based on data key 1842 to generate a keystream 1851. The value of data tweak 1844 may be adjusted to be congruent to 0 (modulo the block size of the keystream generator 1850) prior to being used as an input to the keystream generator. The value of the data tweak 1844 may have some suitable number of least significant bits set to 0 to satisfy this requirement and a prefix of the keystream 1851 may be discarded to account for that adjustment. The number of bytes of the keystream 1851 to discard may be computed by subtracting the adjusted value of the data tweak 1844 from the unadjusted value of the data tweak 1844. If the memory to be encrypted crosses one or more block-aligned boundaries, the keystream generator 1850 may be re-invoked for the subsequent blocks with the data tweak 1844 being increased by an amount equal to the block size each time that the keystream generator 1850 is re-invoked. A suffix of the generated keystream 1851 may be unneeded and thus discarded. An XOR operation 1852 is then performed on the keystream 1851 and an encrypted input data block (or cache line) 1846 selected from the memory location referenced by the decoded linear address. The granularity of the encrypted input data block 1846 matches the keystream 1851 output from the keystream generator 1850, and the XOR operation 1852 produces a decrypted output data block 1854.

Figure 19:
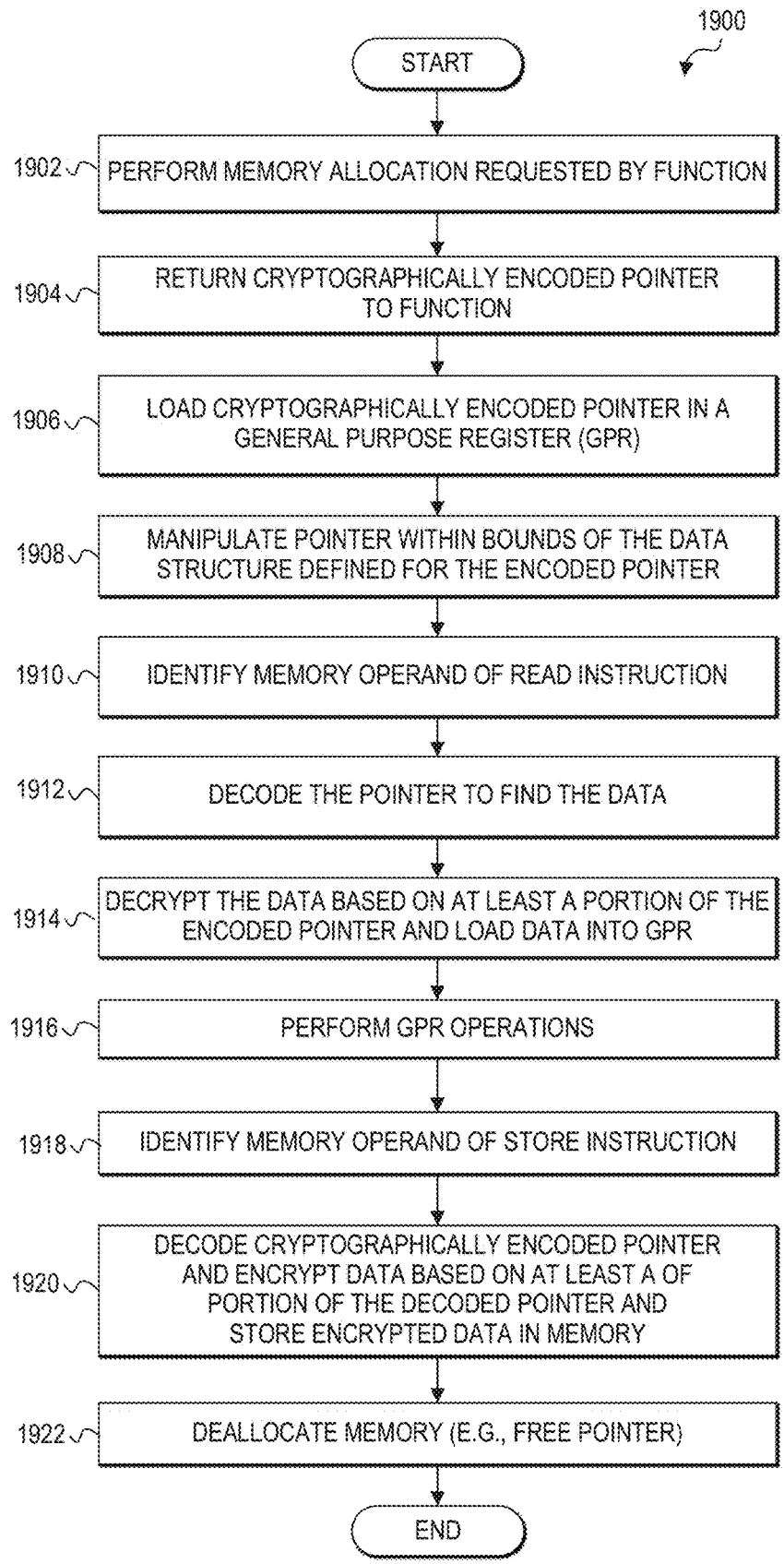
FIG. 19 is a flow diagram of an example process associated with a cryptographically encoded pointer bound to data encryption according to at least one embodiment.

FIG. 19 is a flow diagram of an example process 1900 for creating and using a cryptographically encoded pointer for memory. At least some portions of process 1900 may be executed by hardware, firmware, and/or software of computing device 100. In the example shown in FIG. 19, at 1902, a processor performs a memory allocation requested by a function of a software program. For example, a malloc (memory allocation) instruction may be used in C programming language software to dynamically request memory for data (e.g., variable, buffer, array, etc.). The malloc instruction allocates memory on the heap and also allocates a pointer on the stack. In one or more embodiments, the memory allocation instruction, such as malloc, is configured to generate a cryptographically encoded pointer to the allocated memory. The cryptographically encoded pointer may have any suitable configuration such as pointers 610, 810, 1410, 1510, 1610, 1810, or any other appropriate variation thereof. In particular, the cryptographically encoded pointer includes an encrypted slice of the linear address to the allocated memory. The cryptographically encoded pointer also includes additional metadata (e.g., size, tag, etc.), and potentially reserved bits. In at least some embodiments, the pointer includes an offset or mutable portion for the linear address.

At 1904, the cryptographically encoded pointer is returned to the function. At 1906, the cryptographically encoded pointer may be loaded into a general purpose register (GPR). The software program can manipulate the pointer within the bounds of the data structure defined for the encoded pointer. For example, if the pointer is encoded in the same or similar configuration as pointers 610, 810, 1410, or 1510, then the mutable plaintext portion (e.g., 608, 808, 1408, 1508) may be manipulated (e.g., arithmetic, multiplication, etc.) to access different bytes within the data structure in the allocated memory. If the pointer is encoded in the same or similar configuration as pointers 1610 or 1810, then the offset portion (e.g., 1606, 1806) may be manipulated within the bounds defined by the memory allocation size metadata (e.g., 1704), which may be stored in a context information register (e.g., as part of context information 1700), in one example.

At 1910, a data access instruction, such as a read instruction, is executed by the software program and includes a memory operand for the pointer. The memory operand can be a register containing the pointer. For embodiments in which context information is separate from the pointer, the instruction may include a memory operand in the form of another register or an immediate operand for the context information.

At 1912, the pointer is decoded to find the encrypted data. Decoding the pointer can be achieved by performing a decryption algorithm (e.g., block cipher such as XTS-AES, LRW, AES-CTR mode, etc.) to decrypt the encrypted address slice (e.g., ciphertext portion 604, 804, 1404, 1504, EBA portion 1604, 1804) based on a secret address key and an address tweak. The address tweak includes at least one metadata value associated with the pointer. For example, the metadata value can include one or more metadata items embedded in the pointer (e.g., size metadata portion 602, 802, 1402, 1502, tag/version portion 1602, 1802, immutable plaintext portion 606, 806, 1406, 1506, other context information, etc.), one or more external context information items (e.g., metadata stored in a context information register, stored in a table to be accessed dynamically, or passed as an immediate operand in an instruction), and/or a crypto context identifier register. To form the decoded linear address, the decrypted address slice is concatenated with the other slices of the linear address depending on the particular encoding of the pointer (e.g., immutable plaintext portion 606, 806, 1406, 1506, mutable plaintext portion 608, 808, 1408, 1508, upper address field 1702, 1811). An offset may also be added to the decrypted linear address and additional upper bits may be padded or set to a particular value depending on the pointer encoding and address register size (e.g. replication of most significant bit 1801A, 1832, sign extension 1522, etc.).

At 1914, after accessing the encrypted data by using the decoded linear address, decrypted data can be computed by performing a decryption algorithm (e.g., block cipher such as XTS-AES, LRW, AES-CTR mode, etc.) to decrypt the data based on a secret data key and a data tweak. The data tweak value is derived, at least in part, from the cryptographically encoded pointer. For example, the data tweak may include the encrypted address slice from the pointer (e.g., ciphertext portion 604, 804, 1404, 1504, EBA portion 1604, 1804) and/or the decrypted address slice from the pointer (e.g., 1524, 1824). Other plaintext linear address bits can be concatenated with the encrypted address slice. If the decrypted address slice is used in the tweak, it may be concatenated with other plaintext address bits in order to obtain the actual linear memory address and an offset may be added to the linear memory address to be used as the tweak (or part of the tweak). In at least some embodiments, the data tweak may also include other portions of the cryptographically encoded pointer or even the entire contents of the cryptographically encoded pointer. In one or more embodiments, the data tweak is derived entirely from the cryptographically encoded pointer. In further embodiments, the data tweak may include one or more items of context information (e.g., metadata stored in a context information register, stored in a table to be accessed dynamically, or passed as an immediate operand in an instruction), and/or a crypto context identifier register. Also at 1914, the decrypted data may be loaded in a general purpose register (GPR).

If the program decodes the pointer correctly, then the data can be decrypted correctly. However, if the pointer is incorrectly decoded to an incorrect linear address, then a page fault may occur. Even if a page fault does not occur, the incorrect linear address is likely to access random memory and would attempt to decrypt data from the random memory using an invalid data tweak. Thus, two levels of protection are provided in one or more embodiments.

At 1916, operations may be performed on the data in the GPR. Generally, the decrypted data may be manipulated according to the software program. At 1918, a memory operand or operands of a store instruction are determined. For example, the encoded pointer may be provided as an operand of the store instruction.

At 1920, the cryptographically encoded pointer is decoded to form a decoded linear address as previously described herein. The data to be stored is encrypted by performing an encryption algorithm (e.g., block cipher such as XTS-AES, LRW, AES-CTR mode, etc.) to encrypt the data in the GPR based on the secret data key and the data tweak, as previously described. The data tweak is derived, at least in part, from the cryptographically encoded pointer. The data encryption is performed on the current data in the GPR to reverse the decryption process R. If the current data in the GPR has been modified, then the newly encrypted data will be different than the encrypted data that was previously retrieved from memory at 1912. Once the data is encrypted, it may be stored in memory based on the decoded linear address.

At 1922, the memory may be deallocated and therefore, the cryptographically encoded pointer is freed.

Figure 20:
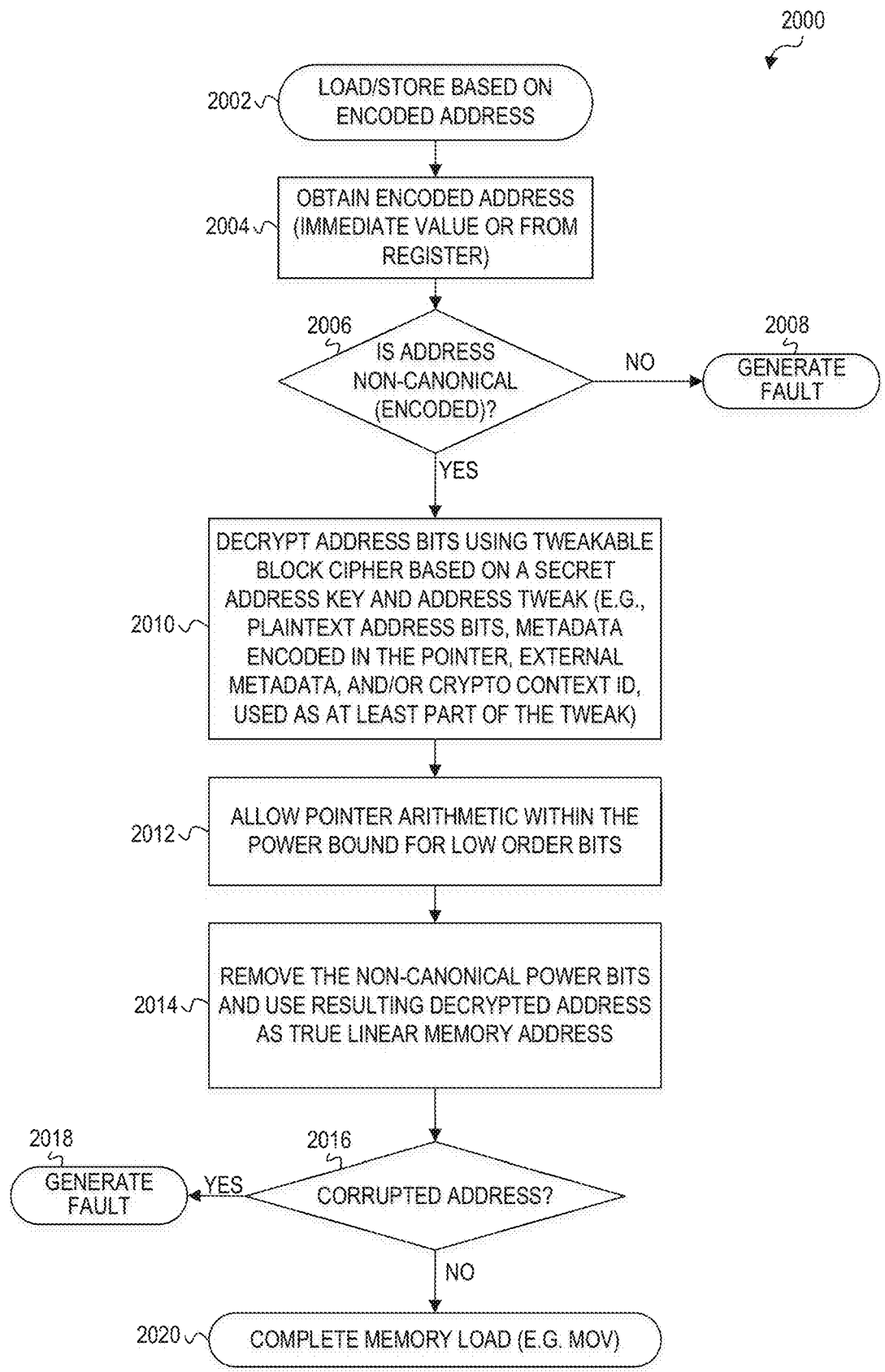
FIG. 20 is a simplified flow diagram of an example process of using a cryptographically encoded pointer to access memory according to at least one embodiment.

FIG. 20 is a flow diagram of an example process 2000 of using a cryptographically encoded pointer to access memory according to at least one embodiment. At least some portions of process 2000 may be executed by hardware, firmware, and/or software of the computing device 100. In the example shown in FIG. 20, as indicated at 2002, a processor is to perform a load/store operation based on an address encoded in a pointer similar to the pointers previously described herein (e.g., 610, 810, 1410, 1510, 1610, 1810). At 2004, the processor obtains the encoded address (e.g., pointer 610, 810, 1410, 1510, 1610, or 1810), either from an immediate value or from a register. At 2006, the processor then determines if the address/pointer is non-canonical/encoded. If the address is canonical/unencoded, then at 2008, the processor generates a general protection fault.

If the address is non-canonical/encoded, then at 2010, the processor decrypts the address bits (e.g., ciphertext portion 604, 804, 1404, 1504, EBA portion 1604, 1804) using a tweakable block cipher such as an XOR-encrypt-XOR (XEX) block cipher mode, an XEX-based tweaked-codebook mode with ciphertext stealing (XTS) block cipher mode, or a Liskov, Rivest, and Wagner (LRW) block cipher mode. In some embodiments, power bits in the address/pointer (e.g., size metadata portion 602, 802, 1402, 1502) indicate/determine a number of plaintext address bits in the pointer that can be used as part of an address tweak for the tweakable block cipher. Some encodings (e.g., EBA) may use plaintext upper address bits that are stored separately from the pointer. In addition, the encoded metadata itself (e.g., power/size bits, tag/version bits, etc.) may also be included in the address tweak. In some embodiments, external context information may be included in the address tweak. For example, such context information may include metadata such as memory allocation size, type, permissions, privilege level, location, ownership, or any combination thereof. In yet further embodiments, a crypto context ID register may be included in the tweak.

In some cases, the processor may allow pointer arithmetic within the power bound for low order bits (as shown) by not including them as a tweak to the ciphertext. In one example, pointer arithmetic may be performed in certain addressing modes that allow a memory operand to specify arithmetic to be performed on the address when computing the effective address that is then translated into a physical address. At 2014, the process may then remove the non-canonical bits (e.g., power bits, tag bits, reserved bits) and use the resulting decrypted address to generate a true linear/virtual memory address in the load/store operation. Additional address bits (e.g., bits of immutable plaintext portion 606, 806, 1406, 1506, bits in upper address field 1702, 1811) may be concatenated with the decrypted address slice to form the entire address. Also, an offset (e.g., 1606, 1806) may be added to the linear address to select a particular location in the allocated memory. At 2016, a determination is made as to whether the address is corrupted. If the address is determined to be corrupted, then at 2018, the processor may generate a general protection fault, page fault, etc. If the address is not corrupted, then at 2020, the processor may complete the memory load/store operation (e.g., MOV operation) using the decrypted address.

Figure 21:
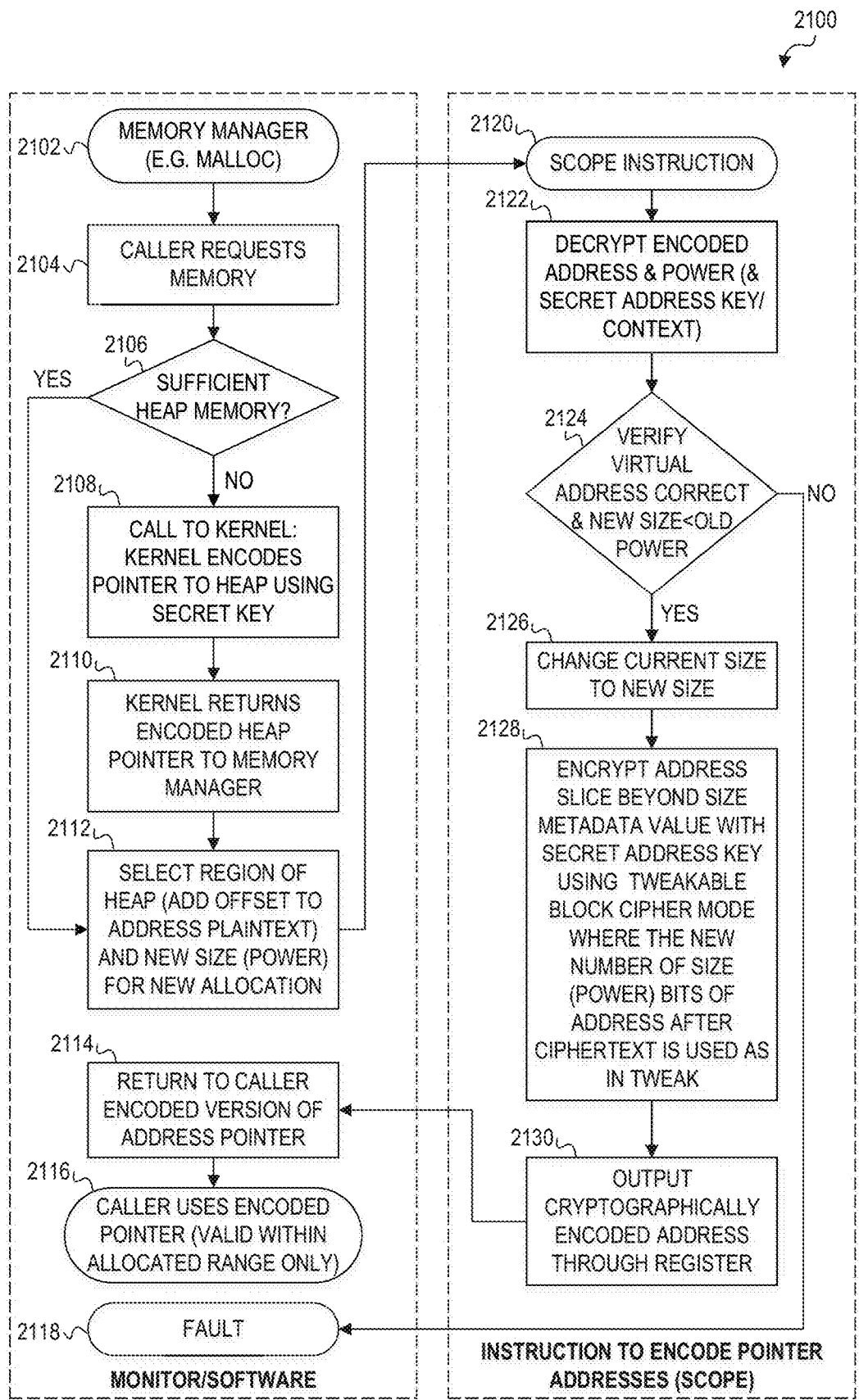
FIG. 21 is a flow diagram of an example process of allocating memory and encoding a pointer to the allocated memory according to at least one embodiment.
Figure 22:
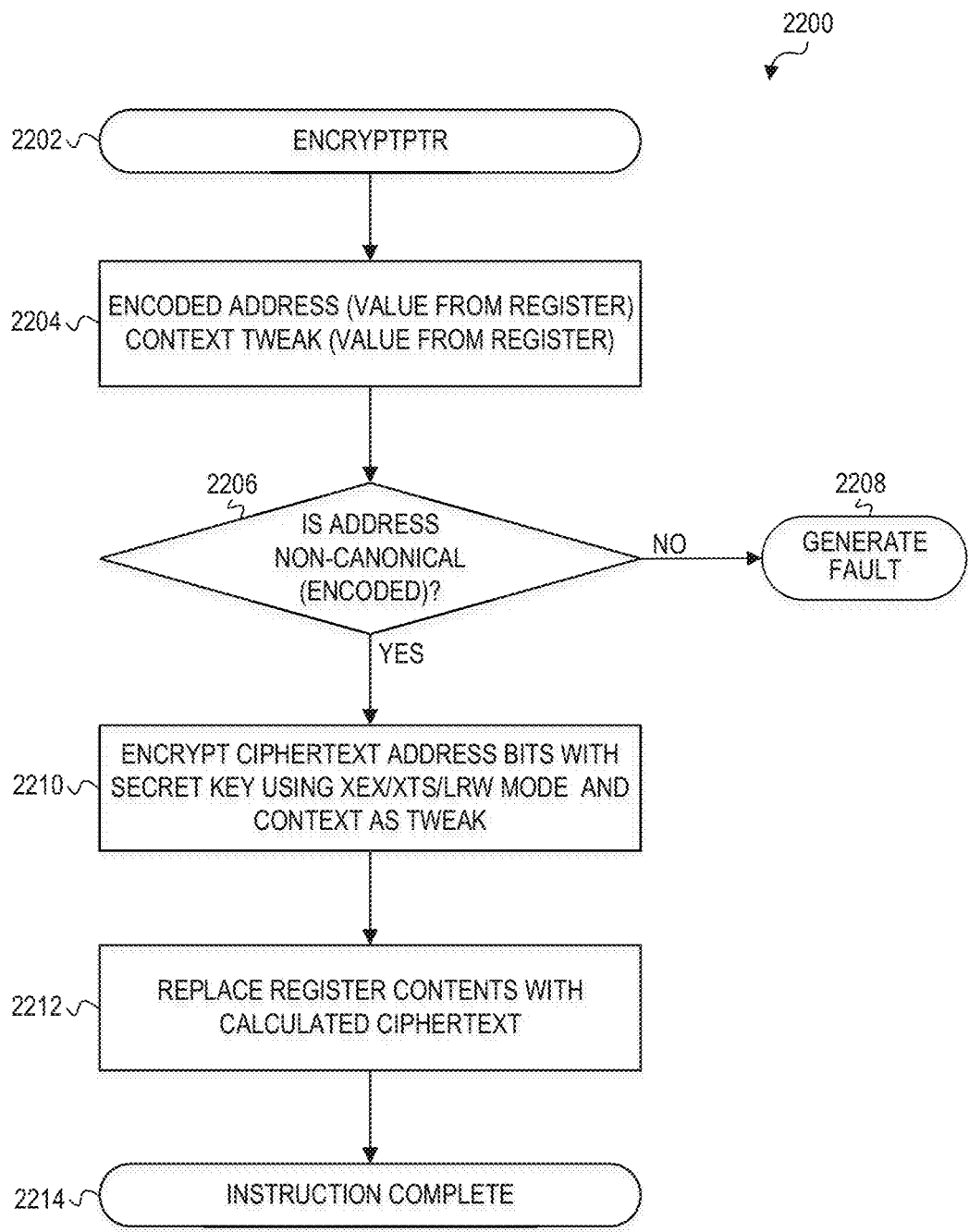
FIG. 22 is a flow diagram of one or more possible operations that may be associated with encrypting a pointer according to at least one embodiment.
Figure 23:
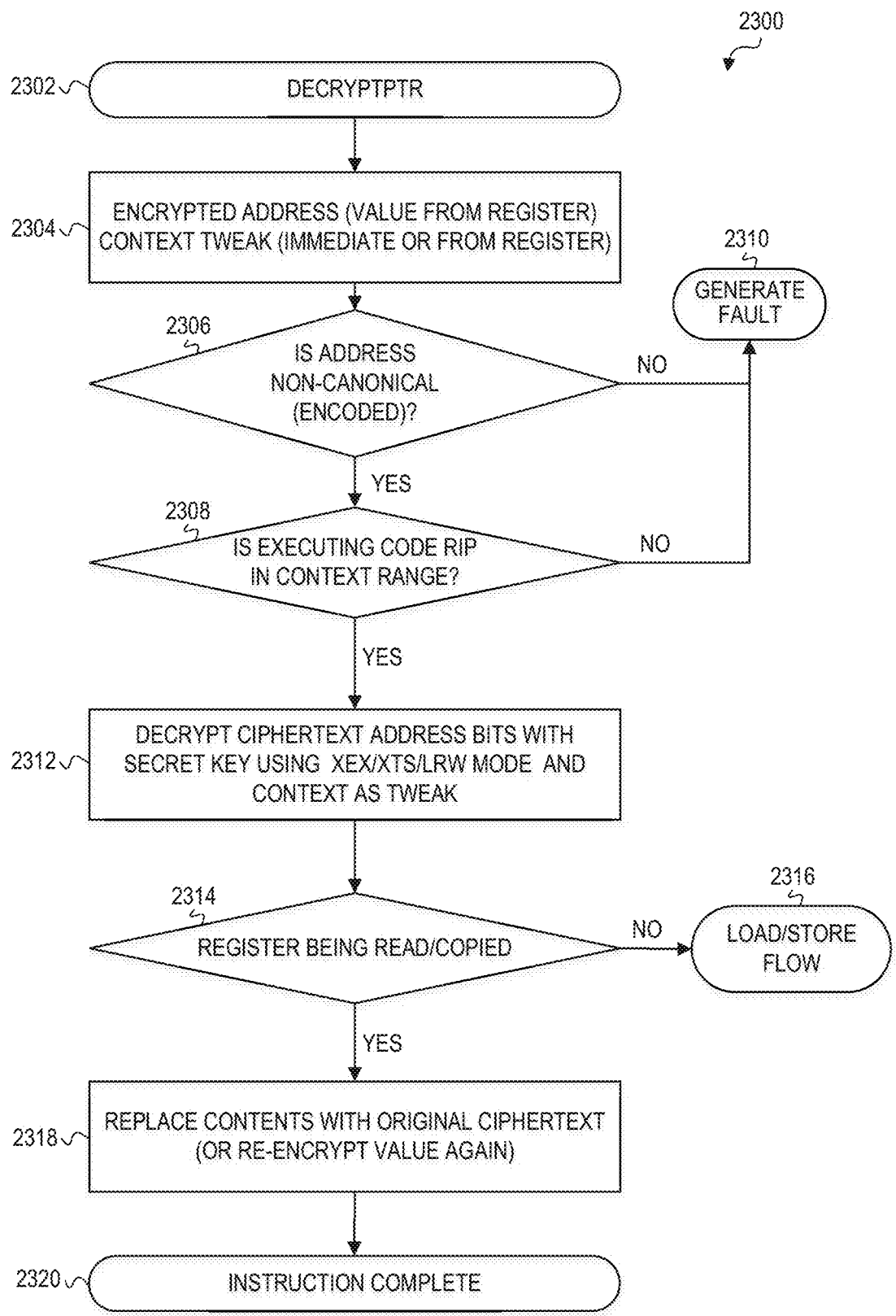
FIG. 23 is a flow diagram of one or more possible operations that may be associated with decrypting a pointer according to at least one embodiment.

FIGS. 21-23 are flow diagrams of example processes related to using tweakable block ciphers to encrypt/decrypt a memory address according to at least one embodiment. At least some portions of the processes of FIGS. 21-23 may be executed by hardware, firmware, and/or software of the computing device 100. In the flow diagrams, a tweakable block cipher (e.g., using XTS-AES or LRW block cipher modes) is used to encrypt a memory address (linear or virtual). A memory allocator (e.g., malloc from glibc, new, or other software allocation method) may utilize the cryptographic instruction set architecture (ISA) to create an encoded memory address/pointer (e.g., cryptographically encoded pointers 610, 810, 1410, 1510, 1610, 1810).

The process 2100 shown in FIG. 21 may begin at 2102 with the memory allocator (e.g., malloc instruction) being initiated by a software program. At 2104, a caller (e.g., function in software program) requests a certain amount of memory. For example, the caller may request 16 bytes of memory. At 2106, a determination is made as to whether the heap has sufficient memory available to fulfill the requested memory allocation. If sufficient heap memory is available to fulfill the requested memory allocation, then at 2112, a large portion of memory is granted by a privileged component (e.g. operating system (OS) or virtual machine manager (VMM)) that owns memory. The privileged component sets a secret address key and a secret data key for a process or virtual machine, and thus, can calculate encoded pointer values using the secret address key, an address tweak, and a cryptographic algorithm used by the processor. This encoded memory address pointer may have a range which the allocator may utilize based on the address of the memory allocate library function (location of the code loaded by the OS kernel). The OS may also bind this pointer to the context of the process in which the memory allocation is operating. The kernel may designate a function (based on its location in memory) with the ability to access any data.

If it is determined, at 2106, that the heap does not have sufficient available memory to fulfill the requested memory allocation, then at 2108, the kernel encodes a pointer to the heap using the secret address key. At 2110 the kernel returns the encoded heap pointer to the memory manager. Generally, the kernel allocates additional heap memory for the process and returns an encoded pointer to that additional memory to the memory manager module within the process. The memory manager module then subdivides the allocated regions of memory based on calls to memory allocation routines within the program. The kernel generates an encoded pointer covering the large regions that get passed to the memory manager module's control, and then the memory manager module generates encoded pointers covering individual object allocations From this first encoding, the allocator may call a new processor instruction at 2120, which may be formatted the same as or similar to the following:

SCOPE GPRx, size.; Encoded pointer in GPRx, old size in old pointer, new size changes pointer power For the SCOPE instruction, an oldSize is obtained from the encoded pointer value in the general-purpose register (GPR) and a newSize is specified in another register. The initial pointer is the address encoding provided by the OS kernel or other privileged software with knowledge of the address key and the address tweak.

The processor may execute a SCOPE instruction, and at 2122, decrypt the encoded pointer using the oldSize (e.g., 602) associated number of middle address bits (e.g., 606) as the tweak, and a secret address key originally configured by the privileged software for the process (e.g., in a model-specific register or control register) that is not readable to software running in the unprivileged process. At 2126, the size value (e.g., 602) is changed to a new reduced size value. At 2128, the processor may then compute a new encoded pointer value re-encrypted with the new reduced size (power) bits (e.g., 602) at the specified starting offset for the same context as the memory allocator using the same secret address key. In other words, the address slice (e.g., 604) decrypted at 2122 is re-encrypted using a cryptographic algorithm (e.g., tweakable block cipher such as XTS-AES, LRW, AES-CTR, etc.) based on the same secret address key and a new tweak, where the new tweak includes the new reduced size metadata (e.g., 602) and the new number immutable plaintext address bits (e.g., 606). The immutable plaintext address bits are 'new' because the change in the size metadata changes the number of bits included in the immutable plaintext address bits. In this embodiment, because the new size metadata is reduced, the number of immutable plaintext address bits are increased and the mutable plaintext address bits are decreased. In other configurations, reducing the size metadata can result in reducing the number of immutable bits. This new address (with the decreased number of mutable address bits) represents a smaller range of the heap that can be used by a function calling the memory allocator as long as it stays within the given size (e.g., can only manipulate the mutable plaintext bits 608 that are not used as part of the address tweak), allowing the memory allocator to allocate appropriate sizes of memory as FIG. 6 illustrates. At 2130, the cryptographically encoded address slice can be output through the general purpose register. The encoded version of the pointer (with the encrypted address slice and new size metadata) can be returned to the caller (e.g., function of software program) at 2114.

At 2116, the caller can use the received cryptographically encoded pointer within the allocated range only. When a program function attempts to utilize the encoded address returned by the memory allocator, it may start writing data with the encoded address (pointer). Any instruction with a memory operator (e.g. MOV, ADD, SUB, etc.) can use the encoded address as a memory operand. Similarly, a program can use the SCOPE instruction on the allocated data down further to identify individual data types within a larger memory structure, creating a further reduction in allocation size (e.g., power bits 602).

Referring now to FIG. 22, FIG. 22 illustrates an example process 2200 for encrypting a slice of an encoded memory address (pointer). When a program wants to limit ownership of a pointer (e.g. provide access control to a particular function, with permissions) it may call an encrypt pointer instruction (ENCRYPTPTR) 2202 formatted similarly to the following:

ENCRYPTPTR GPRx, Context; pointer value in register (GPR) encrypted with context (register) tweak As shown in FIG. 22, at 2204, an encoded memory address is accessed in a register such as a general processor register (GPR), and context information for an address tweak is accessed in another register. At 2206, the processor then determines if the encoded address is non-canonical/encoded. If the encoded address is canonical/unencoded, then at 2208, the processor generates a general protection fault. If the encoded address is non-canonical/encoded, then at 2210, the encrypt instruction may take the ciphertext portion of the encoded pointer in the specified GPR (processor register), and additionally encrypt it with the context information from another register used as the tweak (and the secret data key). The encryption may be performed using a block cipher mode, such as an XEX, XTS-AES, or LRW mode as shown in FIG. 22. In some embodiments, the context information can specify a function (by its memory range, or virtual page number) and permissions for decrypting the encoded pointer. At 2212, the register contents are replaced with the calculated ciphertext and the instruction is completed as indicated at 2214.

FIG. 23 illustrates an example process 2300 for decrypting a slice of an encoded memory address (pointer) at some point subsequent to performing the ENCRYPTPTR instruction of FIG. 22. The authorized function (as defined by the location of its code in memory or virtual page number) may then call a decrypt instruction (DECRYPTPTR) 2302 formatted similarly to the following:

DECRYPTPTR GPRx, Context; Decrypts pointer value in GPR given function location is within context As shown in FIG. 23, at 2304, an encoded memory address is accessed in a register such as a general processor register (GPR), and context information for an address tweak is accessed in another register. At 2306, the processor then determines if the encoded address is non-canonical/encoded. If the encoded address is canonical/unencoded, then at 2310, the processor generates a general protection fault. If the encoded address is non-canonical/unencoded, then at 2308, if the context reflects an access control decision using the caller function's location, then the processor may verify that the code executing the decrypt instruction falls within the specified context range, or virtual page number, or else it may generate a fault at 2310. If the code executing the instruction falls within the specified range, then at 2312, the processor may decrypt the pointer using the secret address key and address tweak (formed from the context information), into the specified GPR.

In some instances, software may perform pointer arithmetic (e.g., add, subtract, or multiply) on this decrypted value in the GPR to index into the array or data structure (e.g., as shown in FIG. 20). It then may use this GPR as a memory reference (pointer) to access data in memory (load/store operations). Further, in some instances, the decrypted GPR value might not be readable by software, as determined at 2314, and any attempts to read the register or move the register to memory, or move the content of the register to another register may result in re-encrypting the value stored therein with the original context. Provided the permissions of the encrypted pointer, an authorized function may have permissions to re-encrypt the pointer using the ENCRYPTPTR instruction for another authorized function (or functions, for example, using a larger range of memory) of its choosing based on a new memory range or virtual page number specified in the context parameter. In this way an encrypted pointer value may be passed from one authorized function to the next. Permissions may also limit access to data for the referenced pointer, for example, read-only, read and write, or execute.

Figure 24:
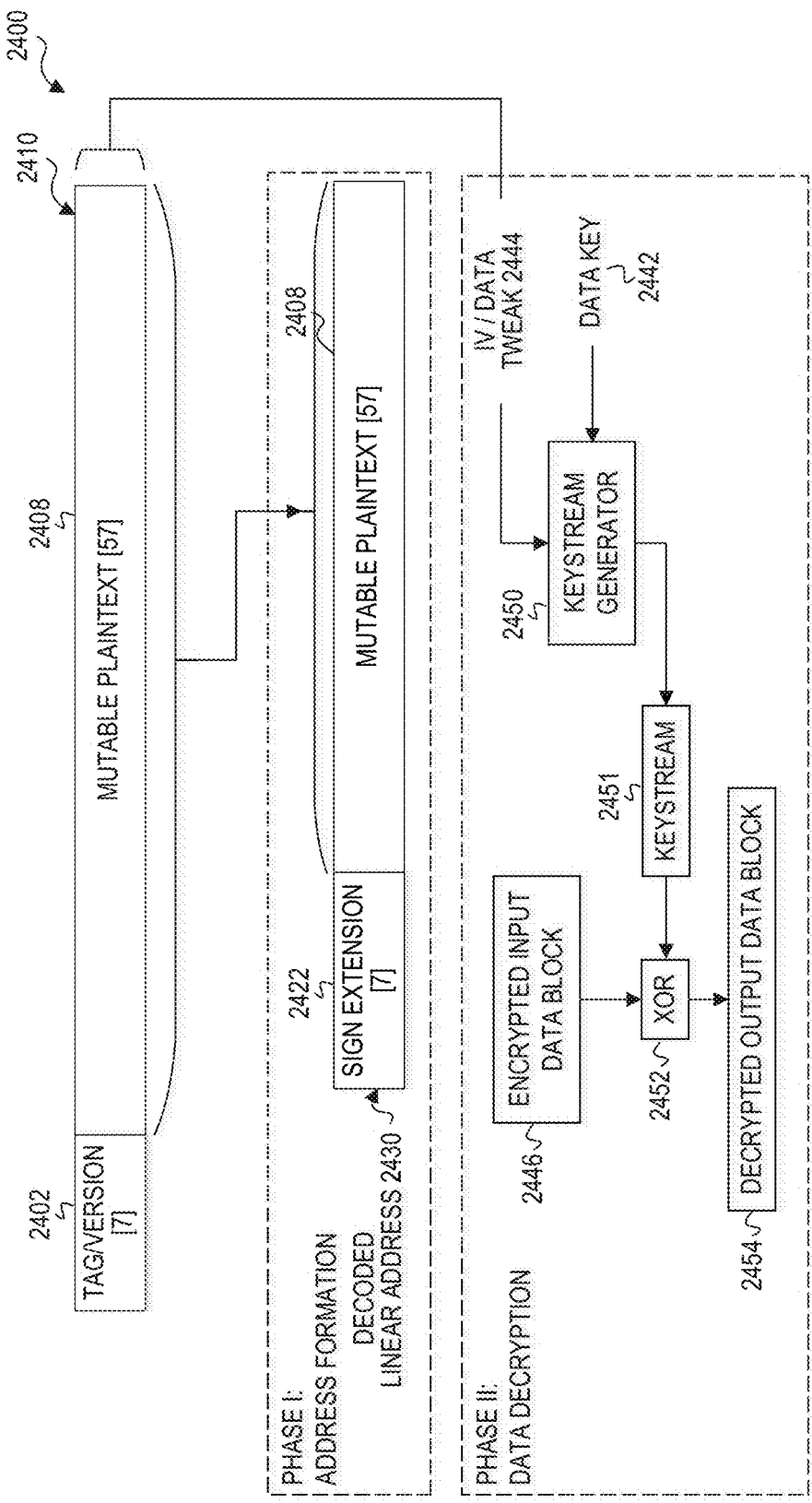
FIG. 24 is flow diagram illustrating an example process of binding yet another cryptographically encoded pointer to the encryption of the data referenced by that pointer according to at least one embodiment.

FIG. 24 is a detailed flow diagram illustrating an example process 2400 of obtaining data referenced by another embodiment of an encoded pointer 2410, where encryption of the data is bound to the contents of the pointer. At least some portions of process 2400 may be executed by hardware, firmware, and/or software of the computing device 100. In the example shown, pointer 2410 is embodied as a 64-bit encoded linear address including a 7-bit tag/version portion 2402 and a 57-bit mutable plaintext address portion 2408. Tag/version portion 2402 can comprise temporal safety bits, which are randomly generated each time a pointer is encoded for a requested memory allocation. Alternatively, tag/version portion 2402 can comprise a version number or any deterministically unique value for a requested memory allocation. For example, a tag/version portion 2402 may be a sequentially incremented number that is generated each time a pointer is encoded for a requested memory allocation. Although either approach may be used, in this embodiment in which none of the address bits are encrypted, a tag with randomly generated bits may provide greater protection against an attack as randomly generated bits are more difficult to determine than deterministically different values such as sequentially incremented numbers. For other embodiments disclosed herein, in which a portion of the address is encrypted, a version may be more desirable as the encryption provides protection against an attack, and the version number uses less resources to generate.

It should be noted that the tag/version portion 2402 and address portion 2408 may be configured with different numbers of bits (e.g., 5-bit tag/version portion and 59-bit address portion 2408, etc.). In other embodiments, additional bits may be encoded to allow encoded pointer 2410 to be used concurrently with legacy pointers. For example, encoded pointer could be allocated with a 2-bit reserved portion, 5-bit tag/version portion, and 57-bit plaintext address portion. In this embodiment, the 2-bit reserved portion can be designated as a supervisor bit and an encoded bit indicator. The supervisor bit can indicate whether the address is located within the supervisor address space (e.g., "1") or within the user mode address space (e.g., "0"). The encoded bit indicator can be set to the opposite value of the supervisor bit to indicate that the pointer is encoded (e.g., with tag/version bits) or can be set to the same value of the supervisor bit to indicate that the pointer is not encoded. In other embodiments, the legacy encoding may be achieved without dedicated bits. Instead, legacy encoding can be achieved by encoding particular values in the tag/version portion 2402 (e.g., all 1s, all 0s). In yet other embodiments, legacy encoding may be eliminated entirely if, for example, the concepts are not implemented to be compatible with legacy programs.

The operations of process 2400 are identified in two phases: address formation (Phase I), and data decryption (Phase II). Process 2400 does not include an address decryption phase because the encoded linear address is not encrypted. Instead, the linear address is encoded in mutable plaintext address portion 2408.

In Phase I, a decoded linear address 2430 can be formed from the encoded pointer 2410. In at least one embodiment, the uppermost bits 2422 (tag/version portion 2402) that are not part of the linear address can be set to the same bit value (e.g., 0 or 1). The bits of the mutable plaintext address portion 2408 make up the lower bits of the decoded linear address 2430.

The decoded linear address 2430 is used to find the memory location of the encrypted data to be decrypted in Phase II. The encrypted data is decrypted by a decryption algorithm such as keystream generator 2450. In at least one embodiment, keystream generator 2450 can be implemented as an AES-CTR mode block cipher, at a particular size granularity (any suitable size). In this embodiment, the contents of the encoded pointer are used as the initialization vector (IV) or data tweak 2444. In particular, the randomly generated bits of tag/version portion 2402 concatenated with the bits of plaintext address portion 2408 form the data tweak (or IV) for decrypting the encrypted data. Keystream generator 2450 encrypts data tweak 2444 based on a data key 2442 to generate a keystream 2451. An XOR operation 2452 is then performed on keystream 2451 and an encrypted input data block (or cache line) 2446 selected from the memory location referenced by the decoded linear address 2430. The granularity of the encrypted input data block 2446 matches the keystream 2451 output from of the keystream generator 2450, and the XOR operation 2452 produces a decrypted output data block 2454. Additionally, in some embodiments, other context information could also be used in the data tweak 2444 including, for example, memory allocation size, type, permissions, privilege level, location, ownership, crypto context ID register, or any combination thereof.

Incorporating a pointer's tag/version portion into data encryption/decryption can be used as a way of versioning memory and can prevent certain malware attacks, even if the linear address is embedded in the pointer entirely as plaintext (i.e., with no encrypted slices). For example, since the tag/version bits are incorporated into the data encryption, a use-after-free attack (i.e., accessing a dangling pointer after the underlying object has already been freed and potentially even reallocated to a different object) and out-of-bounds accesses can be mitigated. Both scenarios have a high probability of causing an integrity check violation if integrity checking is enabled. If integrity checking is not enabled, a use-after-free attack or out of bound access should result in data corruption, which may still be sufficient to protect data confidentiality.

A tag/version portion used in data encryption/decryption can also mitigate uninitialized use vulnerabilities. An uninitialized use occurs when data is read from a buffer that was allocated but not filled with initial values. An uninitialized use can be detected by delaying a write-for-ownership of an object until the object is initialized. Write-for-ownership refers to issuing a write to memory without first reading from that region of memory, as is customary for memory writes. Software can be adapted to use write-for-ownership when initializing an object to avoid an integrity check violation that would otherwise occur if a region of memory is read using a tag/version value embedded in the pointer that differs from whatever tag/version value was previously used to write the current value in memory.

Software can further be adapted to detect an attempted access of a dangling pointer (e.g., use-after-free) or uninitialized object. If integrity checking is enabled, then the memory allocator (e.g., malloc instruction, free instruction) can be adapted to inject zeroed ciphertext into the newly allocated (e.g., malloc instruction) memory regions or freed (e.g., free instruction) memory regions. This can cause an integrity fault to be generated when a dangling pointer or uninitialized object is accessed.

Figure 25:
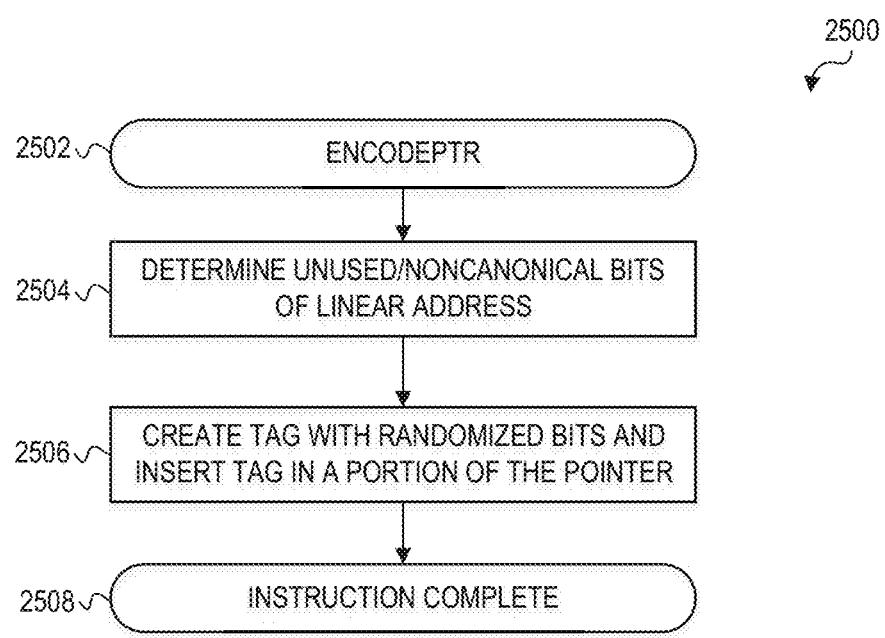
FIG. 25 is a flow diagram of one or more possible operations that may be associated with encoding a pointer according to at least one embodiment.

FIG. 25 is a flow diagram of an example process 2500 for cryptographically encoding a pointer using information embedded in the pointer. The memory allocator (e.g., malloc) may call a new processor instruction at 2502, which may be formatted the same as or similar to the following:

EncodePtr rd; where rd is a pointer that is encoded in place by the instruction

The EncodePtr instruction is configured with privileges to access the secret address key to encrypt the memory address. However, the secret address key is not accessible to the software program. Therefore, the memory allocator may be configured with sufficient privilege to call the EncodePtr instruction.

Portions of process 2500 may be executed by hardware, firmware, and/or software of the computing device 100 (e.g., by the processor 102 executing the address encoding logic 152). Process 2500 begins in response to a memory allocation (e.g., by a memory manager module). At 2504, the computing device 100 determines the unused (e.g., non-canonical) address bits of the linear address to perform the tag/version or size metadata encoding. To do this, the computing device 100 may simply use the higher (e.g., most significant) unused/non-canonical bits of the indirect address. It should be noted that the encoded addresses do not need to be architecturally non-canonical. Rather, the unused/non-canonical addresses can simply be a range of memory set aside by, for example, the privileged system component 142, to enable the particular encoding as disclosed herein. At 2506, the computing device 100 creates the tag/version with randomly or deterministically generated bits and encodes the tag/version in the unused/non-canonical bits of the linear address selected at 2504. The remaining plaintext address bits of the linear address are encoded adjacent to the tag/version portion. The instruction is completed as indicated at 2508.

Multi-tenant workloads can be supported by restricting a tenant from generating new pointers besides those that are granted by the supervisor to the tenant, except for new pointers that are generated from other pointers that the tenant already possesses by simply adjusting the offset or using the SCOPE instruction.

Restricting Code Accesses

As noted previously herein, encoded pointers as described herein for accessing data can also be adapted to control code fetches. This includes cryptographically encoded pointers with tag/version portions (e.g., 1610, 1810) as well as non-cryptographically encoded pointers with tag/version portions (e.g., 2410). Moreover, other encoded pointer formats (e.g., 610, 810, 1410, 1510) may also be used to control code fetches if a tag/version portion is added, for example, by increasing address register size, by reducing the number of address bits embedded in the pointer, and/or reducing the number of other metadata bits embedded in the encoded pointer).

Typically, code fetches are performed automatically by a processor based on the contents of an instruction pointer register, such as RIP, which is a 64-bit instruction pointer register. In an embodiment for controlling code fetches, tag/version bits are included in a instruction pointer register, such as RIP, (e.g., 64-bit register) to bind encryption of the code region to that RIP. Pointers described herein with a tag/version portion such as a cryptographically encoded pointer with EBA (e.g., 1610, 1810) or an encoded pointer without encrypted address bits (e.g., 2410), may be stored in an RIP to fetch code regions and bind data encryption of a code region to the pointer that references that code region. For pointer formats that include other metadata (e.g., size bits), then that metadata may also be included in the RIP. Context information (if any) for use during a code fetch can be stored in a dedicated register alongside the RIP register. Indirect branch instructions can specify updated context information, for example, in an immediate operand.

For pointer formats that do not include context information in the encryption and decryption operations, the contents of the RIP register can be used to encrypt/decrypt code regions. For EBA-format pointers and other pointers that use context information, the RIP register, the dedicated register, and the immediate operand (in some scenarios) can be used to encrypt/decrypt code regions. This encryption/decryption of code regions helps limit the code that can be executed by a program by preventing branch target injection. Branch target injection can be used in ROP and JOP attacks where an adversary jumps between snippets of code to perform a sequence of operations that is not intended to be executed by the code. Code pointers that are formatted according to an embodiment disclosed herein force a potential adversary to guess or obtain tag/version bit values. Tag/version bits can be randomized into an unpredictable value for each code region each time a program is loaded to harden the code encryption protections. Using an encrypted base address pointer (e.g., 1610, 1810) with pointer based data encryption layered beneath the EBA embodiment can further harden the code encryption protections by forcing a potential adversary to guess or obtain both a valid encrypted base address slice for the targeted code region as well as a valid tag/version for the region.

An EBA-format pointer with memory allocation size context information can indicate the bounds within which a particular part of a program (e.g., a function) can execute. The dedicated register holding context information is used implicitly by the processor when performing code accesses. When a branch or call instruction is executed, a new extended branch/call instruction is used to specify updated context information (e.g., in an immediate operand of the instruction) for the dedicated register so that the access in the new function can succeed.

Forward code pointer protections to enforce that all indirect branches use legitimate targets can be probabilistically checked through load-time generation and fix-ups of pointers in an EBA-format and in other pointer formats containing a tag/version portion, or runtime generation of the same. This can be applied to functions and other indirect branch targets (e.g., switch statements in C programming language).

Encoded pointers can also be used to secure imported functions. An imported function is a library file that is dynamically pulled into a program's address space as needed. Thus, the function may be pulled into different locations in different programs. In addition, the key used to encrypt/decrypt the pointers also changes. Thus, the pointer value may need to change as it gets loaded into different programs. Typically, most binary structures have a section that includes information regarding the addresses of imported functions. This section is referred to herein as a global function table. One example of a global function table is a procedure linkage table (PLT) for an executable and linking format (ELF) file. Any references to imported functions themselves within the binary are represented as an offset (e.g., in a global offset table (GOT)) from the start of the global function table. For an embodiment using a pointer format with a tag/version portion, but no context information, at load-time the actual addresses in the global function table can be replaced by the pointer (e.g., 2410) by generation and inclusion of newly generated tag/version bits. For an embodiment using a pointer format with a tag/version portion and also context information (e.g., EBA-format pointers 1610, 1810), at load-time the actual addresses in the global function table can be replaced by the pointer by generation and inclusion of newly generated tag/version bits, with the pointer being bound to context information indicating the size of the destination code region (e.g., function, basic blocks free of control flow transfer, or compilation unit).

For ordinary pointers (e.g., not referencing imported functions), metadata associated with executable code (e.g., ELF file) is stored in the executable file. The metadata indicates the location of the code pointers in the executable file and the objects they reference. The code pointers in the executable file are to be updated once executable file is loaded. As the executable file is being loaded, a software component (e.g., loader) can go through the list of code pointers and encode them according to their particular encoding format (e.g., encrypted slice such as EBA, non-encrypted address bits, etc.).

Corresponding code regions (e.g., functions, basic blocks free of control flow transfers, or compilation units) can then be encrypted accordingly. Functions can contain one or more basic blocks, which may have a single entry point and exit point. Generally, basic blocks that are connected with direct branching (e.g., number of bytes to jump is embedded in code rather than a register) can have the same context information. Indirect branches that transfer between basic blocks (e.g., switch statements in C programming language), however, are likely to use different context information. Compilation units are files that may have included files. Thus, regions of code can be defined at different granularities based on particular implementations and needs.

Finer-grained policies can potentially mitigate more vulnerabilities. However, such policies could increase code size if using a block cipher based code encryption scheme that requires code encrypted with distinct tags to be aligned to block boundaries. Alternatively, fine-grain protections that do not increase code size can be achieved by using a stream-cipher based encryption scheme (e.g., AES-CTR mode).

Similar pointer tagging operations can be performed to update code pointers embedded in global variables, indirect branch targets pointing to functions or other code that are not invoked via a global function table, or code pointers in non-position-independent programs.

Binding Data Encryption to Pointer Authentication Codes

A pointer authentication code comprises a message authentication code (MAC) embedded in a region of a pointer. The pointer authentication code is computed over the address portion of the pointer and may also incorporate context information such as an identifier (ID) for the type of data or code to which the pointer refers or the storage location for the pointer as a tweak value.

Prior to accessing data or code, the pointer authentication code may be recomputed from the address portion of the pointer and the expected context information. If the recomputed pointer authentication code matches the one embedded in the pointer, then the pointer is considered to be valid for use at that access site. This check can mitigate type confusion and at least some out-of-bounds vulnerabilities. For example, if the compiler knows the size of the relevant data type, and if it includes static or dynamic bounds checks based on that information, then a type check is sufficient for verifying the correctness of the associated bounds checks.

In other scenarios, some data types such as variable-length arrays do not have a predetermined length. To mitigate out-of-bounds accesses for such data types, data encryption can be bound to pointer authentication codes. For example, the pointer authentication code from the pointer used to access an object can be used as a tweak value for the data encryption. Any attempt to access data outside the bounds of the object would result in incorrect decryption with high probability, since other objects would have been encrypted with a different tweak value. This can result in garbled data being read or an integrity violation being generated if integrity checking is active. Binding data encryption to pointer authentication codes can also be used to detect out-of-bounds writes if a read-for-ownership is performed prior to the write. A read-for-ownership is a read operation that precedes most writes to ensure that the current hardware thread has ownership of the relevant cache lines prior to writing them.

Use-after-free/dangling pointer vulnerabilities can also be mitigated by binding data encryption to pointer authentication codes assuming that a freed location is reallocated with objects of different types or base addresses. Attempts to use a dangling pointer to access a reallocated object causes a mismatch between the tweak value used to encrypt the current data and the pointer authentication code in the dangling pointer.

Just as for other pointer formats, uninitialized use can also be detected by delaying a write-for-ownership of an object until the object is initialized.

When performing a memory access to a non-zero offset within an object referenced using an authenticated pointer, some instruction set architectures such as Intel® IA-32 architecture, supply the authenticated pointer as the base address register value, with the scale, index, and displacement values indicating the offset. This enables a CPU to obtain the base address value that should be used when checking the pointer authentication code. Other address-passing mechanisms may be appropriate on alternative architectures.

Example Architectures

Figure 26:
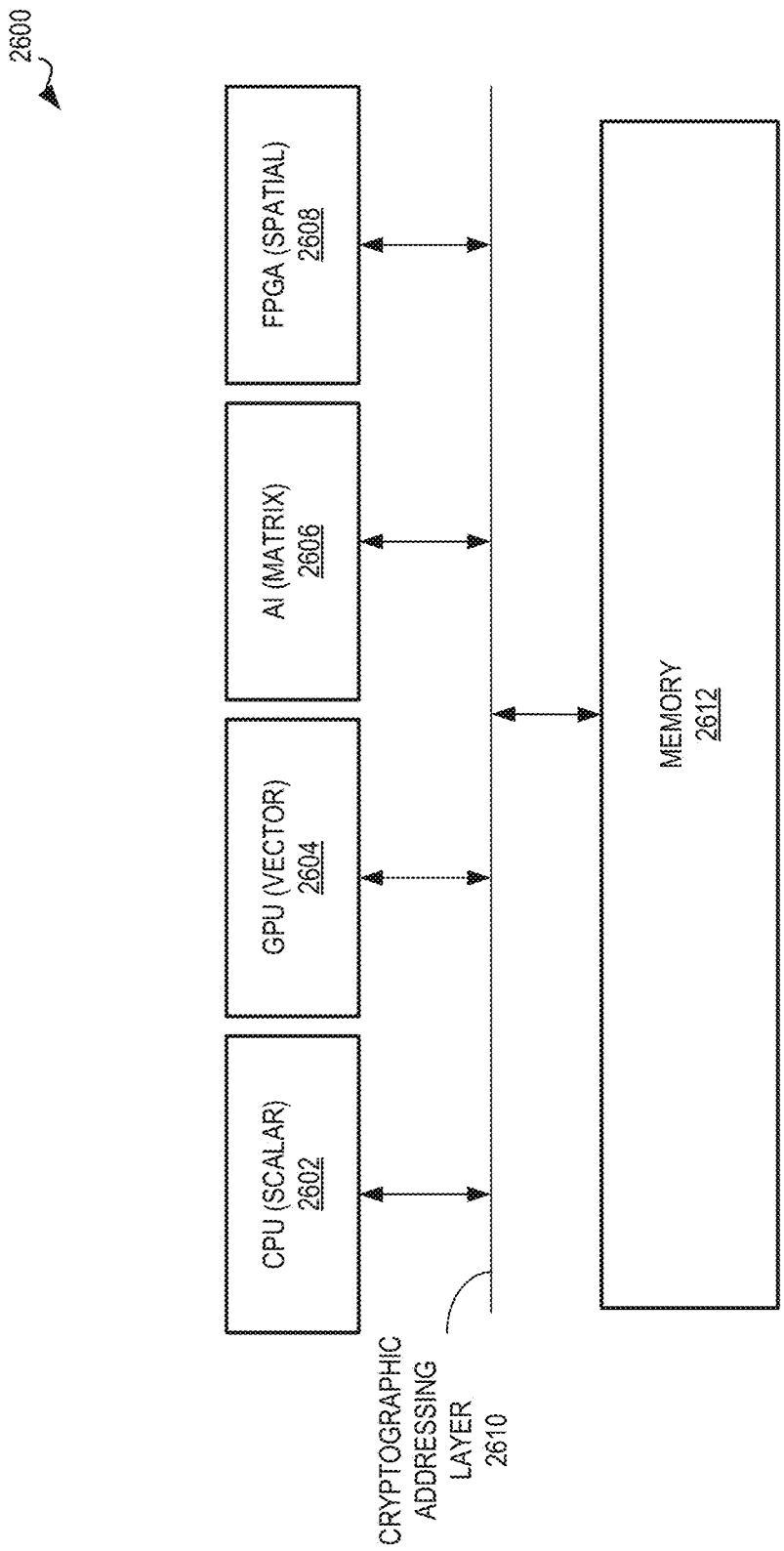
FIG. 26 is a block diagram illustrating an example cryptographic computing environment according to at least one embodiment.

FIG. 26 is a block diagram illustrating an example cryptographic computing environment 2600 according to at least one embodiment. In the example shown, a cryptographic addressing layer 2610 extends across the example compute vectors central processing unit (CPU) 2602, graphical processing unit (GPU) 2604, artificial intelligence (AI) 2606, and field programmable gate array (FPGA) 2608. For example, the CPU 2602 and GPU 2604 may share the same virtual address translation for data stored in memory 2612, and the cryptographic addresses may build on this shared virtual memory. They may share the same process key for a given execution flow, and compute the same tweaks to decrypt the cryptographically encoded addresses and decrypt the data referenced by such encoded addresses, following the same cryptographic algorithms.

Combined, the capabilities described herein may enable cryptographic computing. Memory 2612 may be encrypted at every level of the memory hierarchy, from the first level of cache through last level of cache and into the system memory. Binding the cryptographic address encoding to the data encryption may allow extremely fine-grain object boundaries and access control, enabling fine grain secure containers down to even individual functions and their objects for function-as-a-service. Cryptographically encoding return addresses on a call stack (depending on their location) may also enable control flow integrity without the need for shadow stack metadata. Thus, any of data access control policy and control flow can be performed cryptographically, simply dependent on cryptographic addressing and the respective cryptographic data bindings.

Figure 27:
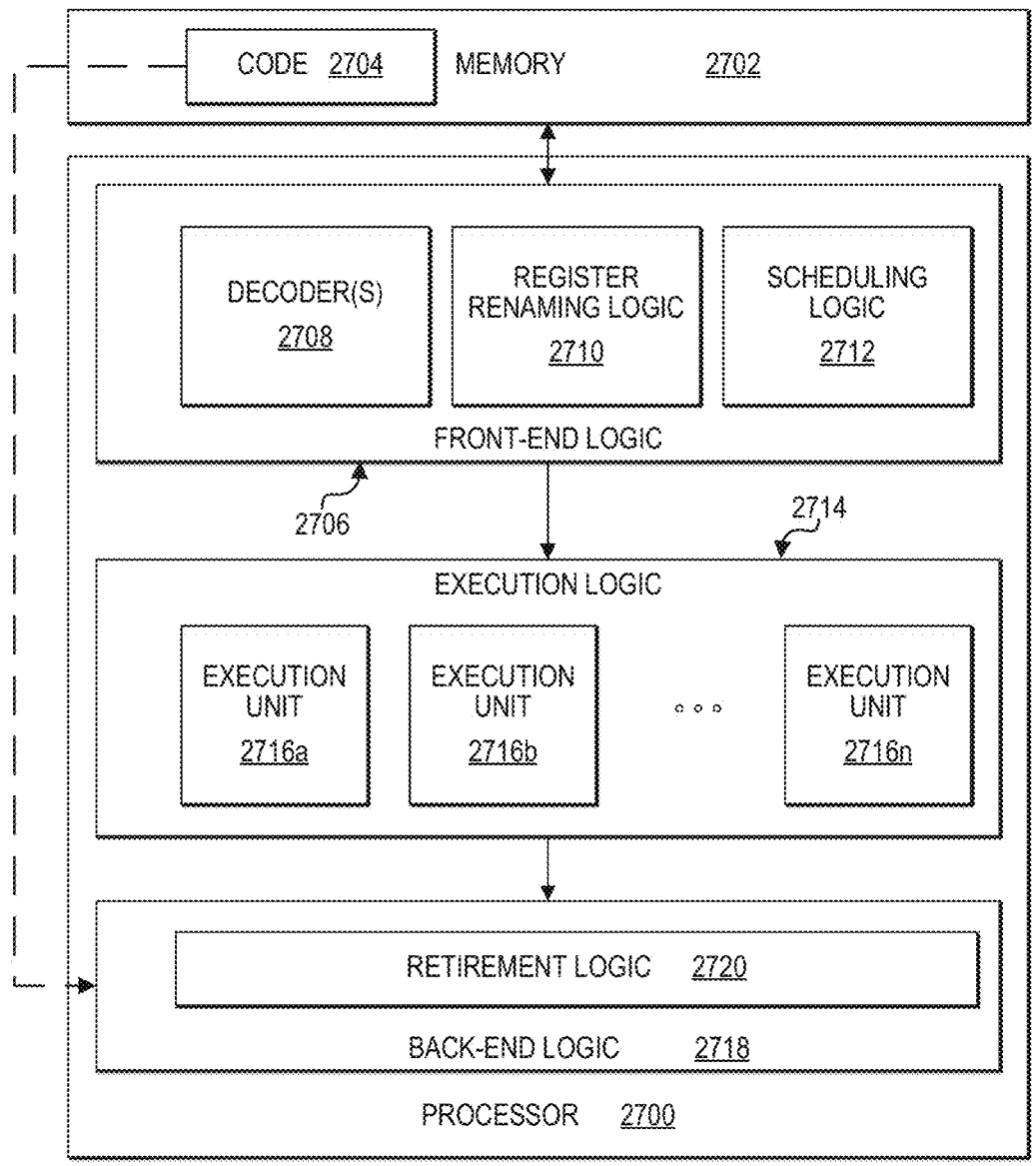
FIG. 27 is a block diagram illustrating an example processor core and memory according to at least one embodiment.
Figure 28:
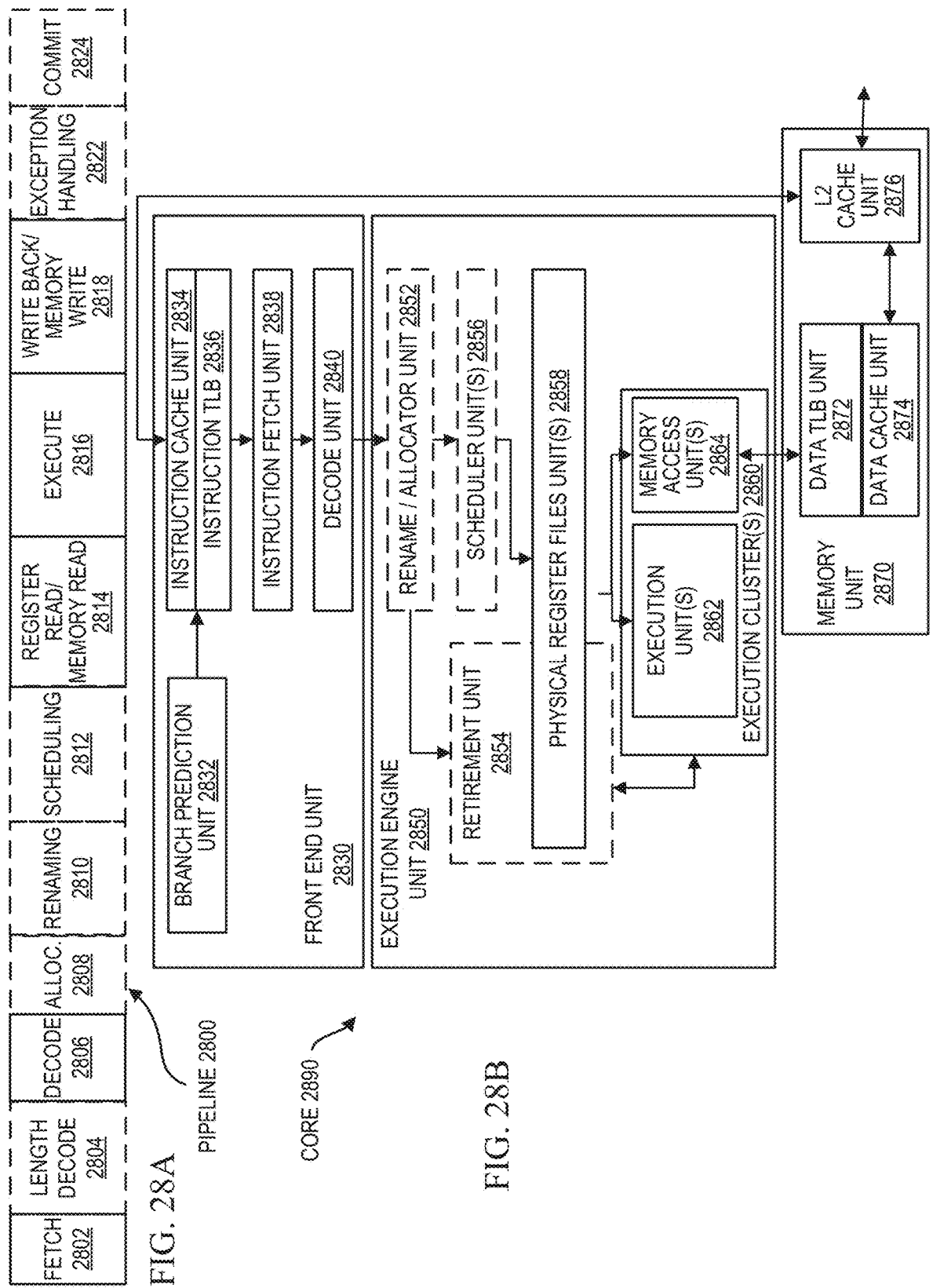
FIG. 28A is a block diagram illustrating both an exemplary in-order pipeline and an exemplary register renaming, out-of-order issue/execution pipeline in accordance with certain embodiments.
FIG. 28B is a block diagram illustrating both an exemplary embodiment of an in-order architecture core and an exemplary register renaming, out-of-order issue/execution architecture core to be included in a processor in accordance with certain embodiments.
Figure 29:
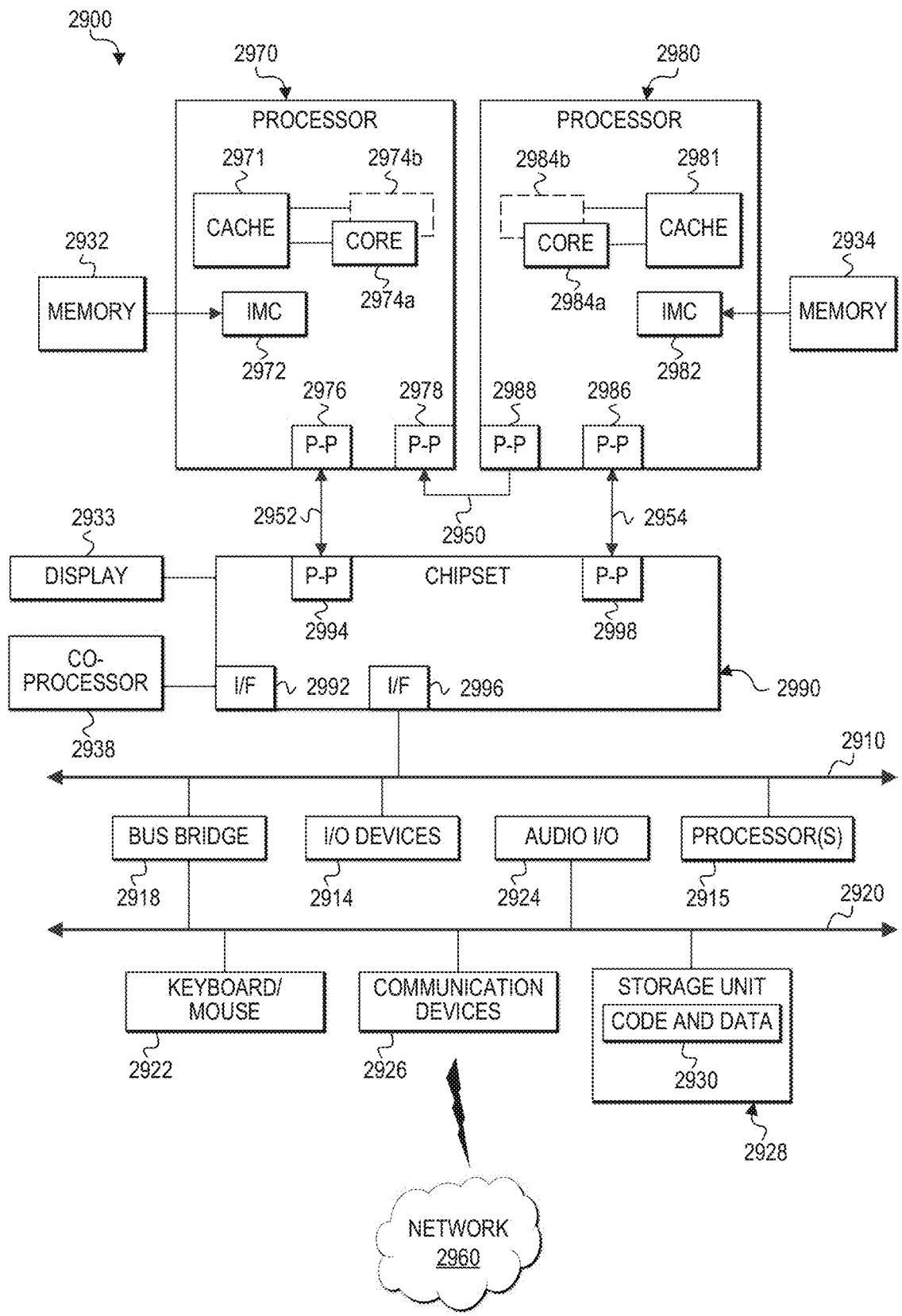
FIG. 29 is a block diagram of an example computer architecture according to at least one embodiment.

FIGS. 27-29 are block diagrams of exemplary computer architectures that may be used in accordance with embodiments disclosed herein. Generally, any computer architecture designs known in the art for processors and computing systems may be used. In an example, system designs and configurations known in the arts for laptops, desktops, handheld PCs, personal digital assistants, tablets, engineering workstations, servers, network devices, servers, appliances, network hubs, routers, switches, embedded processors, digital signal processors (DSPs), graphics devices, video game devices, set-top boxes, micro controllers, smart phones, mobile devices, wearable electronic devices, portable media players, hand held devices, and various other electronic devices, are also suitable for embodiments of computing systems described herein. Generally, suitable computer architectures for embodiments disclosed herein can include, but are not limited to, configurations illustrated in FIGS. 27-29.

FIG. 27 is an example illustration of a processor according to an embodiment. Processor 2700 is an example of a type of hardware device that can be used in connection with the implementations shown and described herein (e.g., processor 102). Processor 2700 may be any type of processor, such as a microprocessor, an embedded processor, a digital signal processor (DSP), a network processor, a multi-core processor, a single core processor, or other device to execute code. Although only one processor 2700 is illustrated in FIG. 27, a processing element may alternatively include more than one of processor 2700 illustrated in FIG. 27. Processor 2700 may be a single-threaded core or, for at least one embodiment, the processor 2700 may be multi-threaded in that it may include more than one hardware thread context (or "logical processor") per core.

FIG. 27 also illustrates a memory 2702 coupled to processor 2700 in accordance with an embodiment. Memory 2702 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 2700 can execute any type of instructions associated with algorithms, processes, or operations detailed herein. Generally, processor 2700 can transform an element or an article (e.g., data) from one state or thing to another state or thing.

Code 2704, which may be one or more instructions to be executed by processor 2700, may be stored in memory 2702, or may be stored in software, hardware, firmware, or any suitable combination thereof, or in any other internal or external component, device, element, or object where appropriate and based on particular needs. In one example, processor 2700 can follow a program sequence of instructions indicated by code 2704. Each instruction enters a front-end logic 2706 and is processed by one or more decoders 2708. The decoder may generate, as its output, a micro operation such as a fixed width micro operation in a predefined format, or may generate other instructions, microinstructions, or control signals that reflect the original code instruction. Front-end logic 2706 also includes register renaming logic 2710 and scheduling logic 2712, which generally allocate resources and queue the operation corresponding to the instruction for execution.

Processor 2700 can also include execution logic 2714 having a set of execution units 2716a, 2716b, 2716n, etc. Some embodiments may include a number of execution units dedicated to specific functions or sets of functions. Other embodiments may include only one execution unit or one execution unit that can perform a particular function. Execution logic 2714 performs the operations specified by code instructions.

After completion of execution of the operations specified by the code instructions, back-end logic 2718 can retire the instructions of code 2704. In one embodiment, processor 2700 allows out of order execution but requires in order retirement of instructions. Retirement logic 2720 may take a variety of known forms (e.g., re-order buffers or the like). In this manner, processor 2700 is transformed during execution of code 2704, at least in terms of the output generated by the decoder, hardware registers and tables utilized by register renaming logic 2710, and any registers (not shown) modified by execution logic 2714.

Although not shown in FIG. 27, a processing element may include other elements on a chip with processor 2700. For example, a processing element may include memory control logic along with processor 2700. The processing element may include I/O control logic and/or may include I/O control logic integrated with memory control logic. The processing element may also include one or more caches. In some embodiments, non-volatile memory (such as flash memory or fuses) may also be included on the chip with processor 2700.

FIG. 28A is a block diagram illustrating both an exemplary in-order pipeline and an exemplary register renaming, out-of-order issue/execution pipeline according to one or more embodiments of this disclosure. FIG. 28B is a block diagram illustrating both an exemplary embodiment of an in-order architecture core and an exemplary register renaming, out-of-order issue/execution architecture core to be included in a processor according to one or more embodiments of this disclosure. The solid lined boxes in FIGS. 28A-28B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 28A, a processor pipeline 2800 includes a fetch stage 2802, a length decode stage 2804, a decode stage 2806, an allocation stage 2808, a renaming stage 2810, a schedule (also known as a dispatch or issue) stage 2812, a register read/memory read stage 2814, an execute stage 2816, a write back/memory write stage 2818, an exception handling stage 2822, and a commit stage 2824.

FIG. 28B shows processor core 2890 including a front end unit 2830 coupled to an execution engine unit 2850, and both are coupled to a memory unit 2870. Processor core 2890 and memory unit 2870 are examples of the types of hardware that can be used in connection with the implementations shown and described herein (e.g., processor 102, memory 122). The core 2890 may be a reduced instruction set computing (RISC) core, a complex instruction set computing (CISC) core, a very long instruction word (VLIW) core, or a hybrid or alternative core type. As yet another option, the core 2890 may be a special-purpose core, such as, for example, a network or communication core, compression engine, coprocessor core, general purpose computing graphics processing unit (GPGPU) core, graphics core, or the like. In addition, processor core 2890 and its components represent example architecture that could be used to implement logical processors and their respective components.

The front end unit 2830 includes a branch prediction unit 2832 coupled to an instruction cache unit 2834, which is coupled to an instruction translation lookaside buffer (TLB) unit 2836, which is coupled to an instruction fetch unit 2838, which is coupled to a decode unit 2840. The decode unit 2840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 2840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 2890 includes a microcode ROM or other medium that stores microcode for certain macroinstructions (e.g., in decode unit 2840 or otherwise within the front end unit 2830). The decode unit 2840 is coupled to a rename/allocator unit 2852 in the execution engine unit 2850.

The execution engine unit 2850 includes the rename/allocator unit 2852 coupled to a retirement unit 2854 and a set of one or more scheduler unit(s) 2856. The scheduler unit(s) 2856 represents any number of different schedulers, including reservations stations, central instruction window, etc. The scheduler unit(s) 2856 is coupled to the physical register file(s) unit(s) 2858. Each of the physical register file(s) units 2858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 2858 comprises a vector registers unit, a write mask registers unit, and a scalar registers unit. These register units may provide architectural vector registers, vector mask registers, and general purpose registers (GPRs). In at least some embodiments described herein, register units 2858 are examples of the types of hardware that can be used in connection with the implementations shown and described herein (e.g., registers 112). The physical register file(s) unit(s) 2858 is overlapped by the retirement unit 2854 to illustrate various ways in which register renaming and out-of-order execution may be implemented (e.g., using a reorder buffer(s) and a retirement register file(s); using a future file(s), a history buffer(s), and a retirement register file(s); using register maps and a pool of registers; etc.). The retirement unit 2854 and the physical register file(s) unit(s) 2858 are coupled to the execution cluster(s) 2860. The execution cluster(s) 2860 includes a set of one or more execution units 2862 and a set of one or more memory access units 2864. The execution units 2862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Execution units 2862 may also include an address generation unit (e.g., 822) to calculate addresses used by the core to access main memory (e.g., memory unit 2870) and a page miss handler (PMH) (e.g., 826).

The scheduler unit(s) 2856, physical register file(s) unit(s) 2858, and execution cluster(s) 2860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 2864). It should also be understood that where separate pipelines are used, one or more of these pipelines may be out-of-order issue/execution and the rest in-order.

The set of memory access units 2864 is coupled to the memory unit 2870, which includes a data TLB unit 2872 coupled to a data cache unit 2874 coupled to a level 2 (L2) cache unit 2876. In one exemplary embodiment, the memory access units 2864 may include a load unit, a store address unit, and a store data unit, each of which is coupled to the data TLB unit 2872 in the memory unit 2870. The instruction cache unit 2834 is further coupled to a level 2 (L2) cache unit 2876 in the memory unit 2870. The L2 cache unit 2876 is coupled to one or more other levels of cache and eventually to a main memory. In addition, a page miss handler (e.g., page miss handler 826) may also be included in core 2890 to look up an address mapping in a page table if no match is found in the data TLB unit 2872.

By way of example, the exemplary register renaming, out-of-order issue/execution core architecture may implement the pipeline 2800 as follows: 1) the instruction fetch 2838 performs the fetch and length decoding stages 2802 and 2804; 2) the decode unit 2840 performs the decode stage 2806; 3) the rename/allocator unit 2852 performs the allocation stage 2808 and renaming stage 2810; 4) the scheduler unit(s) 2856 performs the schedule stage 2812; 5) the physical register file(s) unit(s) 2858 and the memory unit 2870 perform the register read/memory read stage 2814; the execution cluster 2860 perform the execute stage 2816; 6) the memory unit 2870 and the physical register file(s) unit(s) 2858 perform the write back/memory write stage 2818; 7) various units may be involved in the exception handling stage 2822; and 8) the retirement unit 2854 and the physical register file(s) unit(s) 2858 perform the commit stage 2824.

The core 2890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 2890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology). Accordingly, in at least some embodiments, multi-threaded enclaves may be supported.

While register renaming is described in the context of out-of-order execution, it should be understood that register renaming may be used in an in-order architecture. While the illustrated embodiment of the processor also includes separate instruction and data cache units 2834/2874 and a shared L2 cache unit 2876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 29 illustrates a computing system 2900 that is arranged in a point-to-point (PtP) configuration according to an embodiment. In particular, FIG. 29 shows a system where processors, memory, and input/output devices are interconnected by a number of point-to-point interfaces. Generally, one or more of the computing systems or computing devices described (e.g., computing device 100) herein may be configured in the same or similar manner as computing system 2900.

Processors 2970 and 2980 may be implemented as single core processors 2974a and 2984a or multi-core processors 2974a-2974b and 2984a-2984b. Processors 2970 and 2980 may each include a cache 2971 and 2981 used by their respective core or cores. A shared cache (not shown) may be included in either processors or outside of both processors, yet connected with the processors via P-P interconnect, such that either or both processors' local cache information may be stored in the shared cache if a processor is placed into a low power mode. It should be noted that one or more embodiments described herein could be implemented in a computing system, such as computing system 2900. Moreover, processors 2970 and 2980 are examples of the types of hardware that can be used in connection with the implementations shown and described herein (e.g., processor 102).

Processors 2970 and 2980 may also each include integrated memory controller logic (MC) 2972 and 2982 to communicate with memory elements 2932 and 2934, which may be portions of main memory locally attached to the respective processors. In alternative embodiments, memory controller logic 2972 and 2982 may be discrete logic separate from processors 2970 and 2980. Memory elements 2932 and/or 2934 may store various data to be used by processors 2970 and 2980 in achieving operations and functionality outlined herein.

Processors 2970 and 2980 may be any type of processor, such as those discussed in connection with other figures. Processors 2970 and 2980 may exchange data via a point-to-point (PtP) interface 2950 using point-to-point interface circuits 2978 and 2988, respectively. Processors 2970 and 2980 may each exchange data with an input/output (I/O) subsystem 2990 via individual point-to-point interfaces 2952 and 2954 using point-to-point interface circuits 2976, 2986, 2994, and 2998. I/O subsystem 2990 may also exchange data with a high-performance graphics circuit 2938 via a high-performance graphics interface 2939, using an interface circuit 2992, which could be a PtP interface circuit. In one embodiment, the high-performance graphics circuit 2938 is a special-purpose processor, such as, for example, a high-throughput MIC processor, a network or communication processor, compression engine, graphics processor, GPGPU, embedded processor, or the like. I/O subsystem 2990 may also communicate with a display 2933 for displaying data that is viewable by a human user. In alternative embodiments, any or all of the PtP links illustrated in FIG. 29 could be implemented as a multi-drop bus rather than a PtP link.

I/O subsystem 2990 may be in communication with a bus 2910 via an interface circuit 2996. Bus 2910 may have one or more devices that communicate over it, such as a bus bridge 2918, I/O devices 2914, and one or more other processors 2915. Via a bus 2920, bus bridge 2918 may be in communication with other devices such as a user interface 2922 (such as a keyboard, mouse, touchscreen, or other input devices), communication devices 2926 (such as modems, network interface devices, or other types of communication devices that may communicate through a computer network 2960), audio I/O devices 2924, and/or a data storage device 2928. Data storage device 2928 may store code and data 2930, which may be executed by processors 2970 and/or 2980. In alternative embodiments, any portions of the bus architectures could be implemented with one or more PtP links.

Program code, such as code 2930, may be applied to input instructions to perform the functions described herein and generate output information. The output information may be applied to one or more output devices, in known fashion. For purposes of this application, a processing system may be part of computing system 2900 and includes any system that has a processor, such as, for example; a digital signal processor (DSP), a microcontroller, an application specific integrated circuit (ASIC), or a microprocessor.

The program code (e.g., 2930) may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the one or more of the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the present disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

The computing system depicted in FIG. 29 is a schematic illustration of an embodiment of a computing system that may be utilized to implement various embodiments discussed herein. It will be appreciated that various components of the system depicted in FIG. 29 may be combined in a system-on-a-chip (SoC) architecture or in any other suitable configuration capable of achieving the functionality and features of examples and implementations provided herein.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 30:
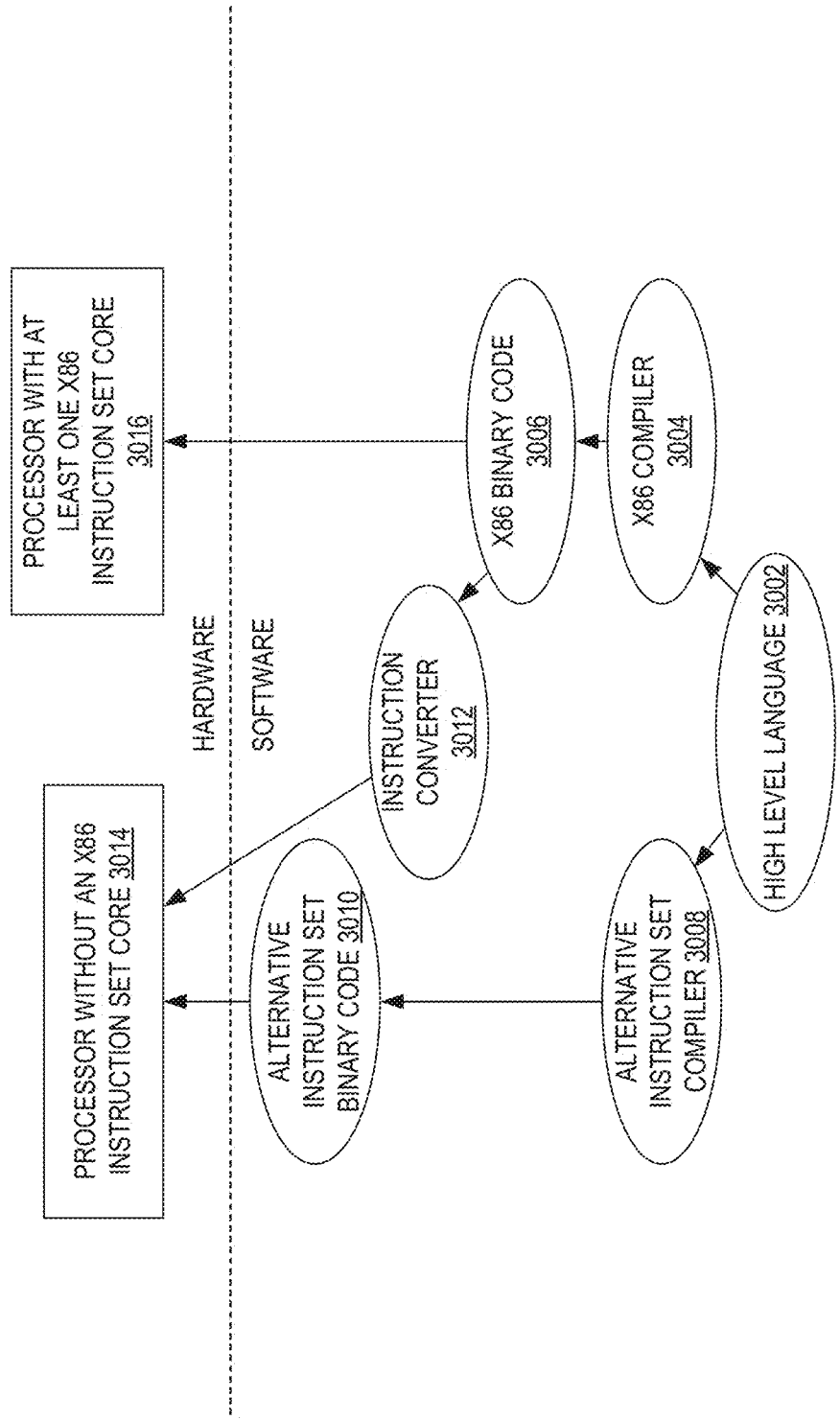
FIG. 30 is a block diagram contrasting the use of a software instruction converter to convert binary instructions in a source instruction set to binary instructions in a target instruction set according to embodiments of the present disclosure.

FIG. 30 is a block diagram contrasting the use of a software instruction converter to convert binary instructions in a source instruction set to binary instructions in a target instruction set according to embodiments of this disclosure. In the illustrated embodiment, the instruction converter is a software instruction converter, although alternatively the instruction converter may be implemented in software, firmware, hardware, or various combinations thereof. FIG. 30 shows a program in a high level language 3002 may be compiled using an x86 compiler 3004 to generate x86 binary code 3006 that may be natively executed by a processor with at least one x86 instruction set core 3016. The processor with at least one x86 instruction set core 3016 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 3004 represents a compiler that is operable to generate x86 binary code 3006 (e.g., object code) that can, with or without additional linkage processing, be executed on the processor with at least one x86 instruction set core 3016. Similarly, FIG. 30 shows the program in the high level language 3002 may be compiled using an alternative instruction set compiler 3008 to generate alternative instruction set binary code 3010 that may be natively executed by a processor without at least one x86 instruction set core 3014 (e.g., a processor with cores that execute the MIPS instruction set of MIPS Technologies of Sunnyvale, Calif. and/or that execute the ARM instruction set of ARM Holdings of Sunnyvale, Calif.). The instruction converter 3012 is used to convert the x86 binary code 3006 into code that may be natively executed by the processor without an x86 instruction set core 3014. This converted code is not likely to be the same as the alternative instruction set binary code 3010 because an instruction converter capable of this is difficult to make; however, the converted code will accomplish the general operation and be made up of instructions from the alternative instruction set. Thus, the instruction converter 3012 represents software, firmware, hardware, or a combination thereof that, through emulation, simulation or any other process, allows a processor or other electronic device that does not have an x86 instruction set processor or core to execute the x86 binary code 3006.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Other variations are within the scope of the following claims.

The architectures presented herein are provided by way of example only, and are intended to be non-exclusive and non-limiting. Furthermore, the various parts disclosed are intended to be logical divisions only, and need not necessarily represent physically separate hardware and/or software components. Certain computing systems may provide memory elements in a single physical memory device, and in other cases, memory elements may be functionally distributed across many physical devices. In the case of virtual machine managers or hypervisors, all or part of a function may be provided in the form of software or firmware running over a virtualization layer to provide the disclosed logical function.

Note that with the examples provided herein, interaction may be described in terms of a single computing system. However, this has been done for purposes of clarity and example only. In certain cases, it may be easier to describe one or more of the functionalities of a given set of flows by only referencing a single computing system. Moreover, the system for deep learning and malware detection is readily scalable and can be implemented across a large number of components (e.g., multiple computing systems), as well as more complicated/sophisticated arrangements and configurations. Accordingly, the examples provided should not limit the scope or inhibit the broad teachings of the computing system as potentially applied to a myriad of other architectures.

As used herein, unless expressly stated to the contrary, use of the phrase 'at least one of' refers to any combination of the named items, elements, conditions, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z.

Additionally, unless expressly stated to the contrary, the terms 'first', 'second', 'third', etc., are intended to distinguish the particular nouns (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

References in the specification to "one embodiment," "an embodiment," "some embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment.

While this specification contains many specific implementation details, these should not be construed as limitations on the scope of any embodiments or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, the separation of various system components and modules in the embodiments described above should not be understood as requiring such separation in all embodiments. It should be understood that the described program components, modules, and systems can generally be integrated together in a single software product or packaged into multiple software products.

Thus, particular embodiments of the subject matter have been described. Other embodiments are within the scope of this disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

OTHER NOTES AND EXAMPLES

The following examples pertain to embodiments in accordance with this specification. The system, apparatus, method, and machine readable storage medium embodiments can include one or a combination of the following examples:

Example A1 provides a processor comprising a core to execute an instruction, the core including: a first register to store an encoded pointer to a memory location, where first context information is stored in first bits of the encoded pointer and a slice of a memory address of the memory location is stored in second bits of the encoded pointer. The processor further comprises circuitry to: decode the encoded pointer to obtain the memory address of the memory location; use the memory address obtained by decoding the encoded pointer to access encrypted data at the memory location; and decrypt the encrypted data based on a first key and a first tweak, the first tweak including one or more bits derived, at least in part, from the encoded pointer.

In Example A2, the subject matter of Example A1 can optionally include where to decode the encoded pointer includes generating a decrypted slice of the memory address by decrypting the slice of the memory address in the encoded pointer based at least in part on a second tweak including one or more other bits.

In Example A3, the subject matter of Example A1 can optionally include where decrypting the slice of the memory address stored in the second bits of the encoded pointer is based in part on a second key.

In Example A4, the subject matter of any one of Examples A2-A3 can optionally include where the one or more other bits of the second tweak are obtained from at least one of the first register, an operand of the instruction, and a control register.

In Example A5, the subject matter of any one of Examples A2-A4 can optionally include where the second tweak includes at least one of: plaintext slice bits of the memory address; size bits indicating a number of bits of a particular plaintext slice of the memory address; memory allocation size bits indicating an amount of memory allocated at the memory location referenced by the encoded pointer; tag bits representing a random value associated with the encoded pointer; permission bits indicating a level of access authorized for the memory location; type bits indicating a class of the encrypted data in the memory location; version bits representing a deterministically different value associated with the encoded pointer; privilege level bits indicating a user level or a supervisor level; and crypto context identifier bits representing a unique value for particular group of functions.

In Example A6, the subject matter of any one of Examples A2-A5 can optionally include where the circuitry is further to, responsive to a request to allocate a portion of memory: obtain the memory address for the memory location; and generate the encoded pointer to the memory location. To generate the encoded pointer to the memory location includes storing the first context information in the first bits of the encoded pointer; and generating the slice of the memory address by encrypting a subset of bits of one or more bits in the memory address based, at least in part, on the second tweak.

In Example A7, the subject matter of any one of Examples A2-A6 can optionally include where to decode the encoded pointer includes concatenating the decrypted slice of the memory address and a plaintext slice of the memory address.

In Example A8, the subject matter of Example A7 can optionally include where the plaintext slice of the memory address is stored in the encoded pointer or in a second register.

In Example A9, the subject matter of any one of Examples A7-A8 can optionally include where the first tweak includes: the first context information stored in the first bits of the encoded pointer; and a linear address generated using at least the decrypted slice of the memory address concatenated with the plaintext slice of the memory address and an offset in the encoded pointer.

In Example A10, the subject matter of any one of Examples A1-A9 can optionally include where the first bits of the encoded pointer are randomized or sequentially incremented.

In Example A11, the subject matter of any one of Examples A1-A8 can optionally include where a second slice of the memory address is stored in immutable plaintext bits of the encoded pointer, and where a third slice of the memory address is stored in mutable plaintext bits of the encoded pointer.

In Example A12, the subject matter of Example A11 can optionally include where the first tweak includes the first bits of the encoded pointer, the second bits of the encoded pointer, the immutable plaintext bits of the encoded pointer, and the mutable plaintext bits of the encoded pointer.

In Example A13, the subject matter of any one of Examples A11-A12 can optionally include where the first context information includes size metadata that indicates in a power of two, a first number of bits included in the immutable plaintext bits of the encoded pointer or in the mutable plaintext bits of the encoded pointer.

In Example A14, the subject matter of Example A13 can optionally include where, based on the size metadata indicating a number of bits that is greater than a maximum allowed number of bits for the immutable plaintext bits of the encoded pointer or for the mutable plaintext bits of the encoded pointer, the size metadata encodes a time dimension to the memory location.

In Example A15, the subject matter of Example A1 can optionally include where the first bits of the encoded pointer are randomized and the memory address is stored in one or more other bits in the encoded pointer in a plaintext format.

In Example A16, the subject matter of Example A15 can optionally include where the first tweak includes the first bits of the encoded pointer and the one or more other bits in the encoded pointer storing the memory address in the plaintext format.

In Example A17, the subject matter of any one of Examples A1-A16 can optionally include where the one or more bits of the first tweak are derived entirely from the encoded pointer.

In Example A18, the subject matter of any one of Examples A1-A16 can optionally include where at least some of the one or more bits of the first tweak are obtained from at least one of an operand of the instruction and a control register.

In Example A19, the subject matter of any one of Examples A1-A18 can optionally include where the first tweak includes at least one of: size bits indicating a number of bits of a particular plaintext slice of the memory address; memory allocation size bits indicating an amount of memory allocated at the memory location referenced by the encoded pointer; tag bits representing a random value associated with the encoded pointer; permission bits indicating a level of access authorized for the memory location; type bits indicating a class of the encrypted data in the memory location; version bits representing a deterministically different value associated with the encoded pointer; privilege level bits indicating a user level or a supervisor level; and crypto context identifier bits representing a unique value for particular group of functions.

In Example A20, the subject matter of any one of Examples A1-A19 can optionally include where the encoded pointer includes third bits that indicate whether the encoded pointer is to be used with a legacy software program.

Example M1 provides a method comprising: storing, in a register, an encoded pointer to a memory location, where first context information is stored in first bits of the encoded pointer and a slice of a memory address of the memory location is stored in second bits of the encoded pointer. The method further comprises: decoding the encoded pointer to obtain the memory address of the memory location; encrypting data based on a first key and a first tweak derived, at least in part, from the encoded pointer; and using the memory address obtained by decoding the encoded pointer to store the encrypted data at the memory location.

In Example M2, the subject matter of Example M1 can optionally include where the decoding the encoded pointer includes generating a decrypted slice of the memory address by decrypting the slice of the memory address in the encoded pointer based at least in part on a second tweak including one or more other bits.

In Example M3, the subject matter of Example M2 can optionally include where decrypting the slice of the memory address stored in the second bits of the encoded pointer is based in part on a second key.

In Example M4, the subject matter of any one of Examples M2-M3 can optionally include where the one or more other bits of the second tweak are obtained from at least one of the first register, an operand of the instruction, and a control register.

In Example M5, the subject matter of any one of Examples M2-M4 can optionally include where the second tweak includes at least one of: plaintext slice bits of the memory address; size bits indicating a number of bits of a particular plaintext slice of the memory address; memory allocation size bits indicating an amount of memory allocated at the memory location referenced by the encoded pointer; tag bits representing a random value associated with the encoded pointer; permission bits indicating a level of access authorized for the memory location; type bits indicating a class of the encrypted data in the memory location; version bits representing a deterministically different value associated with the encoded pointer; privilege level bits indicating a user level or a supervisor level; and crypto context identifier bits representing a unique value for particular group of functions.

In Example M6, the subject matter of any one of Examples M2-M5 can optionally include where, responsive to a request to allocate a portion of memory, the method further comprises: obtaining the memory address for the memory location; and generating the encoded pointer to the memory location. The generating including storing the first context information in the first bits of the encoded pointer and generating the slice of the memory address by encrypting a subset of bits of one or more bits in the memory address based, at least in part, on the second tweak.

In Example M7, the subject matter of any one of Examples M2-M6 can optionally include where the decoding the pointer further includes concatenating the decrypted slice of the memory address and a plaintext slice of the memory address.

In Example M8, the subject matter of Example M7 can optionally include where the plaintext slice of the memory address is stored in the encoded pointer or in a second register.

In Example M9, the subject matter of any one of Examples M7-M8 can optionally include where the first tweak includes: the first context information stored in the first bits of the encoded pointer; and a linear address generated using at least the decrypted slice of the memory address concatenated with the plaintext slice of the memory address and an offset in the encoded pointer.

In Example M10, the subject matter of any one of Examples M1-M9 can optionally include where the first bits of the encoded pointer are randomized or sequentially incremented.

In Example M11, the subject matter of any one of Examples M1-M8 can optionally include where a second slice of the memory address is stored in immutable plaintext bits of the encoded pointer, and where a third slice of the memory address is stored in mutable plaintext bits of the encoded pointer.

In Example M12, the subject matter of Example M11 can optionally include where the first tweak includes the first bits of the encoded pointer, the second bits of the encoded pointer, the immutable plaintext bits of the encoded pointer, and the mutable plaintext bits of the encoded pointer.

In Example M13, the subject matter of any one of Examples M11-M12 can optionally include where the first context information includes size metadata that indicates in a power of two, a first number of bits included in the immutable plaintext bits of the encoded pointer or in the mutable plaintext bits of the encoded pointer.

In Example M14, the subject matter of Example M13 can optionally include where, based on the size metadata indicating a number of bits that is greater than a maximum allowed number of bits for the immutable plaintext bits of the encoded pointer or for the mutable plaintext bits of the encoded pointer, the size metadata encodes a time dimension to the memory location.

In Example M15, the subject matter of Example M1 can optionally include where the first bits of the encoded pointer are randomized and the memory address is stored in one or more other bits in the encoded pointer in a plaintext format.

In Example M16, the subject matter of Example M15 can optionally include where the first tweak includes the first bits of the encoded pointer and the one or more other bits in the encoded pointer storing the memory address in the plaintext format.

In Example M17, the subject matter of any one of Examples M1-M16 can optionally include the method further comprising deriving the one or more bits of the first tweak entirely from the encoded pointer.

In Example M18, the subject matter of any one of Examples M1-M16 can optionally include the method further comprising obtaining at least some of the one or more bits of the first tweak from at least one of an operand of the instruction and a control register.

In Example M19, the subject matter of any one of Examples M1-M18 can optionally include where the first tweak includes at least one of: size bits indicating a number of bits of a particular plaintext slice of the memory address; memory allocation size bits indicating an amount of memory allocated at the memory location referenced by the encoded pointer; tag bits representing a random value associated with the encoded pointer; permission bits indicating a level of access authorized for the memory location; type bits indicating a class of the encrypted data in the memory location; version bits representing a deterministically different value associated with the encoded pointer; privilege level bits indicating a user level or a supervisor level; and crypto context identifier bits representing a unique value for particular group of functions.

In Example M20, the subject matter of any one of Examples M1-M19 can optionally include where the encoded pointer includes third bits that indicate whether the encoded pointer is to be used with a legacy software program.

Example C1 provides one or more computer-readable media with code stored thereon, where the code is executable to cause a machine to: store, in a register, an encoded pointer to a memory location, where first context information is stored in first bits of the encoded pointer and a slice of a memory address of the memory location is stored in second bits of the encoded pointer. The code is executable to cause a machine further to: decode the encoded pointer to obtain the memory address of the memory location; use the memory address obtained by decoding the encoded pointer to access encrypted data at the memory location; and decrypt the encrypted data based on a first key and a first tweak, the first tweak derived at least in part from the encoded pointer.

In Example C2, the subject matter of Example C1 can optionally include where to decode the encoded pointer includes generating a decrypted slice of the memory address by decrypting the slice of the memory address in the encoded pointer based at least in part on a second tweak including one or more other bits.

In Example C3, the subject matter of Example C2 can optionally include where decrypting the slice of the memory address stored in the second bits of the encoded pointer is based in part on a second key.

In Example C4, the subject matter of any one of Examples C2-C3 can optionally include where the one or more other bits of the second tweak are obtained from at least one of the a first register, an operand of the instruction, and a control register.

In Example C5, the subject matter of any one of Examples C2-C4 can optionally include where the second tweak includes at least one of: plaintext slice bits of the memory address; size bits indicating a number of bits of a particular plaintext slice of the memory address; memory allocation size bits indicating an amount of memory allocated at the memory location referenced by the encoded pointer; tag bits representing a random value associated with the encoded pointer; permission bits indicating a level of access authorized for the memory location; type bits indicating a class of the encrypted data in the memory location; version bits representing a deterministically different value associated with the encoded pointer; privilege level bits indicating a user level or a supervisor level; and crypto context identifier bits representing a unique value for particular group of functions.

In Example C6, the subject matter of any one of Examples C2-C5 can optionally include where the circuitry is further to, responsive to a request to allocate a portion of memory: obtain the memory address for the memory location; and generate the encoded pointer to the memory location. To generate the encoded pointer is to include: storing the first context information in the first bits of the encoded pointer; and generating the slice of the memory address by encrypting a subset of bits of one or more bits in the memory address based, at least in part, on the second tweak.

In Example C7, the subject matter of any one of Examples C2-C6 can optionally include where to decode the encoded pointer includes concatenating the decrypted slice of the memory address and a plaintext slice of the memory address.

In Example C8, the subject matter of Example C7 can optionally include where the plaintext slice of the memory address is stored in the encoded pointer or in a second register.

In Example C9, the subject matter of any one of Examples C7-C8 can optionally include where the first tweak includes: the first context information stored in the first bits of the encoded pointer; and a linear address generated using at least the decrypted slice of the memory address concatenated with the plaintext slice of the memory address and an offset in the encoded pointer.

In Example C10, the subject matter of any one of Examples C1-C9 can optionally include where the first bits of the encoded pointer are randomized or sequentially incremented.

In Example C11, the subject matter of any one of Examples C1-C8 can optionally include where a second slice of the memory address is stored in immutable plaintext bits of the encoded pointer, and where a third slice of the memory address is stored in mutable plaintext bits of the encoded pointer.

In Example C12, the subject matter of Example C11 can optionally include where the first tweak includes the first bits of the encoded pointer, the second bits of the encoded pointer, the immutable plaintext bits of the encoded pointer, and the mutable plaintext bits of the encoded pointer.

In Example C13, the subject matter of any one of Examples C11-C12 can optionally include where the first context information includes size metadata that indicates in a power of two, a first number of bits included in the immutable plaintext bits of the encoded pointer or in the mutable plaintext bits of the encoded pointer.

In Example C14, the subject matter of Example C13 can optionally include where, based on the size metadata indicating a number of bits that is greater than a maximum allowed number of bits for the immutable plaintext bits of the encoded pointer or for the mutable plaintext bits of the encoded pointer, the size metadata encodes a time dimension to the memory location.

In Example C15, the subject matter of Example C1 can optionally include where the first bits of the encoded pointer are randomized and the memory address is stored in one or more other bits in the encoded pointer in a plaintext format.

In Example C16, the subject matter of Example C15 can optionally include where the first tweak includes the first bits of the encoded pointer and the one or more other bits in the encoded pointer storing the memory address in the plaintext format.

In Example C17, the subject matter of any one of Examples C1-C16 can optionally include where the one or more bits of the first tweak are derived entirely from the encoded pointer.

In Example C18, the subject matter of any one of Examples C1-C16 can optionally include where at least some of the one or more bits of the first tweak are obtained from at least one of an operand of the instruction and a control register.

In Example C19, the subject matter of any one of Examples C1-C18 can optionally include where the first tweak includes at least one of: size bits indicating a number of bits of a particular plaintext slice of the memory address; memory allocation size bits indicating an amount of memory allocated at the memory location referenced by the encoded pointer; tag bits representing a random value associated with the encoded pointer; permission bits indicating a level of access authorized for the memory location; type bits indicating a class of the encrypted data in the memory location; version bits representing a deterministically different value associated with the encoded pointer; privilege level bits indicating a user level or a supervisor level; and crypto context identifier bits representing a unique value for particular group of functions.

In Example C20, the subject matter of any one of Examples C1-C19 can optionally include where the encoded pointer includes third bits that indicate whether the encoded pointer is to be used with a legacy software program.

Example X1 provides an apparatus comprising means for performing the method of any one of Examples M1-M20.

In Example X2, the subject matter of Example X1 can optionally include where the means for performing the method comprise at least one processor and at least one memory element.

In Example X3, the subject matter of Example X2 can optionally include where the at least one memory element comprises machine-readable instructions that when executed, cause the apparatus to perform the method of any one of Examples M1-M20.

In Example X4, the subject matter of any one of Examples X1-X3 can optionally include where the apparatus is one of a computing system or a system-on-a-chip.

Example Y1 provides at least one machine readable storage medium comprising instructions, where the instructions when executed realize an apparatus or implement a method as provided in any one of Examples A1-A20 or M1-M20.

What is claimed is:

1. A processor, comprising:
a core to execute an instruction, the core including:
a first register to store an encoded pointer to a memory location, wherein first context information is stored in first bits of the encoded pointer and a first slice of a memory address of the memory location is stored in second bits of the encoded pointer; and
circuitry to:
decode the encoded pointer to obtain the memory address of the memory location; and
use the memory address obtained by decoding encoded pointer to access encrypted data at the memory location; and
decrypt the encrypted data based on a first key and a first tweak derived, at least in part, from the encoded pointer, wherein the first tweak is to include the first context information stored in the first bits of the encoded pointer and at least a portion of the memory address of the memory location.

2. The processor of claim 1, wherein to decode the encoded pointer includes:
generating a decrypted slice of the memory address by decrypting the first slice of the memory address in the encoded pointer based at least in part on a second tweak.

3. The processor of claim 2, wherein decrypting the first slice of the memory address stored in the second bits of the encoded pointer is based in part on a second key.

4. The processor of claim 2, wherein the second tweak is to be obtained from at least one of the first register, an operand of the instruction, and a control register.

5. The processor of claim 2, wherein the second tweak includes at least one of:
plaintext slice bits of the memory address;
size bits indicating a number of bits of a particular aintext slice of the memory address;
memory allocation size bits indicating an amount of memory allocated at the memory location referenced by the encoded pointer;
tag bits representing a random value associated with the encoded pointer;
permission bits indicating a level of access authorized for the memory location;
type bits indicating a class of the encrypted data in the memory location;
version bits representing a deterministically different value associated with the encoded pointer;
privilege level bits indicating a user level or a supervisor level; and
crypto context identifier bits representing a unique value for particular group of functions.

6. The processor of claim 2, wherein the circuitry is further to, responsive to a request to allocate a first portion of memory:
obtain the memory address for the memory location; and
generate the encoded pointer to the memory location, including:
storing the first context information in the first bits of the encoded pointer; and
generating the first slice of the memory address by encrypting a subset of bits of one or more bits in the memory address based, at least in part, on the second tweak.

7. The processor of claim 2, wherein to decode the encoded pointer includes:

concatenating the decrypted slice of the memory address and a plaintext slice of the memory address.

8. The processor of claim 7, wherein the plaintext slice of the memory address is stored in the encoded pointer or in a second register.

9. The processor of claim 7, wherein the at least a portion of the memory address to be included in the first tweak is to include:
a linear address generated using at least the decrypted slice of the memory address concatenated with the plaintext slice of the memory address and an offset in the encoded pointer.

10. The processor of claim 9, wherein the first bits of the encoded pointer are randomized or sequentially incremented.

11. The processor of claim 1, wherein a second slice of the memory address is stored in immutable plaintext bits of the encoded pointer, and wherein a third slice of the memory address is stored in mutable plaintext bits of the encoded pointer.

12. The processor of claim 11, wherein the at least a portion of the memory address to be included in the first tweak is to include the first slice of the memory address stored in the second bits of the encoded pointer, the second slice of the memory address stored in the immutable plaintext bits of the encoded pointer, and the third slice of the memory address stored in the mutable plaintext bits of the encoded pointer.

13. The processor of claim 11, wherein the first context information includes size metadata that indicates in a power of two, a first number of bits included in the immutable plaintext bits of the encoded pointer or in the mutable plaintext bits of the encoded pointer.

14. The processor of claim 13, wherein based on the size metadata indicating a number of bits that is greater than a maximum allowed number of bits for the immutable plaintext bits of the encoded pointer or for the mutable plaintext bits of the encoded pointer, the size metadata encodes a time dimension to the memory location.

15. The processor of claim 1, wherein the first bits of the encoded pointer are randomized and the memory address is stored in one or more bits in the encoded pointer in a plaintext format.

16. The processor claim 15, wherein the at least a portion of the memory address to be included in the first tweak is to include the one or more bits in the encoded pointer storing the memory address in the plaintext format.

17. The processor of claim 1, wherein the first tweak is to be derived entirely from the encoded pointer.

18. The processor of claim 1, wherein the at least a portion of the memory address to be included in the first tweak is to be obtained from at least one of an operand of the instruction and a control register.

19. The processor of claim 1, wherein the first tweak is to include at least one of:
size bits indicating a number of bits of a particular plaintext slice of the memory address;
memory allocation size bits indicating an amount of memory allocated at the memory location referenced by the encoded pointer;
tag bits representing a random value associated with the encoded pointer;
permission bits indicating a level of access authorized for the memory location;
type bits indicating a class of the encrypted data in the memory location;

version bits representing a deterministically different value associated with the encoded pointer;

privilege level bits indicating a user level or a supervisor level; and crypto context identifier bits representing a unique value for particular group of functions.

20. A method, comprising:

storing, in a register, an encoded pointer to a memory location, wherein first context information is stored in first bits of the encoded pointer and a slice of a memory address of the memory location is stored in second bits of the encoded pointer;

decoding the encoded pointer to obtain the memory address of the memory location;

encrypting data based on a first key and a first tweak derived, at least in part, from the encoded pointer, wherein the first tweak is to include the first context information stored in the first bits of the encoded pointer and at least a portion of the memory address of the memory location; and using the memory address obtained by decoding the encoded pointer to store the encrypted data at the memory location.

21. The method of claim 20, wherein the slice of the memory address stored in the second bits of the encoded pointer is encrypted, wherein the decoding the encoded pointer includes:

decrypting the slice of the memory address in the encoded pointer based at least in part on a second tweak.

22. The method of claim 20, wherein the encoded pointer includes third bits that indicate whether the encoded pointer is to be used with a legacy software program.

23. One or more non-transitory computer-readable media with code stored thereon, wherein the code is executable to cause a machine to:

store, in a register, an encoded pointer to a memory location, wherein first context information is stored in first bits of the encoded pointer and a slice of a memory address of the memory location is stored in second bits of the encoded pointer;

decode the encoded pointer to obtain the memory address of the memory location;

use the memory address obtained by decoding the encoded pointer to access encrypted data at the memory location; and decrypt the encrypted data based on a first key and a first tweak derived at least in part from the encoded pointer, the first tweak to include the first context information stored in the first bits of the encoded pointer and at least a portion of the memory address of the memory location.

24. The one or more non-transitory computer-readable media of claim 23, wherein the slice of the memory address stored in the second bits of the encoded pointer is encrypted, and wherein to decode the encoded pointer includes:

decrypting the slice of the memory address in the encoded pointer based at least in part on a second tweak.

25. The one or more non-transitory computer-readable media of claim 24, wherein the code is executable to cause the machine further to:

store a second slice of the memory address in immutable plaintext bits of the encoded pointer; and store a third slice of the memory address in mutable plaintext bits of the encoded pointer, wherein the at least a portion of the memory address of the first tweak is to include the second bits of the encoded pointer, the immutable plaintext bits of the encoded pointer, and the mutable plaintext bits of the encoded pointer.

* * * * *